(12) United States Patent
Nakano

(10) Patent No.: US 7,742,181 B2
(45) Date of Patent: Jun. 22, 2010

(54) IMAGE FORMING APPARATUS AND METHOD FOR CONTROLLING IMAGE FORMING APPARATUS

(75) Inventor: Toshimitsu Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 11/537,885

(22) Filed: Oct. 2, 2006

(65) Prior Publication Data

US 2007/0081841 A1 Apr. 12, 2007

(30) Foreign Application Priority Data

Oct. 7, 2005 (JP) ............................. 2005-295386
Sep. 14, 2006 (JP) ............................. 2006-249889

(51) Int. Cl.
G06F 15/00 (2006.01)
G06K 15/00 (2006.01)
G06K 1/00 (2006.01)
G06F 3/12 (2006.01)

(52) U.S. Cl. ..................................... 358/1.14; 358/1.15

(58) Field of Classification Search .................. 358/1.1, 358/1.2, 1.6, 1.13, 1.14, 1.15, 1.18, 3.27, 358/3.28

See application file for complete search history.

(56) References Cited

U.S. PATENT DOCUMENTS 5,933,676 A * 8/1999 Ohno .............................. 399/8
6,963,424 B1 11/2005 Higuchi
2004/0002302 A1 * 1/2004 Takemoto et al. ........... 455/3.06
2005/0058476 A1 3/2005 Murakami .................... 399/366
2005/0232655 A1 10/2005 Syouichiro

FOREIGN PATENT DOCUMENTS

| JP | 5-2302 | 1/1993 |
|---|---|---|
| JP | 2001-018498 | 1/2001 |
| JP | 2001-197297 | 7/2001 |
| JP | 2001-251509 | 9/2001 |
| JP | 2005-091730 | 4/2005 |
| JP | 2005-094327 | 4/2005 |
| JP | 2005-231145 | 9/2005 |

* cited by examiner

*Primary Examiner*—Douglas Q Tran
(74) *Attorney, Agent, or Firm*—Fitzpatrick, Cella, Harper & Scinto

(57) ABSTRACT

The measured density value of a printer at the time is compared with the density measured value at the time of adjusting a copy-forgery-inhibited pattern density, and the fluctuation amount of the output density of the printer from the copy-forgery-inhibited pattern density adjustment time until the time is calculated. It is judged whether the calculated density fluctuation amount exceeds a density region (the threshold of density fluctuation amount) which becomes effective as the copy-forgery-inhibited pattern image. When the density fluctuation amount exceeds the threshold of the density fluctuation amount, the user is notified that the density of the copy-forgery-inhibited pattern image may have inappropriate density as the copy-forgery-inhibited pattern image by the density fluctuation. Thereby, the user can check whether the present copy-forgery-inhibited pattern image is appropriate.

11 Claims, 47 Drawing Sheets

| 6 | 7 | 8 | 9 |
|---|---|---|---|
| 5 | 0 | 1 | 10 |
| 4 | 3 | 2 | 11 |
| 15 | 14 | 13 | 12 |

FIG.3

| 0 | 8 | 2 | 10 |
|---|---|---|---|
| 12 | 4 | 14 | 6 |
| 3 | 11 | 1 | 9 |
| 15 | 7 | 13 | 5 |

FIG.5

Warning

SINCE THE SETTING DENSITY OF A
COPY-FORGERY-INHIBITED PATTERN
PRINT IS FLUCTUATED, AN APPROPRIATE
COPY-FORGERY-INHIBITED PATTERN MAY
NOT BE ALLOWED TO BE PRINTED

COPY-FORGERY-INHIBITED PATTERN DENSITY ADJUSTMENT

PRESENT SETTING NUMBER

| A | — | 16 |

COPY-FORGERY-INHIBITED PATTERN DENSITY TEST SHEET (PRINTING)

PLEASE INPUT A NUMBER IN WHICH THE DENSITY OF A LATENT-MARK PART CORRESPONDS TO THAT OF A BACKGROUND PART

SETTING NUMBER

| _ | — | _ |

(DETERMINATION)  (CANCEL)

FIG.23

Warning

SINCE THE LATENT-MARK PATTERN OF THE
SELECTED LEVEL IS LIGHT, AN APPROPRIATE
COPY-FORGERY-INHIBITED PATTERN MAY NOT
BE ALLOWED TO BE PRINTED

PLEASE SELECT DARKER DENSITY LEVEL

> Warning
> SINCE THE LATENT-MARK PATTERN OF
> THE SELECTED LEVEL IS LIGHT, AN APPROPRIATE
> COPY-FORGERY-INHIBITED PATTERN MAY NOT BE
> ALLOWED TO BE PRINTED
>
> PLEASE SELECT A DARKER DENSITY LEVEL
> OF MORE THAN N LEVEL OF CURRENTLY
> SELECTED LEVEL
>
> OK

FIG.39

Warning

SINCE THE SELECTED LEVEL IS OUTSIDE
THE EFFECTIVE DENSITY REGION OF THE
COPY-FORGERY-INHIBITED PATTERN IMAGE,
AN APPROPRIATE COPY-FORGERY-INHIBITED
PATTERN MAY NOT BE ALLOWED TO BE PRINTED ( OK )

FIG.42

| 252 | 241 | 172 | 253 | 243 | 182 | 252 | 242 | 175 | 253 | 244 | 285 |
|---|---|---|---|---|---|---|---|---|---|---|---|
| 110 | 43 | 0 | 121 | 55 | 3 | 113 | 46 | 0 | 123 | 57 | 4 |
| 222 | 249 | 253 | 227 | 250 | 253 | 223 | 249 | 253 | 228 | 250 | 253 |
| 253 | 244 | 188 | 253 | 242 | 177 | 253 | 244 | 190 | 253 | 243 | 180 |
| 126 | 59 | 5 | 116 | 49 | 1 | 129 | 61 | 6 | 118 | 52 | 2 |
| 229 | 250 | 254 | 224 | 250 | 253 | 230 | 250 | 254 | 225 | 250 | 253 |
| 253 | 242 | 176 | 253 | 244 | 186 | 252 | 242 | 173 | 253 | 243 | 184 |
| 114 | 47 | 0 | 125 | 58 | 4 | 112 | 44 | 0 | 122 | 56 | 3 |
| 224 | 250 | 253 | 229 | 250 | 254 | 222 | 249 | 253 | 227 | 250 | 253 |
| 253 | 244 | 192 | 253 | 243 | 181 | 253 | 244 | 189 | 253 | 243 | 178 |
| 130 | 63 | 6 | 120 | 54 | 2 | 127 | 60 | 5 | 117 | 51 | 1 |
| 231 | 251 | 254 | 226 | 250 | 253 | 230 | 250 | 254 | 225 | 250 | 253 |

FIG.46

IMAGE FORMING APPARATUS AND METHOD FOR CONTROLLING IMAGE FORMING APPARATUS

BACKGROUND OF THE INVENTION

Field of the Invention

The present invention relates to an image forming apparatus and a method for controlling an image forming apparatus. Particularly, the present invention relates to density adjustment of a copy-forgery-inhibited pattern image, which is synthesized on print images such as documents and included in a printout, for preventing unjust forgeries and information leakages through copying of important documents or the like.

Some originals, such as receipts, instruments and certificates, have special patterns printed in the background of the originals, which patterns make certain characters emerge in the originals when the originals are copied. The special patterns are generally referred to as a "copy-forgery-inhibited pattern image." This copy-forgery-inhibited pattern image can psychologically apply the brakes to execution of copying, and even if copying is executed, usage of the duplicate can be prevented.

The copy-forgery-inhibited pattern image is fundamentally composed of two regions, which are a region where dots remain after copying, and a region where dots disappear after copying. The region where the dots remain after copying is referred to as the latent-mark part, and the region where dots disappear after copying is referred to as the background part. The two regions have almost the same reflection density on the original. Concentrated type large dots are arranged on the latent-mark part, and dispersed type small dots are arranged on the background part.

Herein, the dispersed type small dots are small enough not to be reproduced by a copy machine (about 42 μm×42 μm). On the other hand, the concentrated type large dots are large enough to be reproduced by a copying machine (about 84 μm×84 μm).

Therefore, when the original on which the copy-forgery-inhibited pattern image is printed is copied, only the latent-mark part on which the large dots are arranged is reproduced on the duplicate. Herein, if the latent-mark part has a shape of a certain character string, the latent-mark part appears and is suddenly visually recognized on the duplicate.

The concentrated large dots and the dispersed small dots are generated by dither processing using respectively different dither matrices. Specifically, a dot concentration type dither matrix is used in order to obtain the concentrated dot arrangement, and a dot dispersion type dither matrix is used in order to obtain the dispersed dot arrangement.

For example, Japanese Patent Application Laid Open No. 2001-197297 discloses the copy-forgery-inhibited pattern image. Also Japanese Patent Application Laid Open No. 2005-091730 discloses a technique for adjusting the density of the copy-forgery-inhibited pattern image.

In a printer, adjustment of the density of the copy-forgery-inhibited pattern image is performed so that the reflection density of the latent-mark part on the original is set to be almost the same as that of the background part. Japanese Patent Application Laid Open No. 2005-091730 discloses a technique for generating a plurality of patch data in which the density value of the image of the latent-mark part is determined as a fixed value and the density value of the image of the background part is gradually changed (refer to FIG. 20 of Japanese Patent Application Laid Open No. 2005-091730 and FIG. 47 of the present application). The generated patch data is formed on a sheet. Then a user finds a patch in which the reflection density of the image of the latent-mark is substantially equal to that of the background part from above the sheet, and selects the number of the found patch on a user interface. Then, from the next time, when carrying out copy-forgery-inhibited pattern printing, the copy-forgery-inhibited pattern image is generated by using the reflection density used when generating the patch of the selected number.

The case where the user finds that the patch in which the reflection density of the image of the latent-mark part is substantially equal to that of the background part of the sheet is equivalent to finding the patch in which the shape (the shape of the character string) of the latent-mark part is most inconspicuous on the sheet.

However, it is troublesome for the user to adjust the density each time using the above-mentioned density adjustment technique of the copy-forgery-inhibited pattern image (since the patches must be formed on the sheet each time and the number of an appropriate patch must be selected from among the patches using the UI (user interface)).

On the other hand, when the density adjustment is omitted, an inappropriate copy-forgery-inhibited pattern image may be formed on the sheet. The strange copy-forgery-inhibited pattern image is formed on the sheet since the image formation capability fluctuates depending on various conditions of the printing environment such as humidity and temperature in the printer, indoor temperature and humidity, the durability of a printer engine, and residual quantities of ink and toner or the like of the printer. Specifically, for example, if the image formation capability of the printer is temporarily decreased, small dots may not be correctly formed on the sheet. In such a case, naturally, the image of the background part of the copy-forgery-inhibited pattern image is lightly formed on the sheet. Then, an original in which the latent-mark part in the copy-forgery-inhibited pattern image is darker than the background part is formed. That is, the original is created with the inappropriate (the latent-mark part is darker than the background part) copy-forgery-inhibited pattern image that is formed on the sheet.

SUMMARY OF THE INVENTION

It is an object of the present invention to provide an image forming apparatus and a method for controlling the image forming apparatus which enable a user to easily recognize that the deviation and difference in density regarding the printing of the copy-forgery-inhibited pattern image are caused.

In a first aspect of the present invention, there is provided an image forming apparatus comprising: density correcting means for correcting densities of respective pixels composing an input image by using a density correcting parameter; forming means for forming the image, in which densities of respective pixels have been corrected by said density correcting means, on a sheet; changing means for changing a density correcting parameter used by said density correcting means; and notifying means for notifying a user to execute a density adjustment for a copy-forgery-inhibited pattern image, when said changing means changes the density correcting parameter at an amount equal to or greater than a predetermined amount.

In a second aspect of the present invention, there is provided an image forming apparatus comprising: density correcting means for executing a gamma correction for a density of an input image by using a gamma correction value; forming means for forming the image for which said density correcting means has executed the gamma correction, on a sheet; changing means for changing the gamma correction value used by said density correcting means; and notifying means for notifying a user to execute a density adjustment for a copy-forgery-inhibited pattern image, when said changing means changes the gamma correction value at an amount equal to or greater than a predetermined amount.

In a third aspect of the present invention, there is provided an image forming apparatus comprising: intermediate forming means for executing a gamma correction for a density of an input image by using a gamma correction value, binarizing the image for which the gamma correction has been executed, and forming the binarized image obtained by the binarization on a intermediate transfer body; measurement means for measuring a density of a binarized image formed by said intermediate forming means; final forming means for forming the binarized image formed on the intermediate transfer body on a sheet; measurement result obtaining means for inputting an image used for adjusting the gamma correction value into said intermediate forming means so that said intermediate forming means forms the binarized image on the intermediate transfer body, and causing said measurement means to measure a density of the binarized image formed on the intermediate transfer body to obtain a measurement result; adjustment means for adjusting the gamma correction value based on the measurement result obtained by said measurement result obtaining means; and notifying means for notifying a user to execute a density adjustment for a copy-forgery-inhibited pattern image, when the measurement result obtained by said measurement result obtaining means differs from a measurement result at the time just before previous density adjustment for the copy-forgery-inhibited pattern image at difference amount equal to or greater than a predetermined amount.

In a fourth aspect of the present invention, there is provided a control method of an image forming apparatus, said method comprising: density correcting step for correcting densities of respective pixels composing an input image by using a density correcting parameter; forming step for forming the image, in which densities of respective pixels have been corrected by said density correcting step, on a sheet; changing step for changing a density correcting parameter used by said density correcting step; and notifying step for notifying a user to execute a density adjustment for a copy-forgery-inhibited pattern image, when said changing means changes the density correcting parameter at an amount equal to or greater than a predetermined amount.

In a fifth aspect of the present invention, there is provided a control method of an image forming apparatus, said method comprising: density correcting step for executing a gamma correction for a density of an input image by using a gamma correction value; forming step for forming the image for which said density correcting step has executed the gamma correction, on a sheet; changing step for changing the gamma correction value used by said density correcting step; and notifying step for notifying a user to execute a density adjustment for a copy-forgery-inhibited pattern image, when said changing step changes the gamma correction value at an amount equal to or greater than a predetermined amount.

In a sixth aspect of the present invention, there is provided a control method of an image forming apparatus, said method comprising: intermediate forming step for executing a gamma correction for a density of an input image by using a gamma correction value, binarizing the image for which the gamma correction has been executed, and forming the binarized image obtained by the binarization on a intermediate transfer body; measurement step for measuring a density of a binarized image formed by said intermediate forming step; final forming step for forming the binarized image formed on the intermediate transfer body on a sheet; measurement result obtaining step for inputting an image used for adjusting the gamma correction value into said intermediate forming step so that said intermediate forming step forms the binarized image on the intermediate transfer body, and causing said measurement step to measure a density of the binarized image formed on the intermediate transfer body to obtain a measurement result; adjustment step for adjusting the gamma correction value based on the measurement result obtained by said measurement result obtaining step; and notifying step for notifying a user to execute a density adjustment for a copy-forgery-inhibited pattern image, when the measurement result obtained by said measurement result obtaining step differs from a measurement result at the time just before previous density adjustment for the copy-forgery-inhibited pattern image at difference amount equal to or greater than a predetermined amount.

The above configuration can provide an image forming apparatus and a method for controlling the image forming apparatus, which notify that the copy-forgery-inhibited pattern image is not appropriately formed on the sheet due to the density fluctuation of the printer.

Further features of the present invention will become apparent from the following description of exemplary embodiments (with reference to the attached drawings).

BRIEF DESCRIPTION OF THE DRAWINGS

FIG. 3 is a view showing one example of a swirl type dither matrix of 4×4.

FIG. 5 is a view showing one example of Bayer-type dither matrix of 4×4.

FIG. 21 is a view showing one example of a message notified by the processing shown in FIG. 20.

FIG. 23 is a view showing a user interface of the copy-forgery-inhibited pattern density adjustment displayed by the processing of FIG. 22.

FIG. 36 is a view showing a message for notifying that the level of a latent-mark pattern has an inappropriate density as a copy-forgery-inhibited pattern image.

FIG. 39 is a view showing a message for notifying a user that the level of the latent-mark pattern displayed in the processing of FIG. 38 has an inappropriate density as the copy-forgery-inhibited pattern image and how many levels should be adjusted in order to obtain the appropriate density.

FIG. 42 is a view showing a message that notifies a user that the level of a latent-mark pattern displayed in the processing of FIG. 40 that is selected by a user is an inappropriate density as a copy-forgery-inhibited pattern image.

FIG. 46 is a view showing a dither matrix used for binarizing the data of the patch.

DESCRIPTION OF THE EMBODIMENTS

Figure 1:
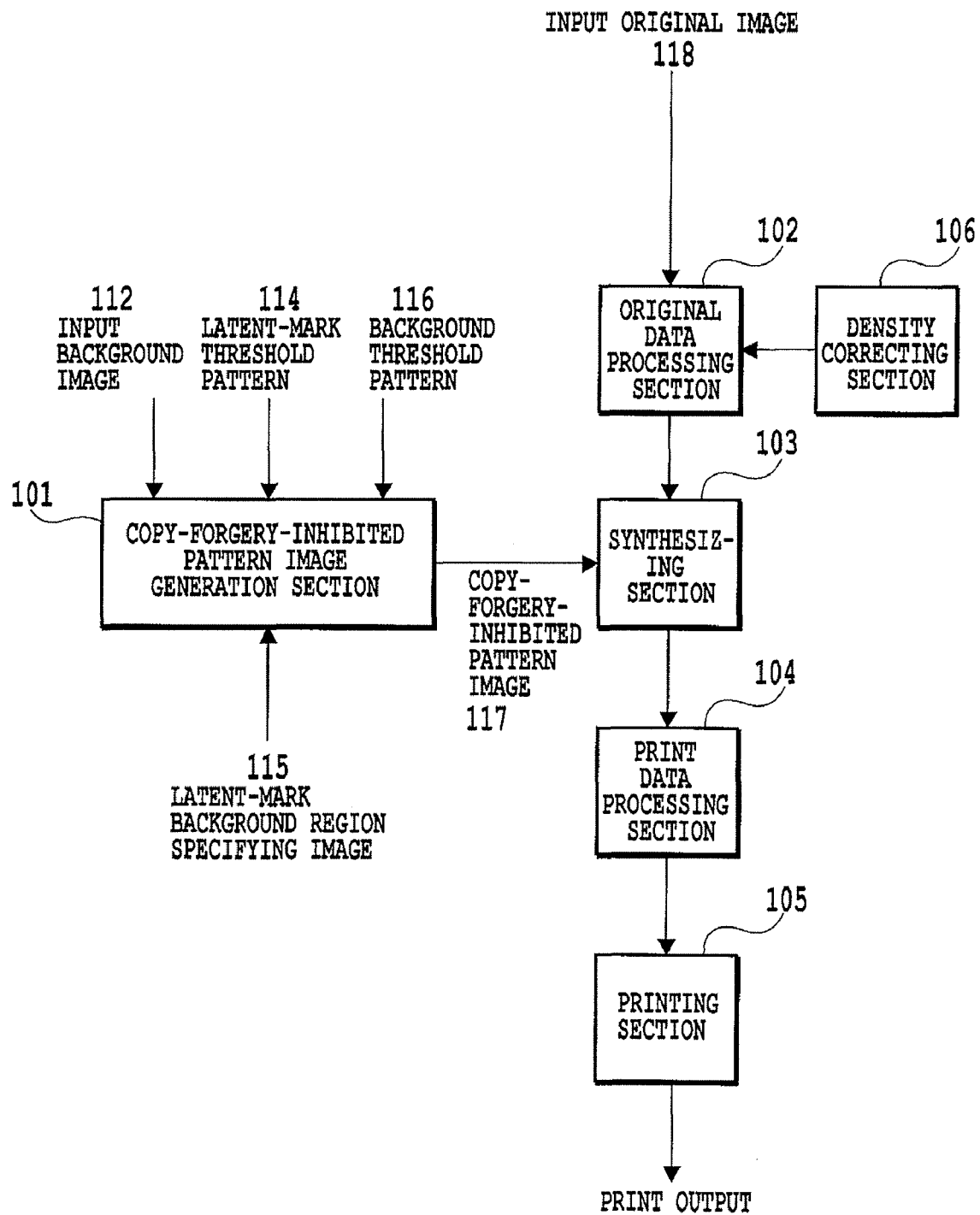
FIG. 1 is a block diagram showing the processing of a copy-forgery-inhibited pattern synthesizing printing apparatus in a first embodiment of the present invention.

Hereinafter, with reference to the drawings, the embodiments of the present invention will be described in detail.

First Embodiment

<Description of Copy-Forgery-Inhibited Pattern Image>

Figure 3:
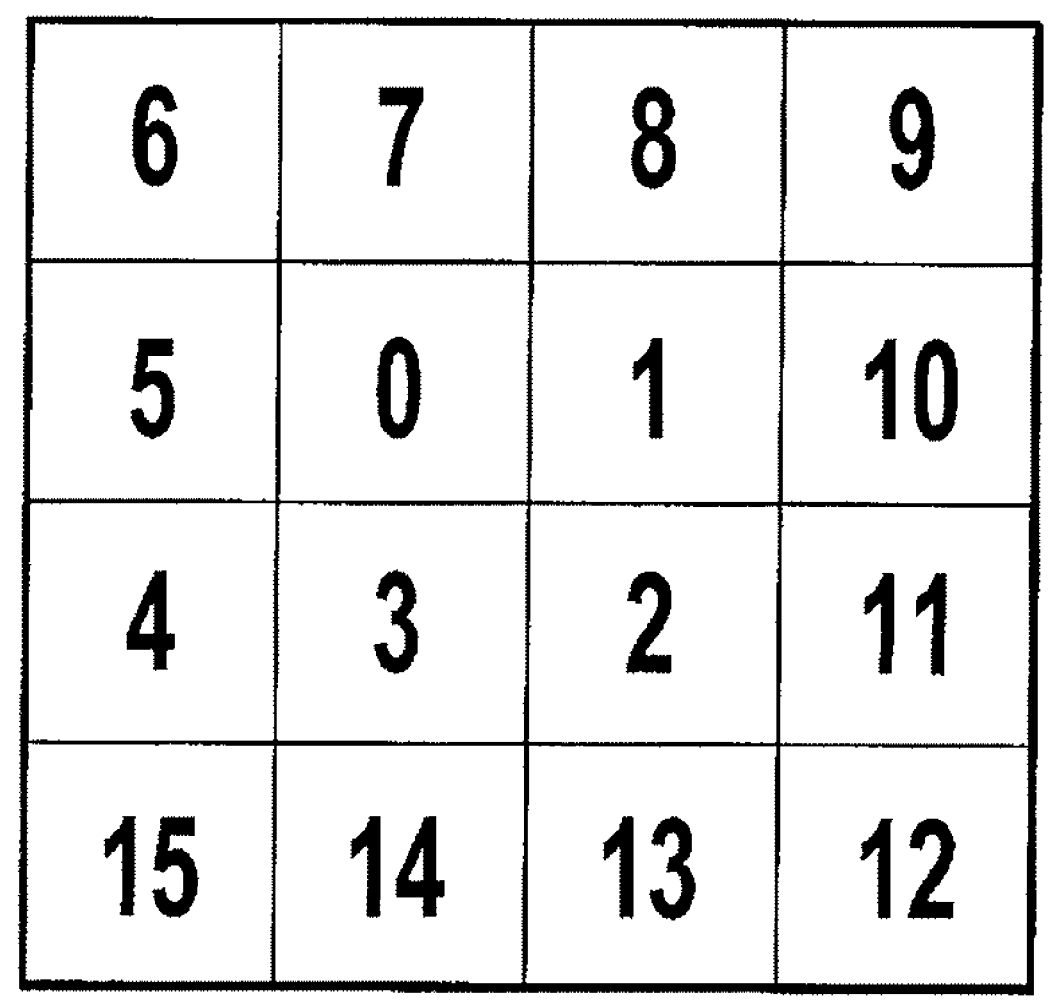
Figure 5:
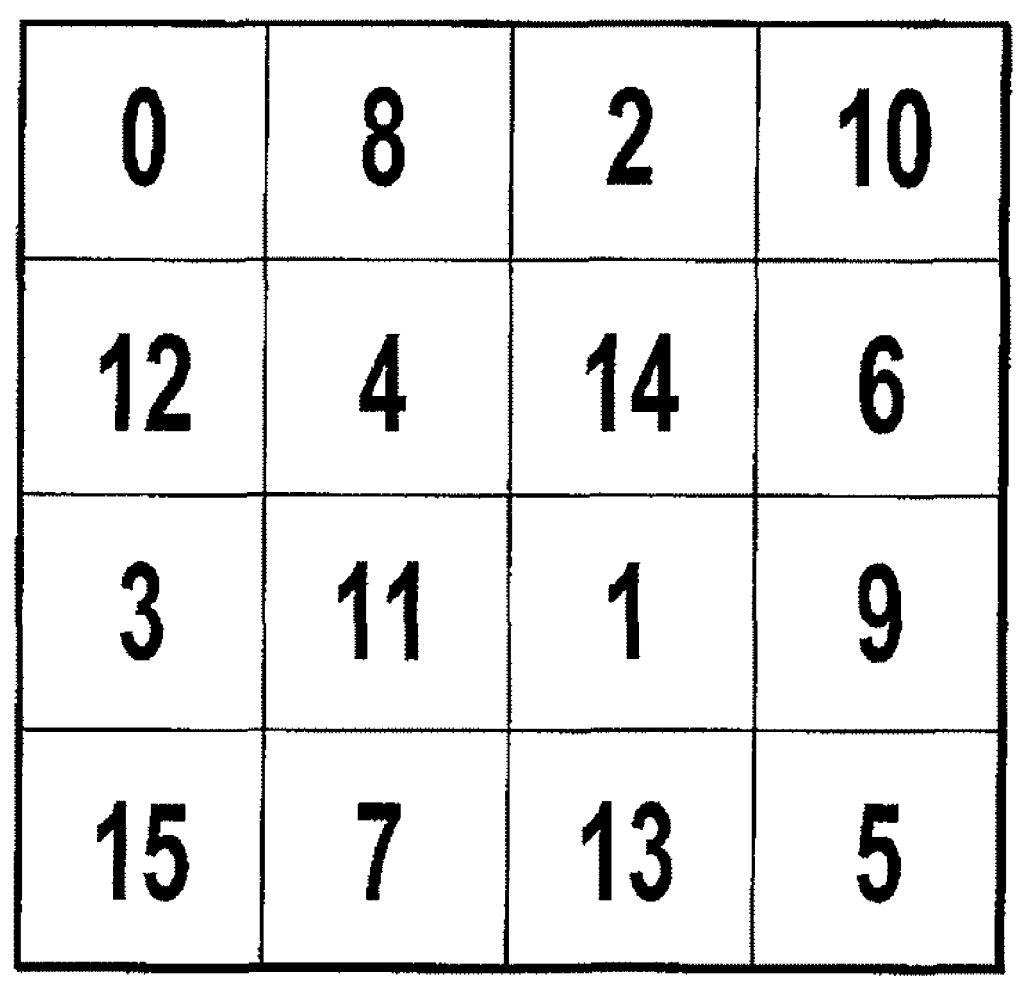

In the following embodiments, an image corresponding to a background part is designed so that dots are discretely arranged by using a dot dispersion type dither matrix, and an image corresponding to a latent-mark part is designed so that dots are intensively arranged by using a dot concentration type dither matrix. The dither matrix used for the image generation of the background part is referred to as a background dither matrix, and the dither matrix used for the image generation of the latent-mark part is referred to as a latent-mark dither matrix. A concentration type dither matrix as shown in FIG. 3 is used as the latent-mark dither matrix, and a dispersion type dither matrix as shown in FIG. 5 is used as the background dither matrix.

In the following description, a binary image of 4 pixels×4 pixels constituting the background part is referred to as a background threshold pattern, and a binary image of 4 pixels×4 pixels constituting the latent-mark part is referred to as a latent-mark threshold pattern. Specifically, for example, reference numeral 401 of FIG. 4 designates the latent-mark threshold pattern, and reference numeral 601 of FIG. 6 designates the background threshold pattern. In this embodiment, the combination of the background threshold pattern and latent-mark threshold pattern is previously determined so that the reflection density of the background part is equal to that of the latent-mark part, at the time of printing. That is, for example, a pattern using 2 pixels in 4 pixels×4 pixels as a black pixel is previously determined to be set to the background threshold pattern (refer to reference numeral 601 of FIG. 6), and a pattern using 3 pixels in 4 pixels×4 pixels as a black pixel is previously determined to be set to a latent-mark threshold pattern (refer to reference numeral 401 of FIG. 4). The latent-mark threshold pattern and background threshold pattern is decided by using the copy-forgery-inhibited pattern image density adjustment technique of above stated Japanese Patent Application Laid Open No. 2005-091730.

<Description of Copy-Forgery-Inhibited Pattern Image Synthesizing Printing Apparatus>

FIG. 1 is a block diagram showing the processing of a copy-forgery-inhibited pattern synthesizing printing apparatus having an image processing device for generating data for synthesizing and printing a copy-forgery-inhibited pattern image and a printing device for printing based on the data, according to one embodiment of the present invention. The copy-forgery-inhibited pattern synthesizing printing apparatus consist of a copy-forgery-inhibited pattern image generation section 101, an input original data processing section 102, a synthesizing section 103, a print data processing section 104, a printing section 105, and a density correcting section 106. The copy-forgery-inhibited pattern synthesizing printing apparatus shown in FIG. 1 is one embodiment of an image forming apparatus of the present invention, and specifically, is a printer capable of synthesizing and printing a copy-forgery-inhibited pattern image on an original image. However, it is as a matter of course that the image forming apparatus of the present invention is not limited to the above example. For example, an image forming apparatus may be an image forming system for carrying out processes until print data processing of processes shown in FIG. 1 in a host computer and for executing the processing of the printing section in a printer.

First, an input background image 112, a latent-mark threshold pattern 114, a latent-mark background region specifying image 115, and a background threshold pattern 116 are input into the copy-forgery-inhibited pattern image generation section 101. The latent-mark background region specifying image 115 specifies the regions of the latent-mark part and background part, and is composed of one-bit per one-pixel. One bit (255) of the latent-mark background region specifying image 115 expresses the latent-mark part, and another bit (0) expresses the background part. The latent-mark background region specifying image 115 has a shape of a character string highlighted on a copy.

Figure 7:
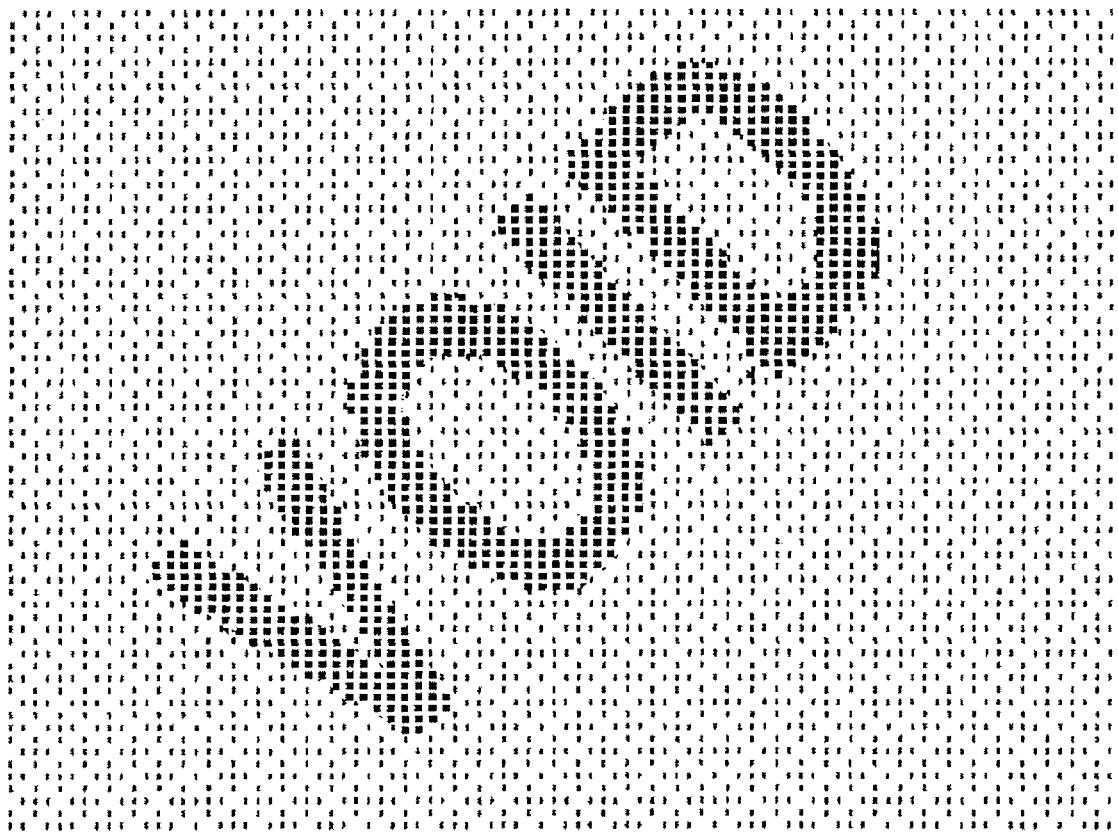
FIG. 7 is a view showing a part of copy-forgery-inhibited pattern image generated by boundary processing in a copy-forgery-inhibited pattern generation part.

The copy-forgery-inhibited pattern image generation section 101 pastes the latent-mark threshold pattern 114 to entire face of the region specified as the latent-mark region by the latent-mark background region specifying image 115, and pastes the background threshold pattern 116 to the entire face of the region specified as the background region. Thereby, as shown in FIG. 7, the copy-forgery-inhibited pattern image is generated, in which concentration type dots are arranged on the latent-mark part, and dispersion type dots are arranged on the background part. The processing in the copy-forgery-inhibited pattern image generation section 101 will be further described in detail using FIG. 2.

Next, the copy-forgery-inhibited pattern image 117 generated in the copy-forgery-inhibited pattern image generation section 101 is output to the synthesizing section 103. A method for generating the copy-forgery-inhibited pattern image 117 will be described in detail later. An input original image 118 is output to the synthesizing section 103 after being executing image processing such as RGB-CMYK conversion, density correcting processing (gamma correcting processing) and half-tone processing in the input original data processing section 102.

The density correcting (gamma correcting) processing is carried out using a density correcting (gamma correcting) parameter created in the density correcting (gamma correcting) section 106. A method for determining the density correcting (gamma correcting) parameter will be described in detail later.

The synthesizing section 103 synthesizes an input original image which is subjected to image processing in the input original data processing section 102 and a copy-forgery-inhibited pattern image 117 generated in the copy-forgery-inhibited pattern image generation section 101 to generate a copy-forgery-inhibited pattern synthesizing output image. When the copy-forgery-inhibited pattern image 117 is used as the copy-forgery-inhibited pattern synthesizing output image regardless of the contents of the input original image 118, it is not necessary to refer to the input original image 118 in the synthesizing section 103.

Next, the print data processing section 104 receives the copy-forgery-inhibited pattern synthesizing output image synthesized in the synthesizing section 103, and transmits the copy-forgery-inhibited pattern synthesizing output image to the printing section 105.

The printing section 105 prints and outputs an original output obtained by synthesizing the copy-forgery-inhibited pattern image according to the information of the input copy-forgery-inhibited pattern synthesizing output image data. Herein, the printing section 105 serves as a printer engine for forming an image on an intermediate transfer body and forming the image formed on the intermediate transfer body on the sheet. Furthermore, the printing section 105 measures the density of the image formed on the intermediate transfer body and transmits the measured result to the density correcting section 106.

In this embodiment, all of data for the copy-forgery-inhibited pattern image, input original image, copy-forgery-inhibited pattern synthesizing output image and copy-forgery-inhibited pattern synthesizing output image are digital data, and the copy-forgery-inhibited pattern synthesizing output expresses the image printed on paper.

Figure 2:
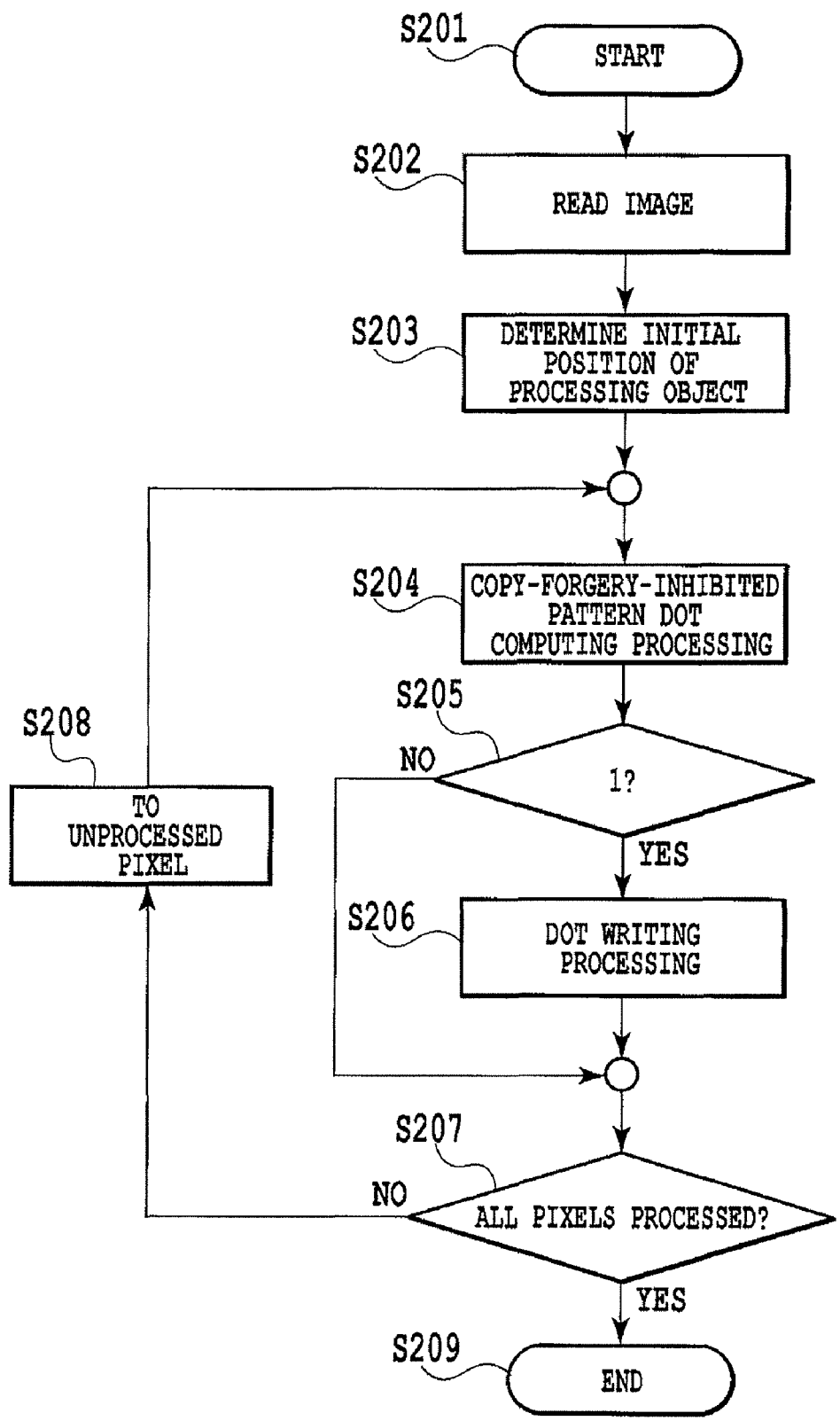
FIG. 2 is a flowchart showing the processing procedure of a copy-forgery-inhibited pattern image generation part in the first embodiment.

FIG. 2 is a flowchart showing the processing procedure of the copy-forgery-inhibited pattern image generation section 101 shown in FIG. 1.

First, at Step S201, copy-forgery-inhibited pattern image generation processing is started by input or the like via a user interface or the like. Next, at Step S202, an input background image 111, the background threshold pattern 116, the latent-mark threshold pattern 114 and the latent-mark background region specifying image 115 are read. Next, at Step S203, an initial pixel on generating the copy-forgery-inhibited pattern image is determined. For example, when carrying out image processing in order of raster scanning from the upper left to the lower right to the entire input image for changing the input image to the copy-forgery-inhibited pattern image, the upper left is set to an initial position.

Next, at Step S204, the background threshold pattern 116, the latent-mark threshold pattern 114 and the latent-mark background region specifying image 115 are respectively arranged as arrangements of tiles from the upper left of the input background image 112. A dot computing process is executed for pixels of the input background image 111 to be processed, and it is judged whether the pixel value corresponding to the dot for printing is written or not. At this time, the pixel value corresponds to the inputted color information 111.

In the dot computing process;

(a) the pixel which is equivalent to the latent-mark part in the latent-mark background region specifying image is set to 1 when the pixel value of the latent-mark threshold pattern is black, and set to 0 when white:

(b) the pixel which is equivalent to the background part in the latent-mark background region specifying image is set to 1 when the pixel value of the background threshold pattern is black, and set to 0 when white.

Next, at Step S205, the calculation result in Step S204 is judged. Here, the process proceeds to Step S206 when the result is 1 and proceeds to Step S207 when 0. At Step S206, processing for writing the pixel value corresponding to the dot for printing is carrying out. The pixel value can be changed according to the color of the copy-forgery-inhibited pattern image 117. The pixel to be processed for the input background image 112 is set to black when waiting the black copy-forgery-inhibited pattern to be generated. In addition, the color copy-forgery-inhibited pattern image 117 can also be generated by setting the pixels to cyan, magenta and yellow according to the toner of the printer or the color of ink.

At Step S207, it is judged whether all the pixels of the input background image 112 are processed. When all the pixels of the input background image 112 are not processed, the process proceeds to Step S208; the unprocessed pixel is selected, and the processing of Steps S204 to S206 are executed again. When all the pixels of the input background image 112 are processed, the process proceeds to Step S209 and the image processing in the copy-forgery-inhibited pattern image generation section 101 is ended. The copy-forgery-inhibited pattern image 117 is generated by the above-described processing.

Next, the arrangement method of dots in the latent-mark part and background part according to the embodiment will be described. In the embodiment, the latent-mark part and the background part are generated based on the dot concentration type dither matrix and the dot dispersion type dither matrix respectively. Representative examples of the dot concentration type dither matrix used when generating the latent-mark part include a swirl (concentration) type dither matrix.

FIG. 3 shows one example of the swirl (concentration) type dither matrix of 4×4. The threshold values of the swirl (concentration) type dither matrix of 4×4 is arranged so that a numerical value spirally increases from a center.

Figure 4:
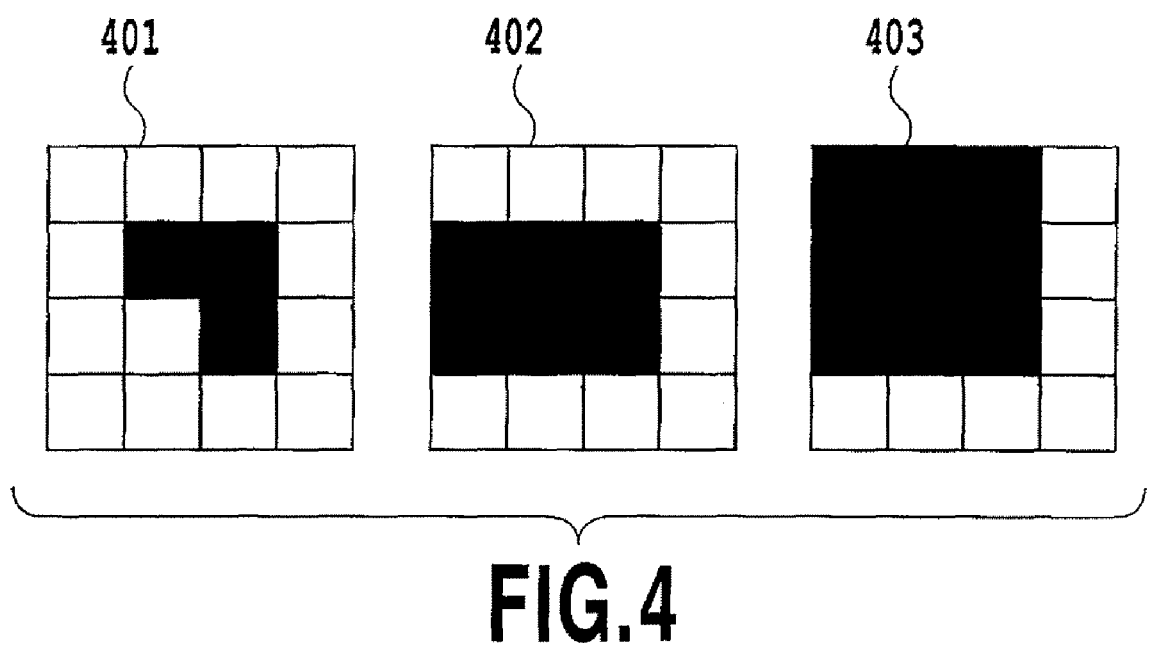
FIG. 4 is a view showing a threshold pattern (dot arrangement) obtained by executing the threshold processing of a predetermined density value using the swirl type dither matrix of 4×4 of FIG. 3.

FIG. 4 shows a latent-mark threshold pattern (dot arrangement) obtained by executing threshold processing of a predetermined density value using the swirl (concentration) type dither matrix of 4×4 of FIG. 3. In FIG. 4, numerals 401, 402 and 403 designate the threshold pattern obtained by executing threshold processing of the density values "4," "6" and "9" respectively by using the dither matrix shown in FIG. 3. The latent-mark threshold pattern (dot arrangement) obtained herein is the pattern where the dots are intensively arranged.

On the other hand, representative examples of the dot dispersion type dither matrix for forming the background part include a Bayer-type dither matrix.

FIG. 5 shows one example of the Bayer-type dither matrix of 4×4. The threshold pattern generated by performing dither processing of an arbitrary density value by using the Bayer-type dither matrix is designed so that the dots are dispersedly arranged.

Figure 6:
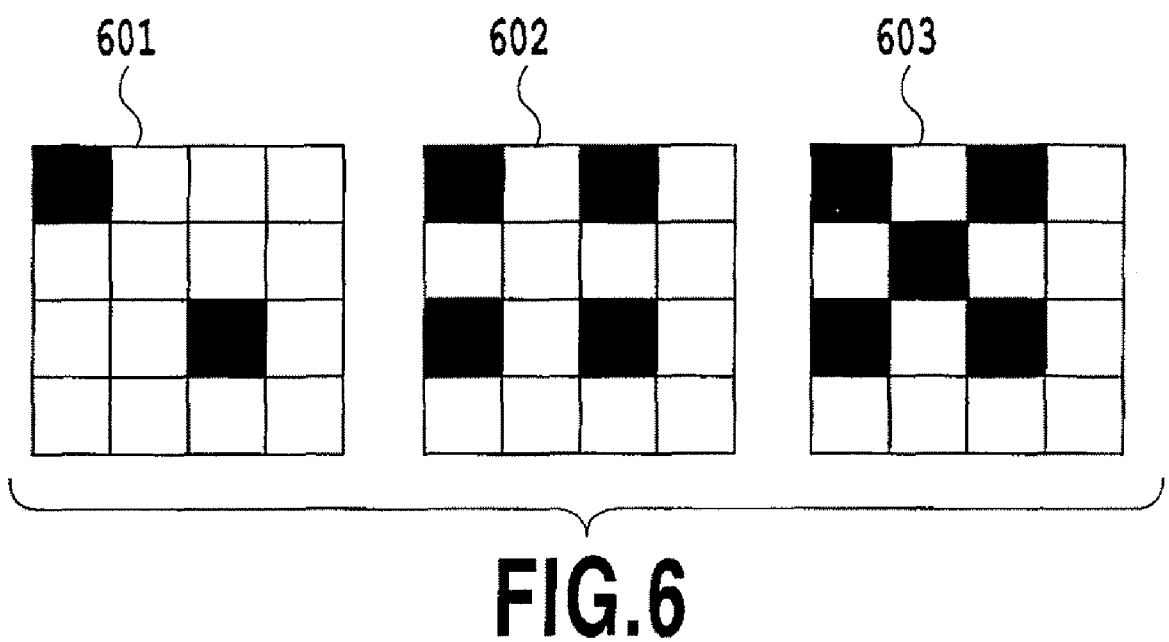
FIG. 6 is a view showing a threshold pattern (dot arrangement) obtained by executing the threshold processing of a predetermined density value using the Bayer-type dither matrix of 4×4 of FIG. 5.

FIG. 6 shows a background threshold pattern (dot arrangement) obtained by executing threshold processing for a predetermined density value using the Bayer-type dither matrix of 4×4 shown in FIG. 5. In FIG. 6, numerals 601, 602 and 603 designate the threshold pattern obtained by executing threshold processing for the density values "2," "4" and "5" respectively by using the dither matrix shown in FIG. 5. The threshold pattern (dot arrangement) obtained herein is the pattern where the dots are dispersedly arranged with each other. In the Bayer-type dither matrix, the elements of the threshold matrix are arranged in order at positions where the elements are not mutually contacted if possible, and the threshold pattern takes the dot arrangement of the shape of an isolated lattice. Although, the case where the Bayer-type dither matrix is used is mainly described hereinafter as the dither matrix used for the background in the embodiment, the dither matrix is not limited to the Bayer-type dither matrix. As a matter of course, another dot dispersion type dither matrix may be used.

When the latent-mark dither matrix is the dot concentration type dither matrix as shown in FIG. 3, the latent-mark threshold pattern becomes the concentration type large dot. The large dots are formed on the sheet as a large dot even if the density fluctuation of the printer occurs.

On the other hand, when the background dither matrix is the dot dispersion type dither matrix as shown in FIG. 5, the background threshold pattern becomes a plurality of small dots. The small dots are not formed on the sheet as a small dot in many cases if the density fluctuation of the printer occurs.

In this way, the reason why the large dots are correctly formed and the small dots tend to be easily incorrectly formed largely depends on the capability of the printer. For example, there is assumed a printer that applies minus electric charges to the specific area for putting toner on a sensitive drum (intermediate transfer body), puts toner of plus electric charges on the area to which the minus electric charges is applied, and finally transfers the toner onto a sheet. Then, when small dots of about 42 μm×42 μm are desired to be formed on the sheet, it is necessary to apply the minus electric charges to the small area of about 42 μm×42 μm. However, the minus electric charges cannot occasionally be correctly applied to such a small area. The reason is, for example, the degradation of the sensitive drum, the degradation of a laser applying electrification to the sensitive drum, humidity, or temperature. Therefore, when the copy-forgery-inhibited pattern image is generated the large dots are correctly formed, and the small dots tend to easily be incorrectly formed. Therefore, the number of the black pixels in the background pattern is set so that the number of the black pixels in the background pattern is more than that in the latent-mark pattern in many cases. The examples mentioned in the following cases previously determined are based on such a reason. The pattern using 2 pixels of 4 pixels×4 pixels as the black pixel is used as the background pattern (refer to reference numeral 601 of FIG. 6), the pattern using 3 pixels of 4 pixels×4 pixels as the black pixel is used as the latent-mark pattern (refer to reference numeral 401 of FIG. 4).

In any cases, since the small dots exist in the copy-forgery-inhibited pattern image, it is necessary to frequently carry out the density adjustment of the copy-forgery-inhibited pattern image using a technique of, for example, Japanese Patent Application Laid Open No. 2005-091730.

<Reason for Need of Carrying Out Density Adjustment of Copy-Forgery-Inhibited Pattern Image>

Although the generation method of the copy-forgery-inhibited pattern image and the synthesizing method of the copy-forgery-inhibited pattern image and the input original image are described in detail as described above, the latent-mark part and the background part are not always output with the intended density due to various causes when actually outputting the copy-forgery-inhibited pattern image using the printer. The cause is various factors such as the change of an engine with time (the degradation of the sensitive drum and the degradation of the laser), printing environment such as humidity and temperature, and the conditions of ink of the printer or toner. That is, the optimal density values of the background part and latent-mark part to the dither matrix are different depending on the model of the printer, the dither matrix, the individual of the printer, printing environment, paper, ink and toner or the like.

Therefore, also when the engine characteristic and printing environment of the printer are different, it is necessary to generate the copy-forgery-inhibited pattern image after obtaining the background threshold pattern and latent-mark threshold pattern having almost equal reflection density at the time of printing. Therefore, before carrying out copy-forgery-inhibited pattern synthesizing printing, it is necessary to execute the processing for obtaining the background threshold pattern and the latent-mark threshold pattern so that the reflection density of the background part becomes almost the same as that of latent-mark part for every printer, that is, the copy-forgery-inhibited pattern density adjustment.

<Regarding Density Adjustment Technique of Copy-Forgery-Inhibited Pattern Image>

Japanese Patent Application Laid Open No. 2005-091730 discloses a method for changing the gradation sequence of the density value to one or both of the background dither matrix and latent-mark dither matrix so that the reflection densities on the sheet become almost equal, as the copy-forgery-inhibited pattern density adjusting method. The technique of Japanese Patent Application Laid Open No. 2005-091730 will be briefly described.

Figure 8:
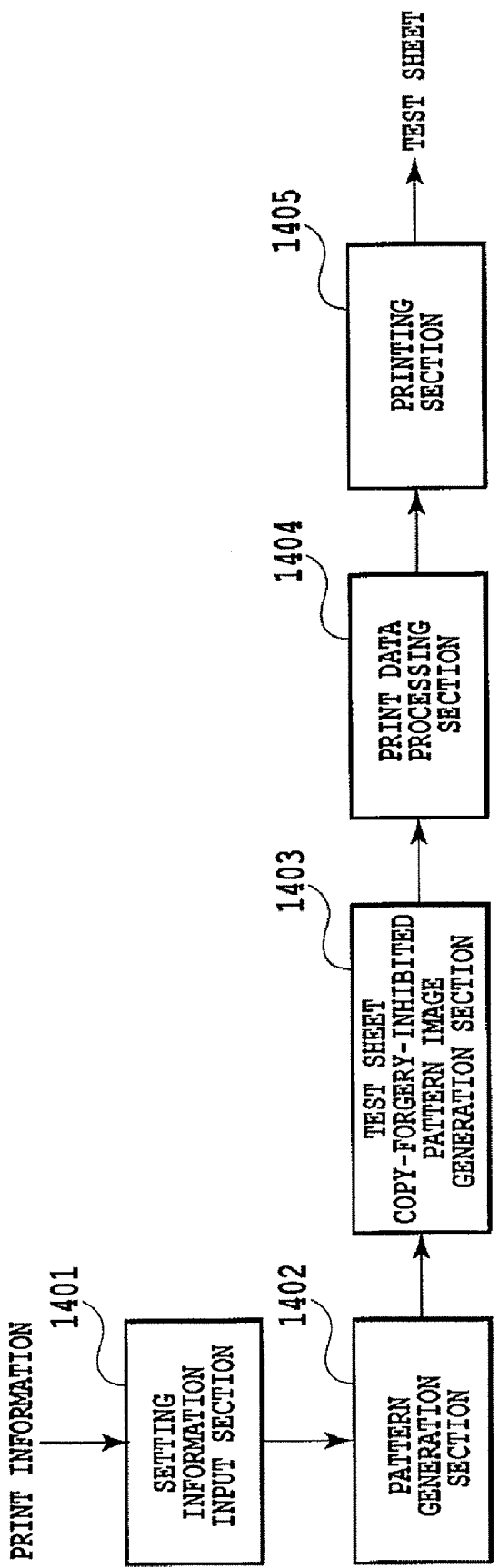
FIG. 8 is a block diagram showing the constitution of copy-forgery-inhibited pattern density test sheet.

FIG. 8 is a block diagram showing a constitution for carrying out copy-forgery-inhibited pattern density test sheet printing for executing the density adjustment of the copy-forgery-inhibited pattern image. As shown in FIG. 8, the constitution for executing the copy-forgery-inhibited pattern density test sheet printing is composed of a setting information input section 1401, a pattern generation section 1402, a test sheet copy-forgery-inhibited pattern image generation section 1403, a print data processing section 1404 and a printing section 1405.

The setting information input section 1401 executes processing for reading setting information from an initial setting file for storing the setting information. Alternately processing for receiving the setting information input via the user interface is carried out. The pattern generation section 1402 generates a threshold pattern (the latent-mark threshold pattern and the background threshold pattern) required for generating the copy-forgery-inhibited pattern based on the setting information input from the setting information input section 1401, and outputs the threshold pattern to the latter test sheet copy-forgery-inhibited pattern image generation section. In this embodiment, the pattern generated from the inputted setting information is the background threshold pattern and the latent-mark threshold pattern. In the copy-forgery-inhibited pattern density test sheet printing processing, the pattern generation section 1402 generates a plurality of background threshold patterns and latent-mark threshold patterns. The test sheet copy-forgery-inhibited pattern image generation section 1403 generates the test sheet copy-forgery-inhibited pattern image based on the pattern input from the pattern generation section 1402. The details of the test sheet copy-forgery-inhibited pattern image to be generated in the test sheet copy-forgery-inhibited pattern image generation section 1403 will be described in detail later.

The print data processing section 1404 executes required image processing to the test sheet copy-forgery-inhibited pattern image generated in the test sheet copy-forgery-inhibited pattern image generation section 1403. However, in the print data processing section, to the pixel value (cyan, magenta, yellow, black) of the copy-forgery-inhibited pattern image, the image processing of the test sheet copy-forgery-inhibited pattern image is carried out in view of not becoming the mixed colors in which a plurality of inks and toners are mixed at the time of printing. The test sheet copy-forgery-inhibited pattern image subjected to the required image processing is transmitted to the printing section 1405. The printing section 1405 prints out the test sheet copy-forgery-inhibited pattern image according to the input data.

Next, a test sheet in which a plurality of copy-forgery-inhibited pattern images (patches) which are generated in the test sheet copy-forgery-inhibited pattern image generation section 1403 and in which the densities of the both the background part and the latent-mark part are changed are two-dimensionally arranged will be described. The patches are printed in the range of the dark and light densities on the test sheet in which the densities of the background part and latent-mark part are two-dimensionally changed. A plurality of patches in which the density of the background part becomes almost the same as that of the latent-mark part exist in one sheet. Therefore, the density of the copy-forgery-inhibited pattern image can also be provided to the user as a selectable input value.

Since the test sheet in which the background part and the latent-mark part are arranged with the densitys of the both the background part and the latent-mark part are two-dimensionally changed in one sheet is used, the user can specify the patch in which the latent-mark part has a desirable dark hue and whose the density of the latent-mark part is almost equal to that of the background part. That is, the copy-forgery-inhibited pattern density parameter (the latent-mark threshold pattern and the background threshold pattern) for generating the copy-forgery-inhibited pattern image in which the latent-mark clearly appears at the time of copying can be promptly specified. The test sheet in which the background part and the latent-mark part are two-dimensionally arranged with the densities of the both the background part and the latent-mark part are changed has a large amount of information obtained from one sheet, excellent ability for reading through and high convenience. Additionally, since the number of the test sheets output when the user looks for the dark hue of the optimal copy-forgery-inhibited pattern can be reduced, the effect for leading to a reduction in paper cost is obtained.

Figure 9:
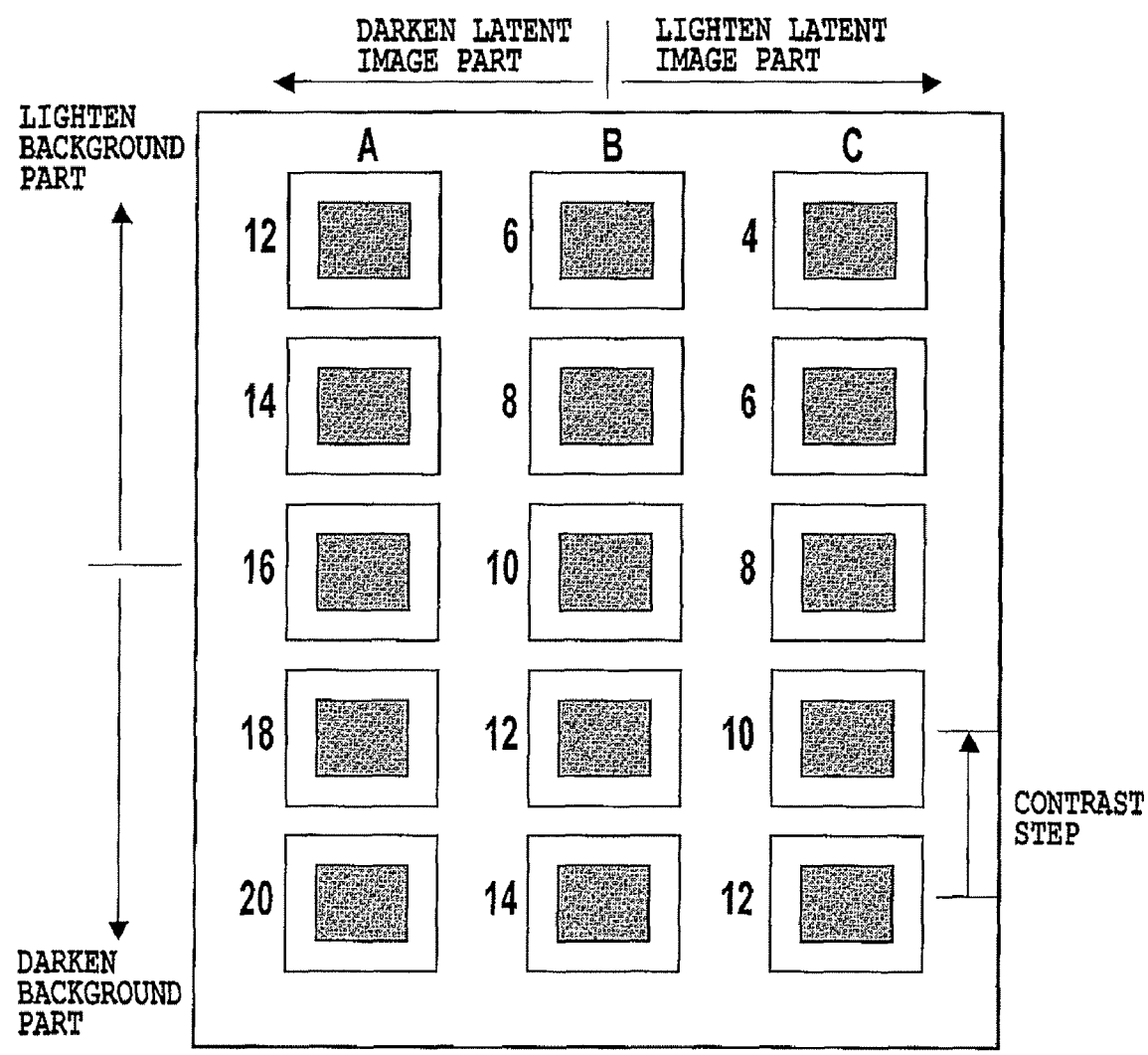
FIG. 9 is a view showing one example of a test sheet in which patches obtained by changing the densities of a background part and latent-mark part are two-dimensionally arranged.

FIG. 9 shows one example of a test sheet in which patches in which the densities of a background part and latent-mark part are changed are two-dimensionally arranged. Each of the patches has a constitution reliably containing the latent-mark part and the background part, and may include camouflage. Referring to each patch shown in FIG. 9, the central part and the periphery part represent the latent-mark part and the background part respectively. In the example shown in FIG. 9, the latent-mark background region specifying image specifying the latent-mark part and the background part have a square rectangular shape.

In the test sheet shown in FIG. 9, the density (the density value applied to the latent-mark dither matrix) of the latent-mark part is changed to the transverse direction of the paper, and the density (the density value applied to the background dither matrix) of the background part is changed to the longitudinal direction.

Figure 10:
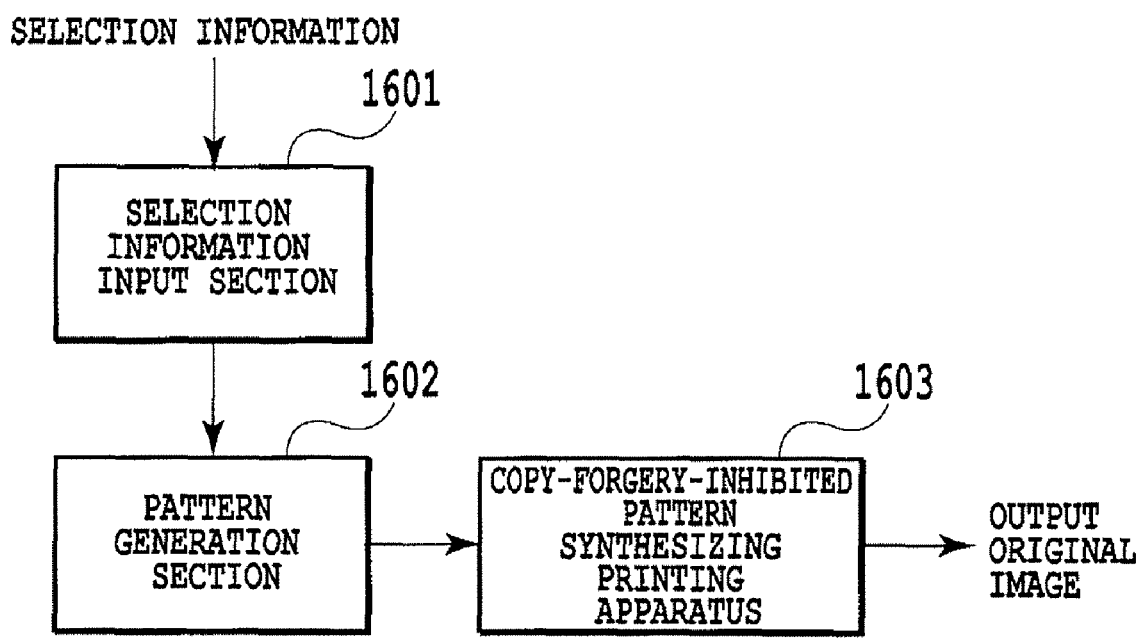
FIG. 10 is a view showing a copy-forgery-inhibited pattern synthesizing printing apparatus provided with a copy-forgery-inhibited pattern density calibration function.

FIG. 10 shows a copy-forgery-inhibited pattern synthesizing printing apparatus provided with a copy-forgery-inhibited pattern density adjusting function. A selection information input section 1601 and a pattern generation section 1602 are arranged in the preceding stage of the copy-forgery-inhibited pattern synthesizing printing apparatus (a device 1603 of FIG. 10) shown in FIG. 1.

In FIG. 10, information (for example, a number or the like printed near the patch) relating to the patch that the user judges to be optimal in the test sheet is input as selection information via the user interface in the selection information input section 1601. Herein, the patch of the optimal copy-forgery-inhibited pattern image is, for example, the darkness desired by the user and in which the density of the background part is almost the same as that of the latent-mark part, the latent-mark part remains and the background part disappears when copying the test sheet on the copier as a target.

The pattern generation section 1602 generates a pattern (the latent-mark threshold pattern and the background threshold pattern) required for generating the copy-forgery-inhibited pattern based on the selection information input from the selection information input section 1601, and inputs the pattern into the copy-forgery-inhibited pattern synthesizing printing apparatus 1603.

The copy-forgery-inhibited pattern synthesizing printing apparatus 1603 generates a copy-forgery-inhibited pattern image based on the background threshold pattern and latent-mark threshold pattern input from the pattern generation section 1602, synthesizes the copy-forgery-inhibited pattern image and the input original image, and prints out the output original image. Since the processing in the copy-forgery-inhibited pattern synthesizing printing apparatus 1603 has already been described in detail, the description thereof is omitted. Thus, in the copy-forgery-inhibited pattern synthesizing printing apparatus of the first embodiment of the present invention, the selection information input section 1601 and the pattern generation section 1602 are constituted in the copy-forgery-inhibited pattern synthesizing printing apparatus shown in FIG. 1, and the copy-forgery-inhibited pattern density adjustment is enabled. Specifically, the copy-forgery-inhibited pattern synthesizing printing apparatus is constituted by a processing section having the user interface and a CPU or the like carrying out processing based on input information via the user interface.

Figure 11:
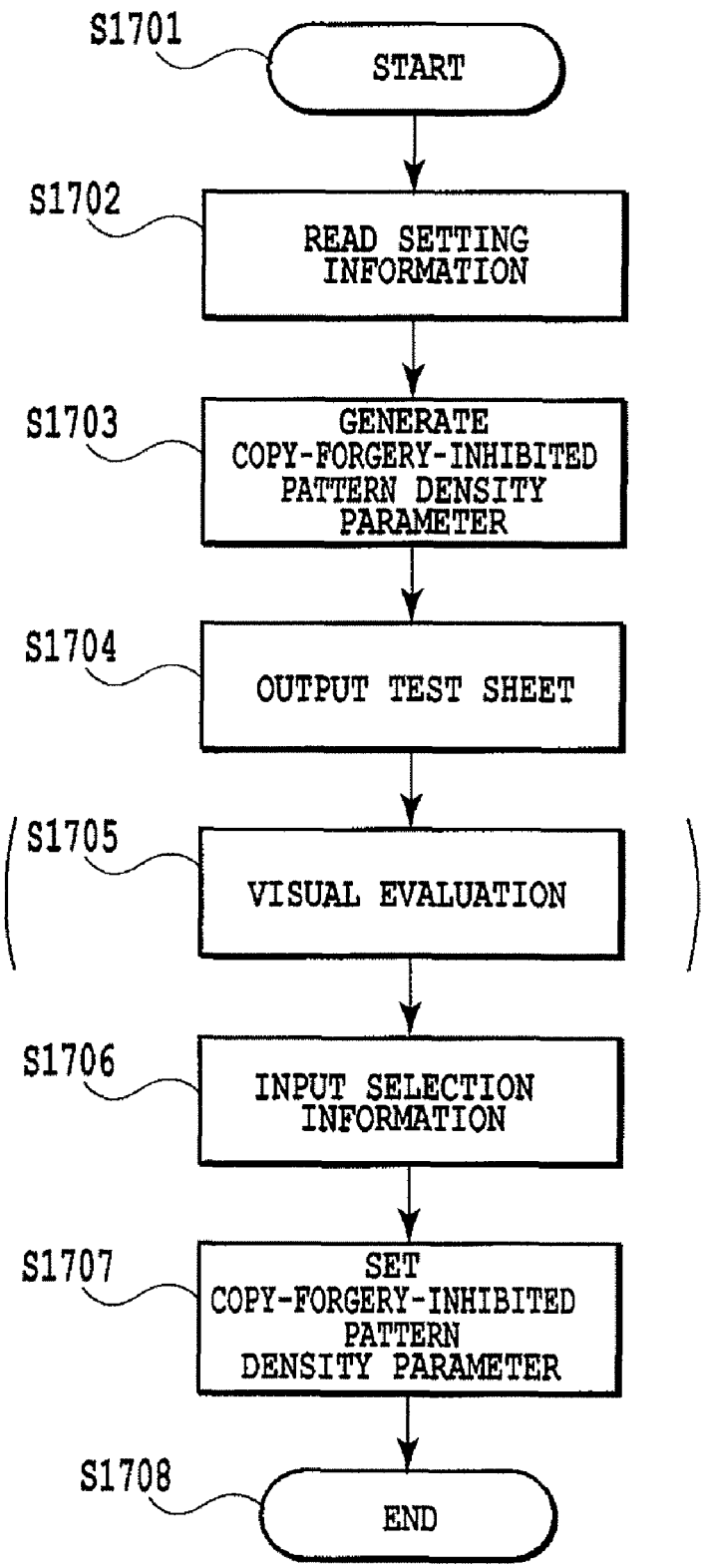
FIG. 11 is a flowchart showing the procedure of the simplest test sheet.

FIG. 11 is a flowchart showing the procedure of the simplest test sheet printing and copy-forgery-inhibited pattern density parameter setting based on the test sheet. First, according to the input from the user interface or the like, the test sheet printing process is started at Step S1701. Next, at Step S1702, processing for reading the setting information from the initial setting file storing the setting information, or processing for receiving the setting information input via the user interface is carried out. Next, at Step S1703, the copy-forgery-inhibited pattern density parameter is generated in order to determine the printing densities of the latent-mark part and background part when generating the copy-forgery-inhibited pattern image based on the setting information input at Step S1702. In this embodiment, the copy-forgery-inhibited pattern density pattern generated from the inputted setting information becomes the background threshold pattern and the latent-mark threshold pattern. Next, the test sheet as shown in FIG. 9 is generated at Step S1704 based on the copy-forgery-inhibited pattern density parameter generated at Step S1703, and the printout is carried out by the printer.

Next, in Step S1705, the user visually compares the densities of the latent-mark part and background part in each patch of the test sheet. The processing of this step is carried out by the user, and the copy-forgery-inhibited pattern synthesizing printing apparatus stands by the input of the following step in practice. In the visual evaluation by the user, an optimal patch in which the reflection density of the latent-mark part is almost equal to that of the background part, and the latent-mark part remains and the background part disappears when copying the test sheet in a copying machine as the target, is selected by the number related to the patch out of the test sheet. For example, in the example shown in FIG. 9, the patches in which the density of the latent-mark part is changed are arranged in column A, column B and column C sequences in the transverse direction of the paper, and the patches in which the density of the background part is changed in the longitudinal direction of the paper are arranged. A value expressing the density of the background part is described beside each patch. Herein, it is supposed that the patch having a desirable density as the copy-forgery-inhibited pattern image exists. And, it is supposed that the density of the latent-mark part of the patch is expressed by the column A, and the density of the background part is expressed by 16. In that case, the user selects the patch as A-16, and inputs the information.

Next, at Step S1706, the number (for example, A-16) relating to the patch selected at Step S1705 is input via the user interface or the like as the selection information. At Step S1707, a copy-forgery-inhibited pattern density parameter for determining the printing densities of the latent-mark part and background part of the copy-forgery-inhibited pattern image is set based on the information input at Step S1706. Specifically, the copy-forgery-inhibited pattern density parameter is set as the latent-mark threshold pattern and the background threshold pattern so that the density of the background part becomes substantially equal to that of the latent-mark part, and the background part disappears at the time of copying.

<Regarding Density Correcting of Original Image>

Next, with reference to FIG. 12 to FIG. 16, the density correcting (gamma correcting) section 106 (FIG. 1) for correcting the input original image will be described. This density correcting is a technique for correcting the density of the original image, and is different from the density adjustment of the copy-forgery-inhibited pattern image.

Figure 12:
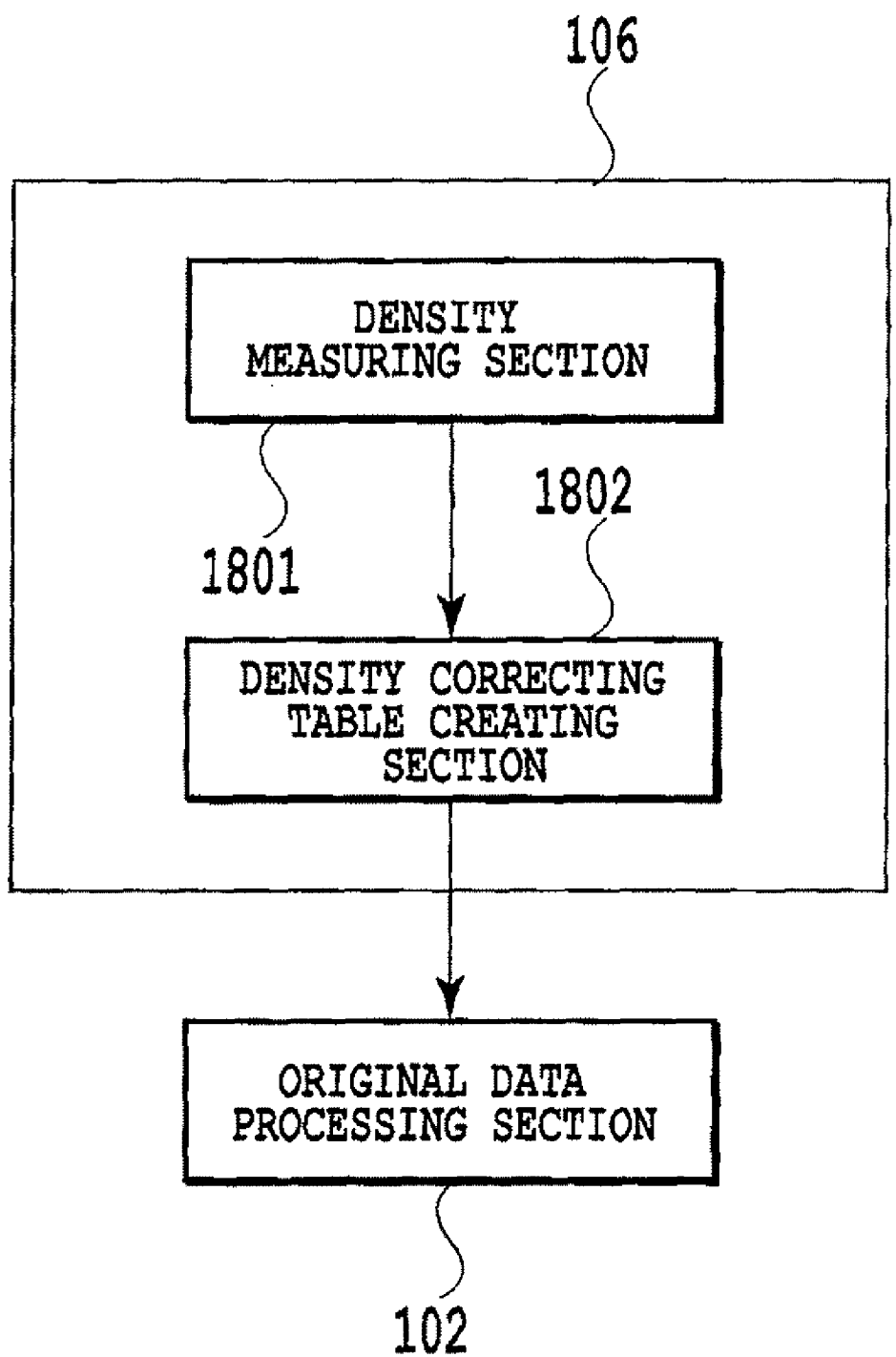
FIG. 12 is a view showing the constitution of a density correcting part of FIG. 1.

FIG. 12 is a block diagram showing the detailed constitution of the density correcting (gamma correcting) section 106. In FIG. 12, a density measuring section 1801 measures the reflection densities of a plurality of patches. A density correcting (gamma correcting) parameter creating section 1802 newly creates a conversion parameter (gamma correcting parameter) for correcting the density gradation sequence so as to be come a desired density characteristic based on the measured reflection density value. The new density correcting parameter (gamma correcting parameter) created is transmitted to the original data processing section 102.

Figure 13:
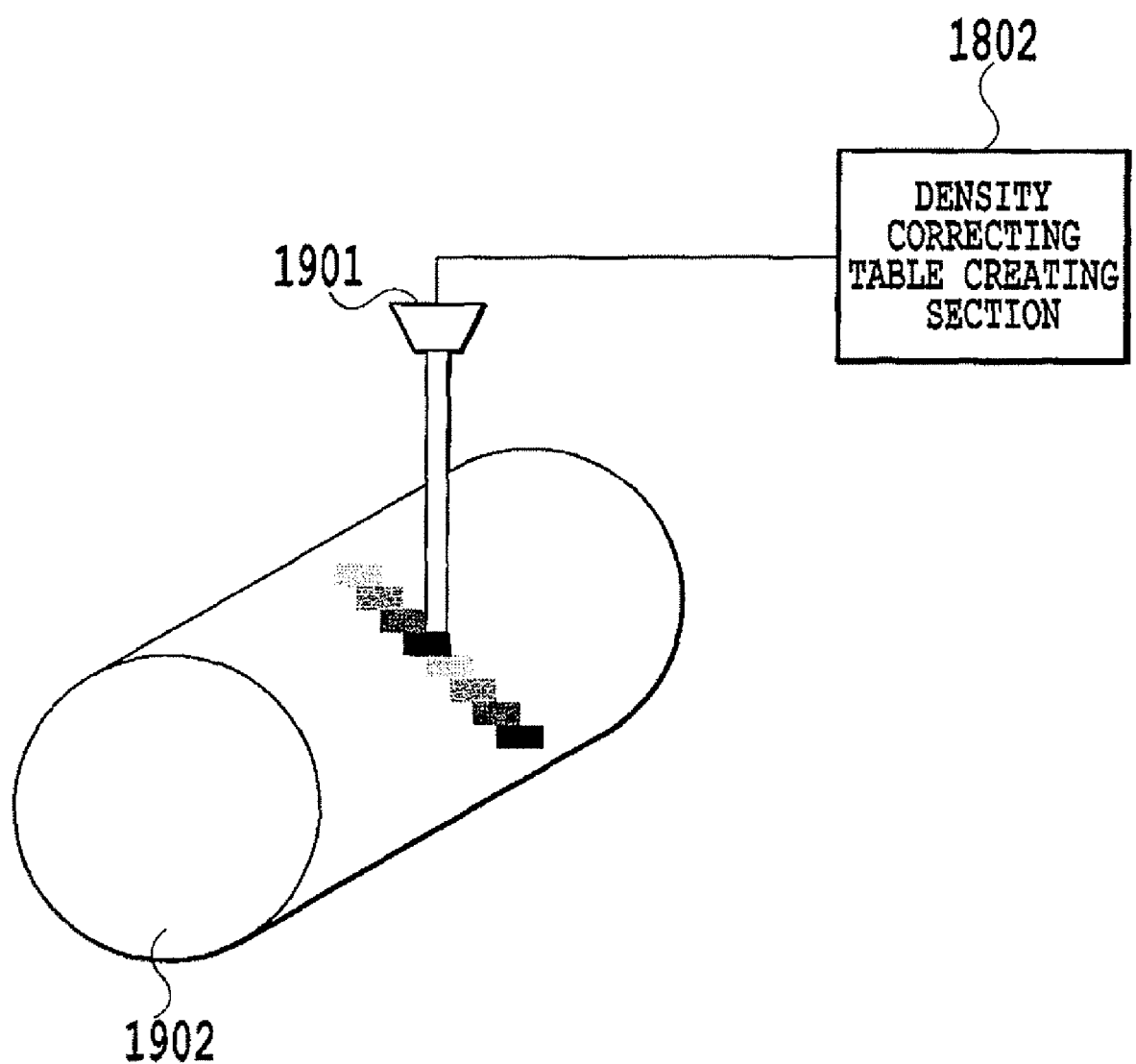
FIG. 13 is a view showing the constitution of a density measuring part shown in FIG. 12.
Figure 14:
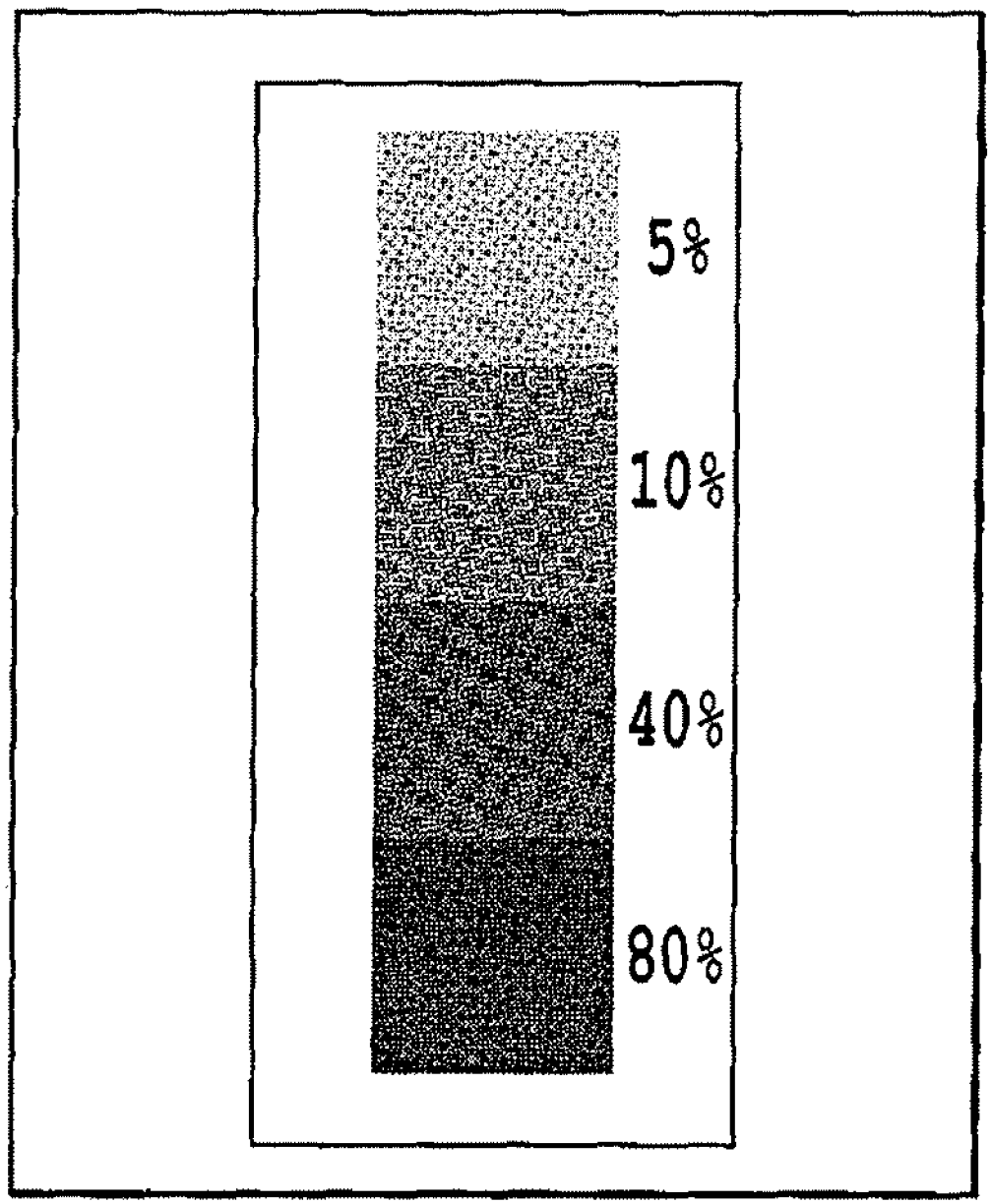
FIG. 14 is a view showing the constitution of a patch pattern having density gradation sequences of 5%, 10%, 40% and 80%

FIG. 13 shows the constitution of the density measuring section 1801. In FIG. 13, the data of a patch having gradation sequence values of 5%, 10%, 40% and 80% (FIG. 14) is formed for each color of CMYK on an intermediate transfer body 1902 constituting a development unit of the printing section 105. The reflection density thereof is measured by a sensor 1901. The measured reflection density value is transmitted to the correcting parameter creating section 1802. The processing of the density measuring section 1801 is automatically executed at a predetermined timing such as regular printing number of sheets, time, environmental change and part replacement of the printer.

Figure 15:
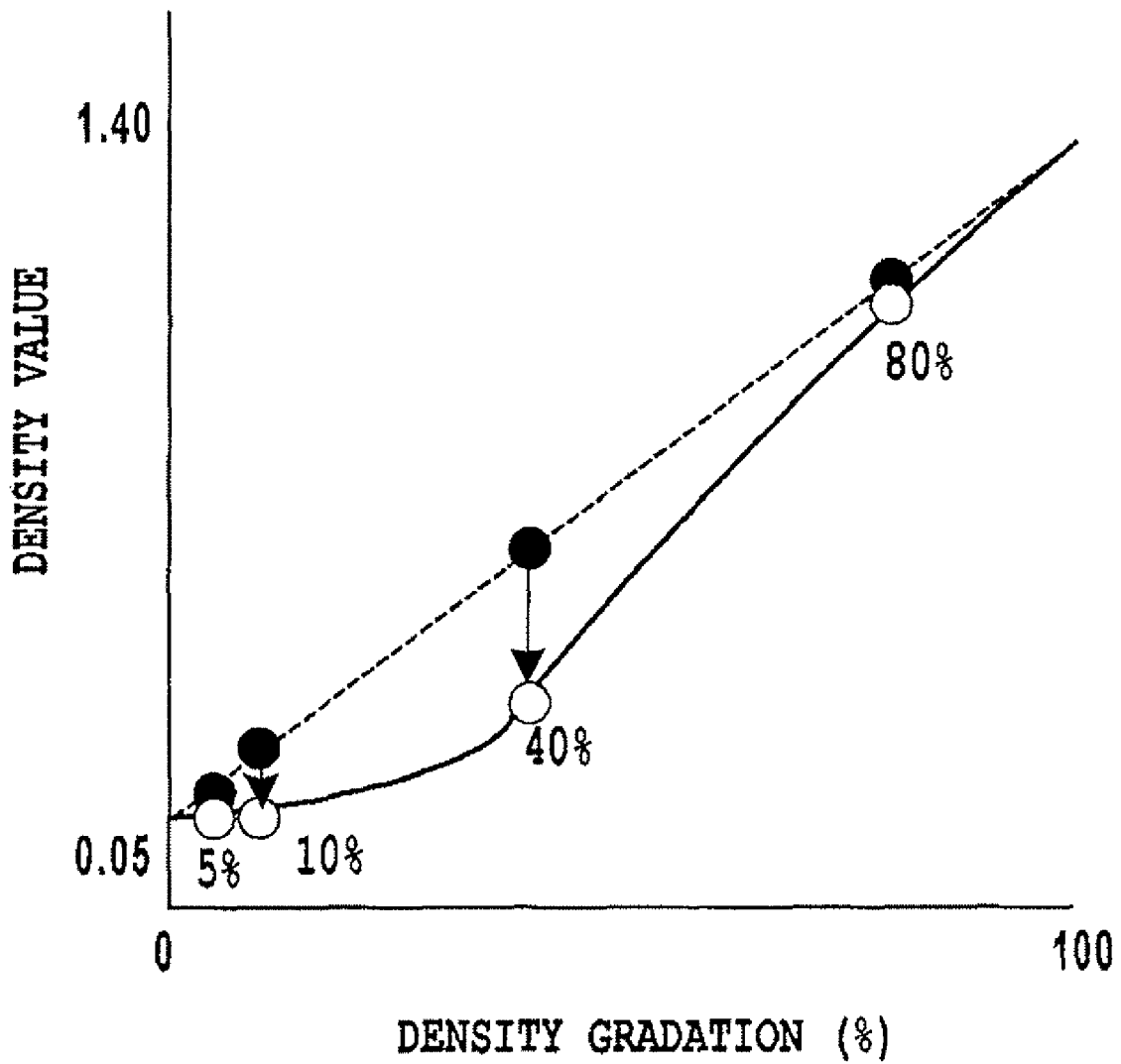
FIG. 15 is a view showing the density characteristic of a printer.
Figure 16:
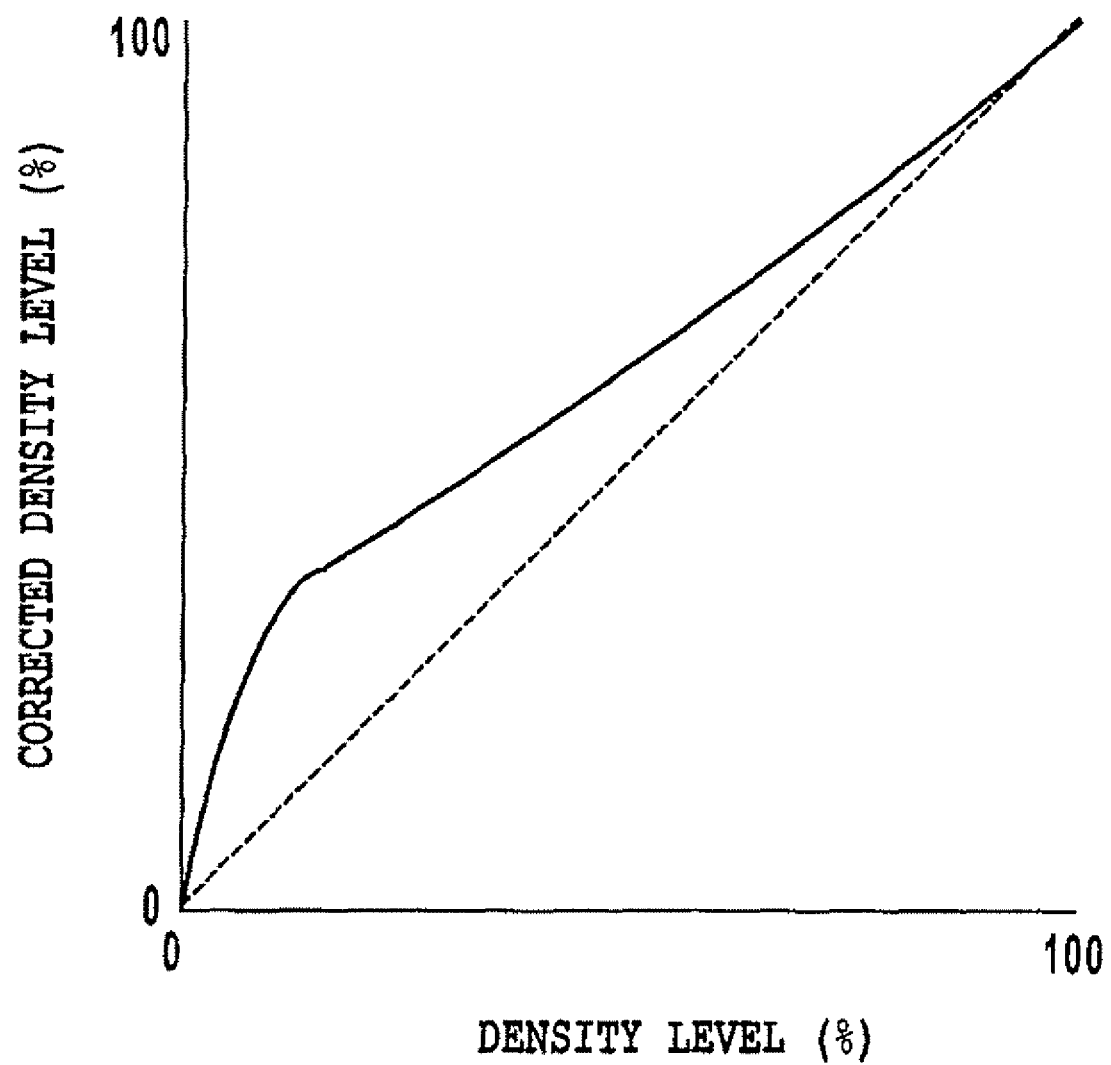
FIG. 16 is a view showing a density correcting parameter to the printer of FIG. 15.

Next, a method for creating the density correcting parameter in the density correcting parameter creating section 1802 will be described. FIG. 15 shows one example of the density characteristic of a printer. When the measured density values of the patches of 5%, 10%, 40% and 80% measured in the density measuring section 1801 are respectively the reflection density values of the white point in FIG. 15, the density characteristic of the printer at that time becomes the density characteristic of a solid line. A dashed line shows an ideal density characteristic (linear characteristic) as desired. When the density correcting parameter which becomes the ideal density characteristic (dashed line of FIG. 15) is created, the correcting characteristic is shown in the solid line of FIG. 16.

The original data processing section 102 corrects (converts) gradation sequence value of the input original image after being converted into CMYK data by using the density correcting (gamma correcting) parameter created in the density correcting parameter creating section 1802. Thereby, the color fluctuation or the like of the output original image to be printed is eliminated.

<Necessity of Processing for Notifying User that Density Adjustment of Copy-Forgery-Inhibited Pattern Image is Carried Out at the Time of Density Fluctuation of Printer>

FIG. 1 is referred to again. Thus, when it turns out that density fluctuation of the printing section 105 occurs, the density value of each pixel of the input original image is corrected by using the new gamma correcting parameter generated in the density correcting section 106. By the adjustment of this density value, the input original image is formed on the sheet as expected even if density fluctuation of the printing section 105 occurs.

However, this gamma correcting for the density of the copy-forgery-inhibited pattern image 117 is not carried out. It is because the density correcting section 106 is a processing section for exchanging data with the manuscript data processing section 102, and is not a processing section for exchanging data with the copy-forgery-inhibited pattern image generation section 117.

Therefore, when the density fluctuation of the printing section 105 occurs, the copy-forgery-inhibited pattern image is directly affected by the density fluctuation of the printing section 105. That is, for example the image of the background part is very lightly formed on the sheet, and the image of the latent-mark part is to some extent darkly formed on the sheet. That is, the copy-forgery-inhibited pattern image is no longer the original copy-forgery-inhibited pattern image.

Further, even if this gamma correcting is carried out to the copy-forgery-inhibited pattern image 117, the copy-forgery-inhibited pattern image 117 is also directly affected by the density fluctuation of the printing section 105. This is because the density of the pixel which is originally 0 remains at 0 and the density of the pixel which is originally 255 remains at 255 even if the gamma correcting is carried out since the copy-forgery-inhibited pattern image 117 is already binary data (data of 0 or 255) at the time.

Therefore, in the first embodiment, when the density fluctuation of the printing section 105 occurs, the gamma value (density correcting parameter) used for the gamma correcting is reset. Furthermore, when the gamma value which is greatly different from the gamma value at the time of carrying out the density adjustment of the copy-forgery-inhibited pattern image last time needs to be newly set, it is constituted so that the density adjustment of the copy-forgery-inhibited pattern image is notified to the user.

The gamma value at the time of carrying out density adjustment of the copy-forgery-inhibited pattern image last time is based on the average density measurement result of the patches at the time of "creating processing of new gamma correcting parameter" carried out just before carrying out the density adjustment of the copy-forgery-inhibited pattern image last time.

<Processing for Notifying User that Density Adjustment of Copy-Forgery-Inhibited Pattern Image is Carried Out at the Time of Density Fluctuation of Printer>

Next, the notification processing at the time of the density fluctuation of the printer section (printing section 105) according to the first embodiment of the present invention will be described. The distinction of the density fluctuation of the embodiment is carried out on the basis of whether the density fluctuation amount of the printer becomes or exceeds a fixed value or not as described later in FIG. 19.

Figure 17:
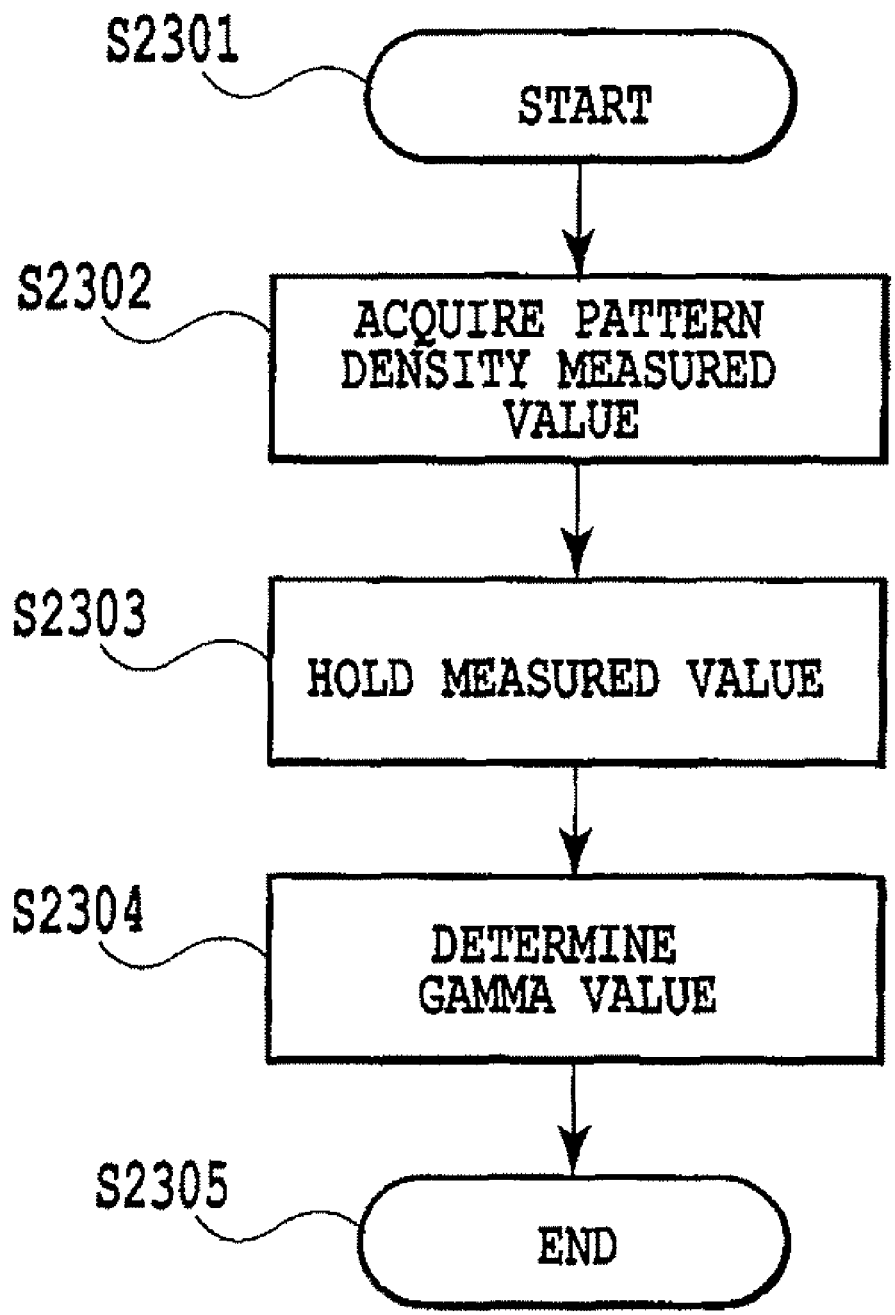
FIG. 17 is a flowchart showing processing for obtaining and holding the measured density value of a patch pattern at the time of copy-forgery-inhibited pattern density adjustment.
Figure 45:
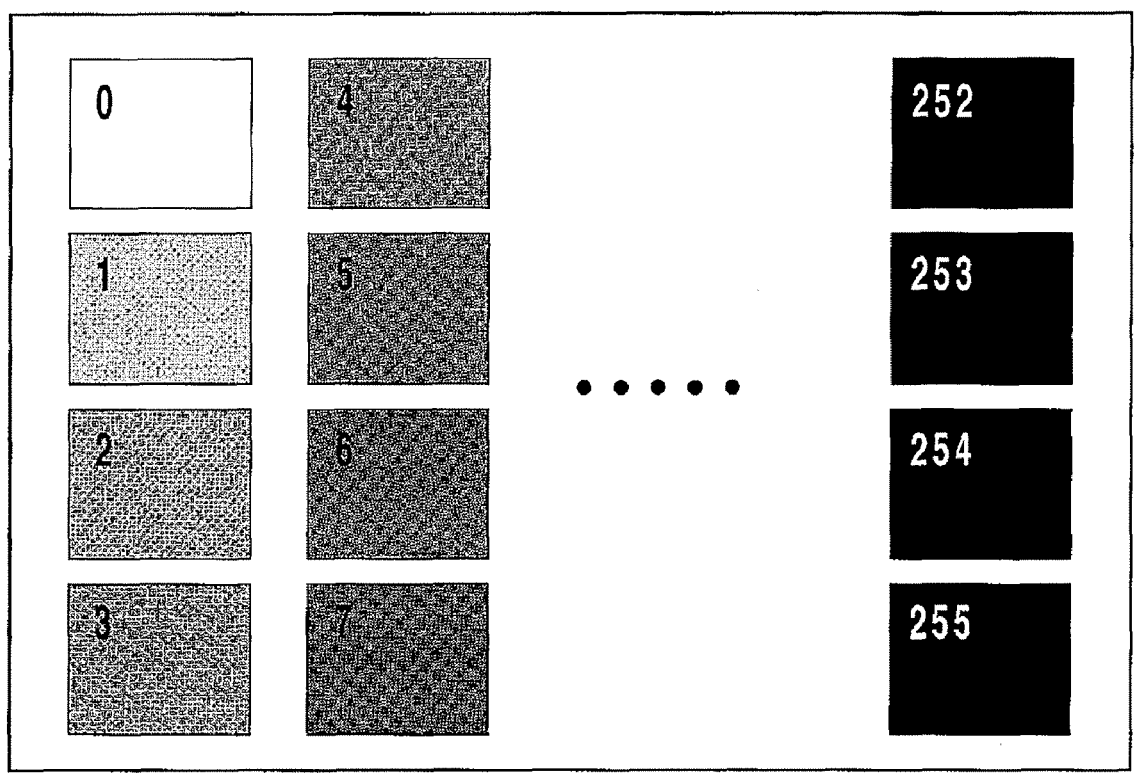
FIG. 45 is a view showing the data of a patch outputted in a density measuring part of a density correcting part.
Figure 47:
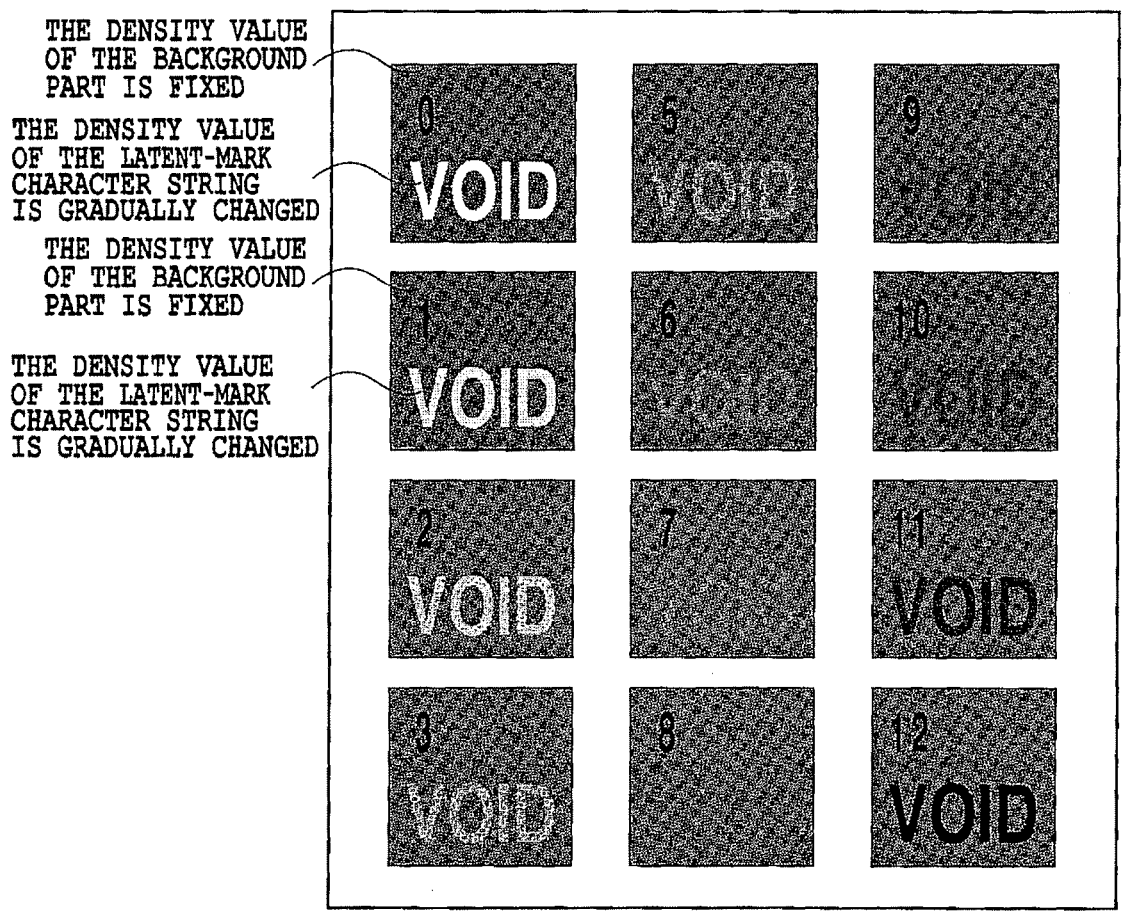
FIG. 47 is a view showing one example of a copy-forgery-inhibited pattern patch sheet.

FIG. 17 is a flowchart showing processing for forming patches for density adjustment of an original image on an intermediate transfer body, and obtaining and holding the reflection density values of the formed patches. First, at Step S2302, a plurality of patch data as shown in FIG. 45 are generated by the density measuring section 1801 of the density correcting section 106. The generated patch data are binarized. The binarized patch data are used to form the patches on the intermediate transfer body, and the average density of the formed patches is measured. Thus, the sensor which measures the average density of the patches on the intermediate transfer body has been conventionally known as patch detection or a patch detection sensor (for example, refer to Japanese Patent Application Laid Open No, Hei-05-2302).

Referring to the data of a plurality of patches shown in FIG. 45, the density values are respectively 0 to 255. The data of these patches are binarized using the dither matrix shown in FIG. 46 and are used to form the images of patches on the intermediate transfer body. The dither matrix shown in FIG. 46 is used when executing binarizing processing to the original image of multiple values and it can be understood that the dither matrix shown in FIG. 46 is apparently different from FIG. 3 and FIG. 5 of the dither matrix used when generating the copy-forgery-inhibited pattern image.

At Step S2303, the average density value of a plurality of patches acquired is stored in a memory. This stored average density value is used for judging the fluctuation of the output density of the printer, shown below.

At Step 2304, the gamma value (used for carrying out gamma correction of the density of the original image) is determined based on the acquired density measured value. Then, the processing is ended at Step S2305.

Figure 18:
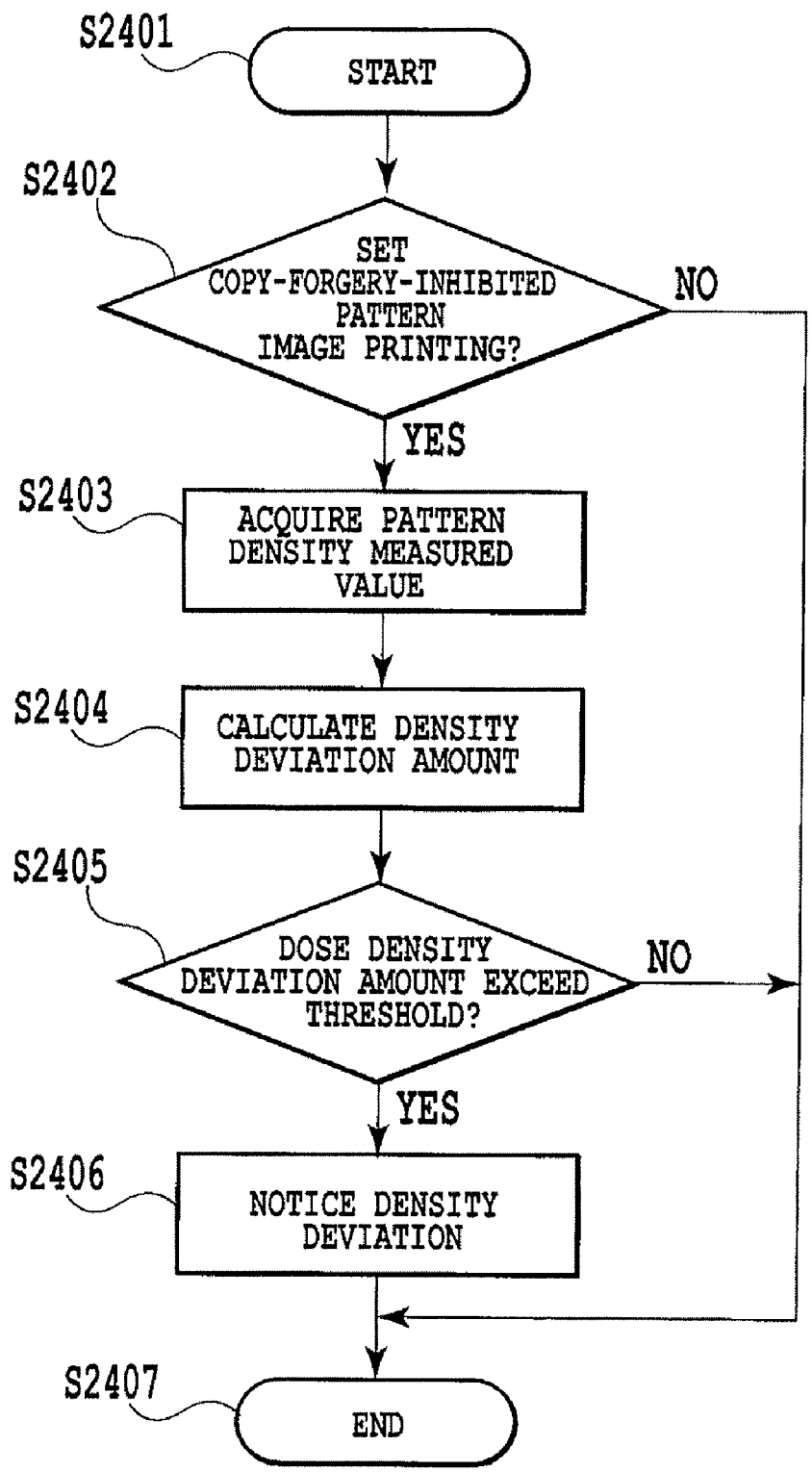
FIG. 18 is a flowchart showing the density fluctuation distinction processing of a copy-forgery-inhibited pattern image according to a first embodiment of the present invention.

FIG. 18 is a flowchart showing the procedure of density fluctuation judgment processing for a printer. This density fluctuation judgment processing is started when execution of printing is directed via the user interface or the like. Alternately, the processing is started when the print setting is carried out, for example, when the printing or the printing preview is selected by an application or the like. In this embodiment, when the print setting is carried out, this density fluctuation judgment processing is started (S2401).

First, it is judged whether the copy-forgery-inhibited pattern image printing is set to the print setting at Step S2402. When the copy-forgery-inhibited pattern image printing is set (when the printing is set for synthesizing and outputting the copy-forgery-inhibited pattern image to a so-called original image), the density output characteristic of the printer at the time is acquired at Step S2403. That is, the processing in FIG. 17 is carried out to measure the average density value of a plurality of patches and to obtain the measured result. A gamma value (gamma conversion parameter) is newly generated based on the measured result described above.

Next, at Step S2404, the measured density value acquired as described above at Step S2403 is compared with the density measured value obtained and held just before carrying out density adjustment of the copy-forgery-inhibited pattern image the previous time, and then the fluctuation amount of the output density of the printer from the previous time of the copy-forgery-inhibited pattern image density adjustment time until the time is calculated.

At Step S2405, it is judged whether the calculated density fluctuation amount exceeds the density region (the threshold of the density fluctuation amount) which becomes effective as the copy-forgery-inhibited pattern image. When the density fluctuation amount exceeds the threshold of the density fluctuation amount, at Step S2406, the user is notified that the density of the copy-forgery-inhibited pattern image may be inappropriate as the copy-forgery-inhibited pattern image due to the density fluctuation. On the other hand, at Step S2405, when the density fluctuation amount is judged to be below the threshold of the density fluctuation amount, since the present copy-forgery-inhibited pattern density adjustment is contained in an appropriate density region, the processing is ended (Step S2407). At Step S2401, when the copy-forgery-inhibited pattern image printing is not set, the processing is also ended (Step S2407).

Figure 19:
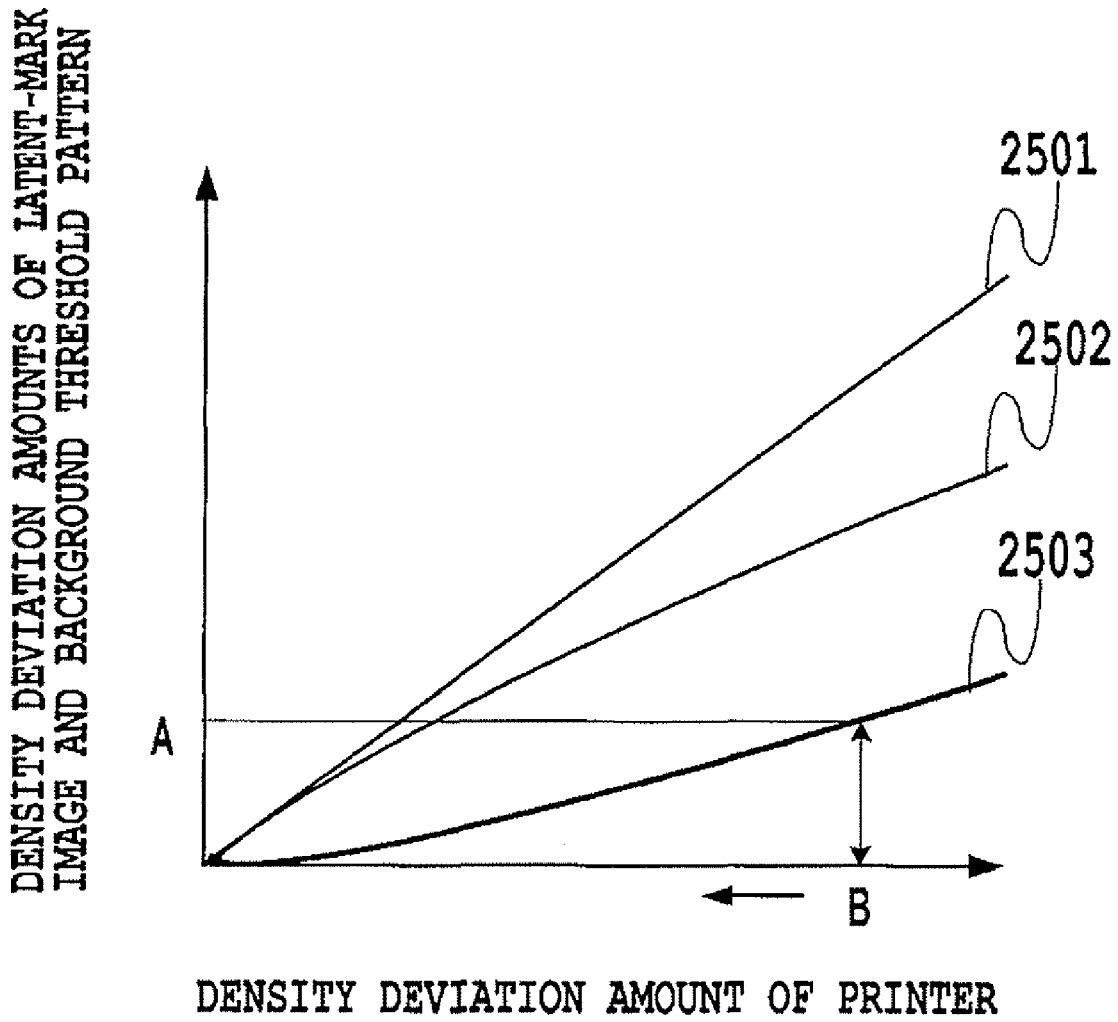
FIG. 19 is a view showing the density fluctuation characteristics of a latent-mark threshold pattern and background threshold pattern determined by the copy-forgery-inhibited pattern density adjustment when the density of a printer is fluctuated.

FIG. 19 describes the above threshold of the density fluctuation amount. FIG. 19 shows the density deviation characteristics of the latent-mark threshold pattern and background threshold pattern when the density of the printer is fluctuated according to the engine characteristic and printing environment of the printer. Numeral 2501 designates the density deviation characteristic of the latent-mark threshold pattern, and reference numeral 2502 designates the density deviation characteristic of the background threshold pattern. Numeral 2503 designates the difference in the density deviation of the latent-mark threshold pattern and background threshold pattern.

When the density characteristic of the printer is fluctuated, referring to the latent-mark threshold pattern and background threshold pattern set so that the reflection densities match by the copy-forgery-inhibited pattern density adjustment, the deviation amount of the reflection density of the latent-mark threshold pattern does not become the same as that of the background threshold pattern due to the difference in the dither matrices. Therefore, the reflection density difference occurs between the latent-mark threshold pattern and the background threshold pattern. If the difference in the reflection density capable of being visually distinguished is set to A in FIG. 19, the density fluctuation amount B (FIG. 19) or less of the printer in which the reflection density difference is less than A is the density region which becomes effective as the copy-forgery-inhibited pattern image, and the density fluctuation amount B becomes the threshold of the density fluctuation amount. When the fluctuation amount of the reflection density of the printer exceeds B, the difference between the densities of the latent-mark threshold pattern and background threshold pattern may exceed A, and thereby an appropriate copy-forgery-inhibited pattern image cannot be generated.

Figure 20:
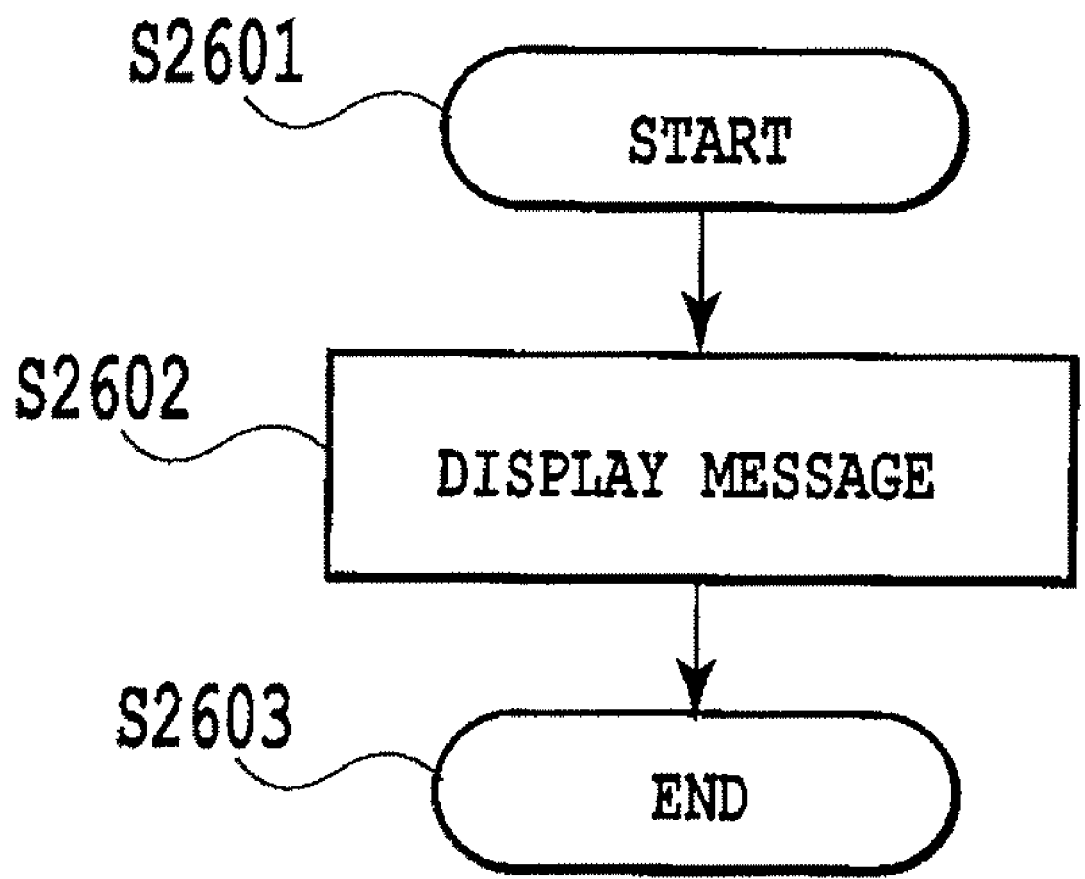
FIG. 20 is a flowchart showing a copy-forgery-inhibited pattern density notification processing according to the first embodiment of the present invention.

FIG. 20 is a flowchart showing the procedure of the notification processing of density fluctuation of this embodiment.

The notification that the copy-forgery-inhibited pattern density should be adjusted is started when it is judged that the density fluctuation of the printer exceeds a predetermined value in the density fluctuation amount distinction processing of the printer described in FIG. 18 (Step S2601), and the message shown in FIG. 21 is displayed at Step S2602. Thereby, the user is notified that the copy-forgery-inhibited pattern image may have an inappropriate density due to the density fluctuation. The message may be displayed on a display of a terminal operated by the user, a panel of a printer which carries out printing or a system administrator's display.

First Modification 1 of First Embodiment

Figure 22:
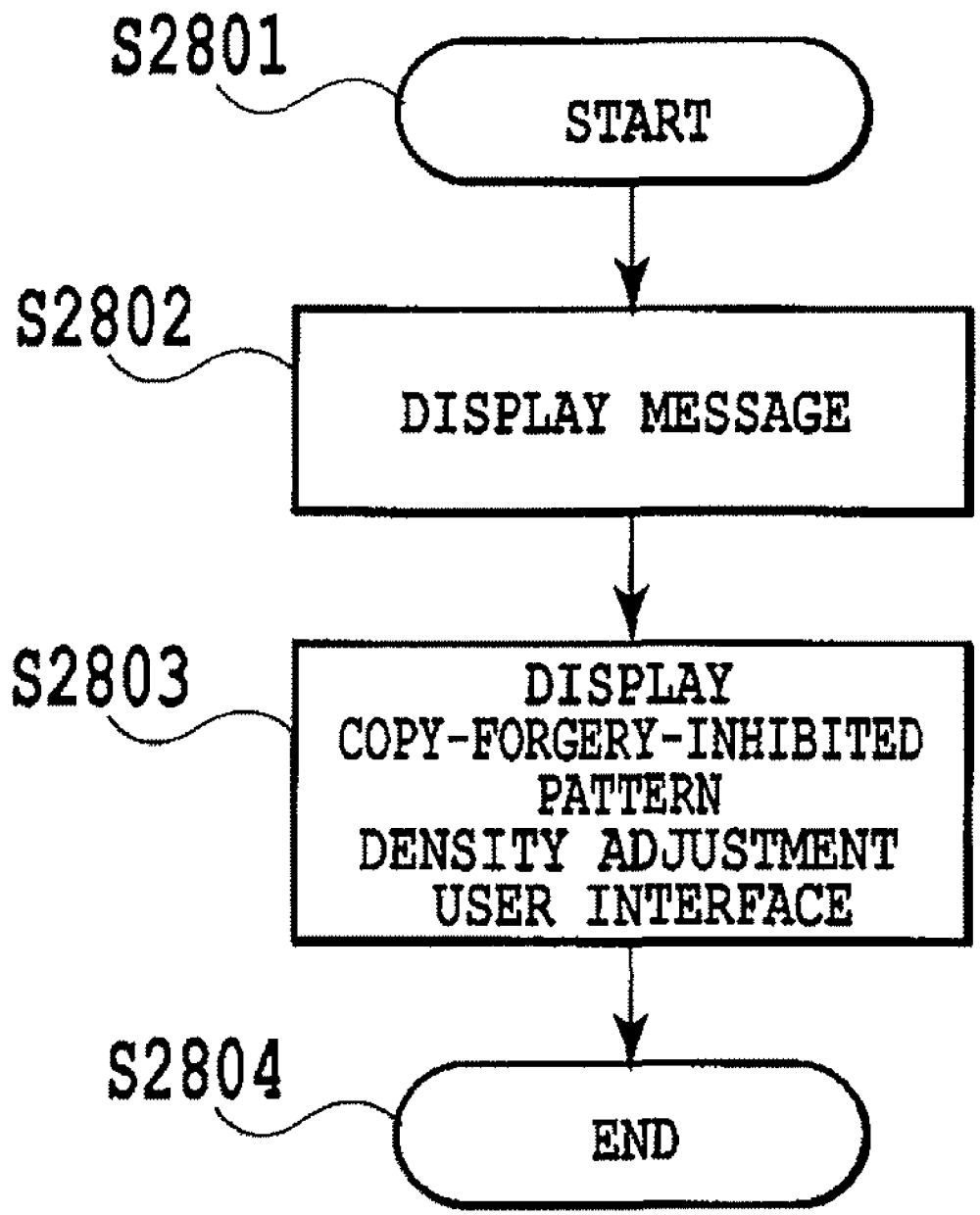
FIG. 22 is a flowchart showing the procedure of a copy-forgery-inhibited pattern density notification for urging a copy-forgery-inhibited pattern density adjustment according to a first modification of the first embodiment.

FIG. 22 is a flowchart showing copy-forgery-inhibited pattern density adjusting suggesting notification processing for suggesting copy-forgery-inhibited pattern density adjustment, as another copy-forgery-inhibited pattern density notification processing.

This copy-forgery-inhibited pattern density adjusting suggesting notification processing is started (Step S2801) also when it is judged that the density fluctuation of the printer exceeds a predetermined value in the density fluctuation amount judgment processing of the printer described in FIG. 18, and the message shown in FIG. 21 is displayed at Step S2802. Thereby, the user is notified that the copy-forgery-inhibited pattern image may have an inappropriate density due to the density fluctuation of the printer. At Step S2803, the user interface of the copy-forgery-inhibited pattern density adjustment shown in FIG. 23 is displayed, then the user is suggested to execute a copy-forgery-inhibited pattern density adjusting function, and the processing is ended (Step S2804). Thereby, the user can carry out a test sheet printing and the readjustment of the copy-forgery-inhibited pattern density via the user interface of the displayed copy-forgery-inhibited pattern density adjustment.

Second Modification of First Embodiment

Figure 24:
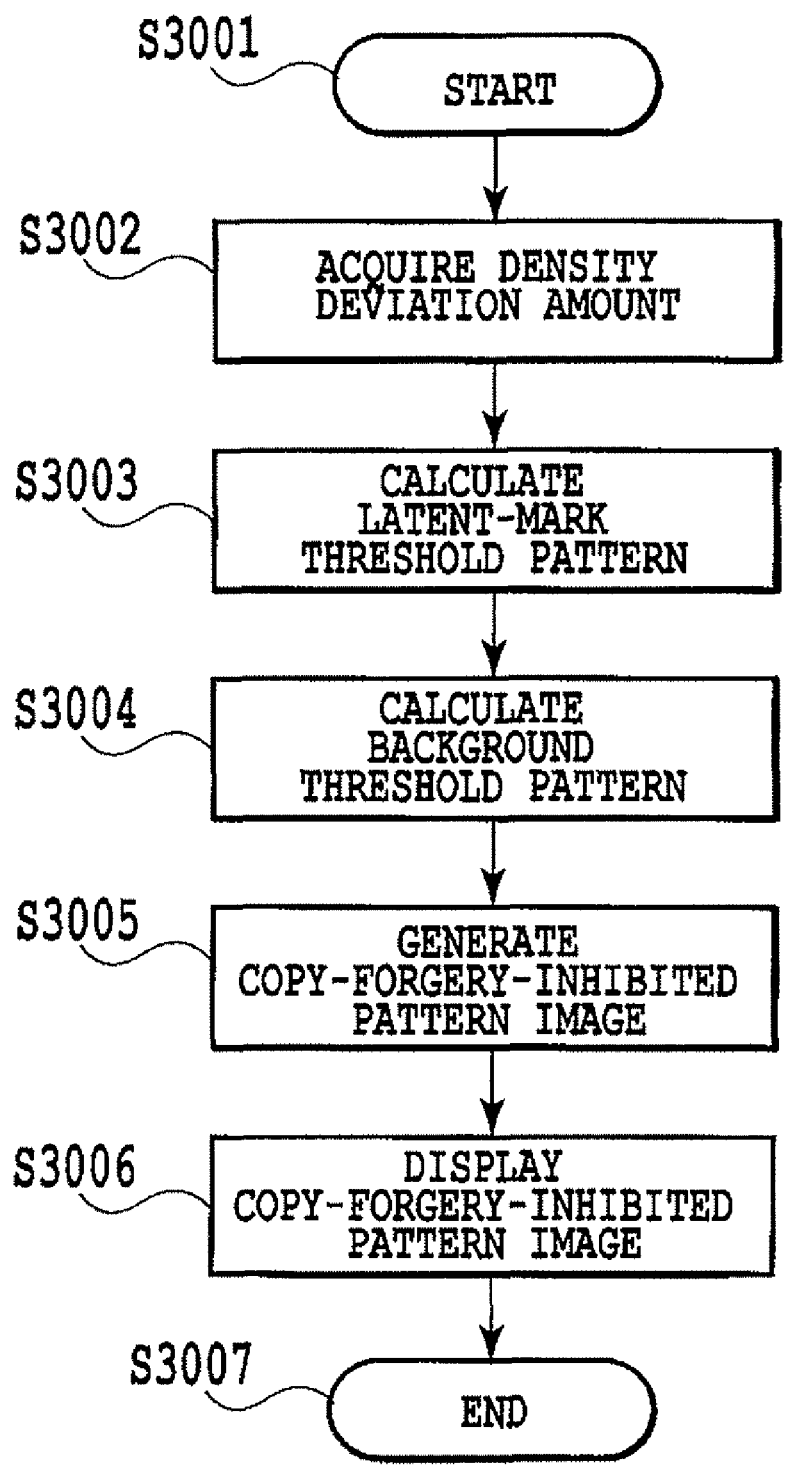
FIG. 24 is a flowchart showing a copy-forgery-inhibited pattern density notification processing for displaying an image picture of a copy-forgery-inhibited pattern image according to a second modification of the first embodiment.
Figure 25:
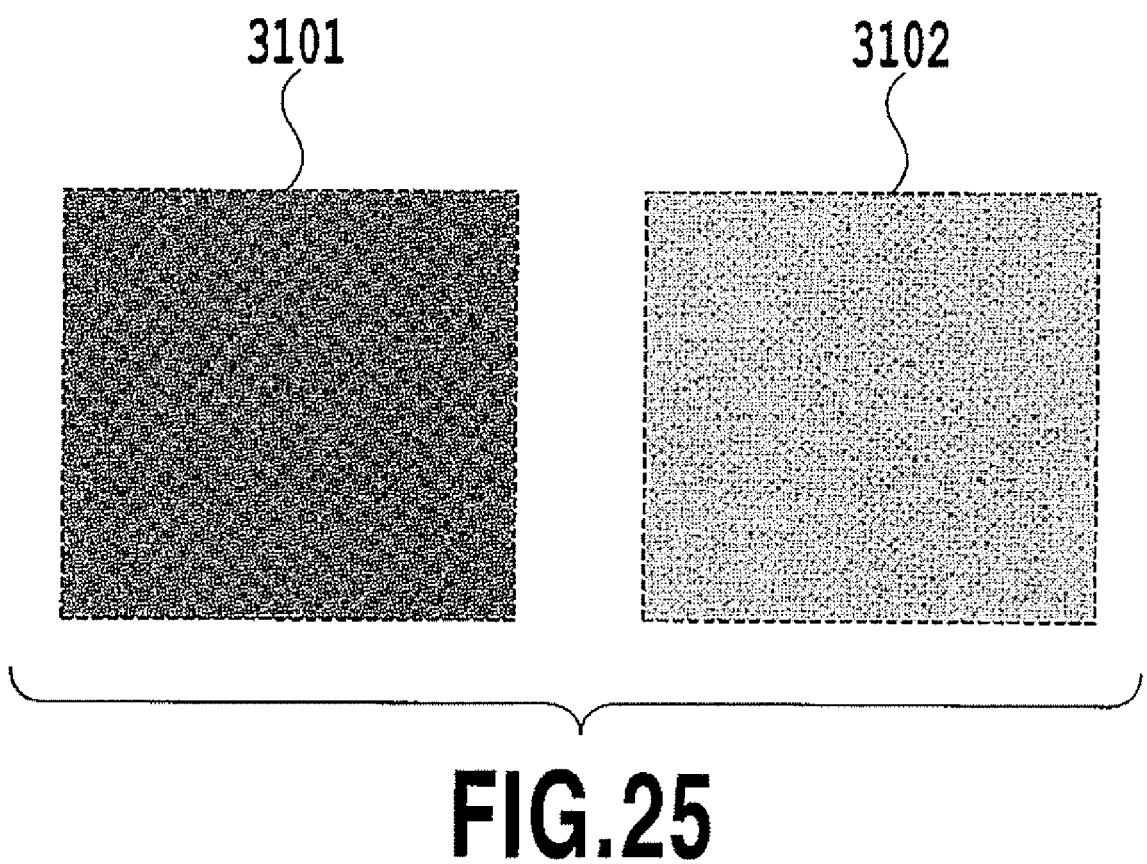
FIG. 25 is a view showing image pictures of the density of the latent-mark threshold pattern and density of the background threshold pattern according to the second modification.

FIG. 24 is a flowchart showing the procedure of another copy-forgery-inhibited pattern density notification processing. In the processing shown in FIG. 24, the image picture of the copy-forgery-inhibited pattern image at the time is displayed. This copy-forgery-inhibited pattern density notification processing is also started when it is judged that the density of the copy-forgery-inhibited pattern image is fluctuated in the copy-forgery-inhibited pattern density fluctuation judgment (Step S3001). The density fluctuation amount calculated by the copy-forgery-inhibited pattern image density judgment processing at Step S3002 is acquired. Furthermore, the density fluctuation amount of the latent-mark threshold pattern is calculated from the density fluctuation amount and the density deviation characteristic of the latent-mark threshold pattern due to the density fluctuation shown in FIG. 19 at Step S3003. The density (3101 of FIG. 25) of the latent-mark threshold pattern at the time is calculated by adding the density deviation amount of the latent-mark threshold pattern to the latent-mark threshold pattern determined in the copy-forgery-inhibited pattern density adjusting function. At Step S3004, the density fluctuation amount of the background threshold pattern is similarly calculated from the density fluctuation amount and the density deviation characteristic of the background threshold pattern due to the density fluctuation shown in FIG. 19. The background threshold pattern density at the time (3102 of FIG. 25) is calculated by adding the density deviation amount of the background threshold pattern to the background threshold pattern determined in the copy-forgery-inhibited pattern density adjusting function. In this case, the latent-mark threshold pattern and the background threshold pattern express the density with the density value (for example, gray value of 0 to 255 levels) on the display.

Figure 26:
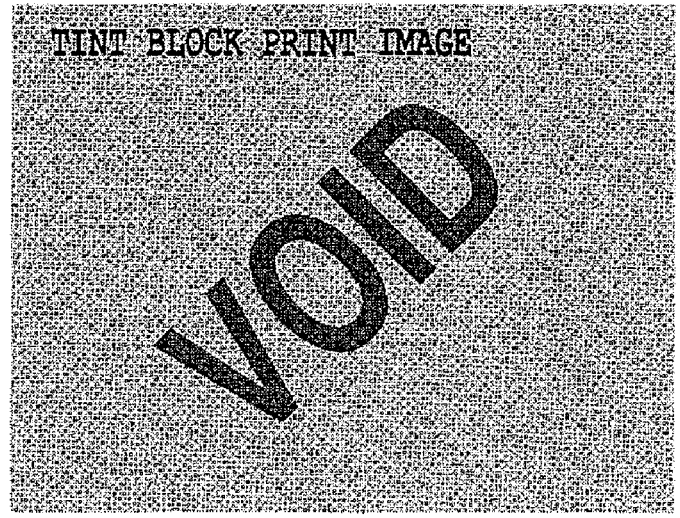
FIG. 26 is a view showing the image picture of the copy-forgery-inhibited pattern image due to the latent-mark threshold pattern and background threshold pattern displayed by the processing of FIG. 26.

Next, an image picture (FIG. 26) of the copy-forgery-inhibited pattern image is generated by using the latent-mark threshold pattern and background threshold pattern at the time of calculation at Step S3005, and the image picture generated at Step S3006 is displayed on the display of the terminal operated by the user. Thereby, the user is notified that the copy-forgery-inhibited pattern image has an inappropriate density due to the density fluctuation.

As described above, according to this embodiment, when the density difference between the latent-mark threshold pattern and background threshold pattern set by the copy-forgery-inhibited pattern density adjusting function is changed due to the density fluctuation of the printer, and the copy-forgery-inhibited pattern image has an inappropriate density, the content of inappropriateness is notified to the user. Thereby, the user can check whether the present copy-forgery-inhibited pattern image is appropriate or not. As a result, useless printing, confirmation work and operation due to an unnecessary test sheet or copy-forgery-inhibited pattern density adjustment can be eliminated.

Second Embodiment

The density fluctuation judgment processing according to the second embodiment of the present invention judges whether the density adjusting value on the basis of the latent-mark is within the effective density range which changes according to the density fluctuation. The fundamental constitution of this embodiment is substantially the same as the one described in FIG. 1 to FIG. 7 of the first embodiment, and the description thereof is omitted.

Figure 27:
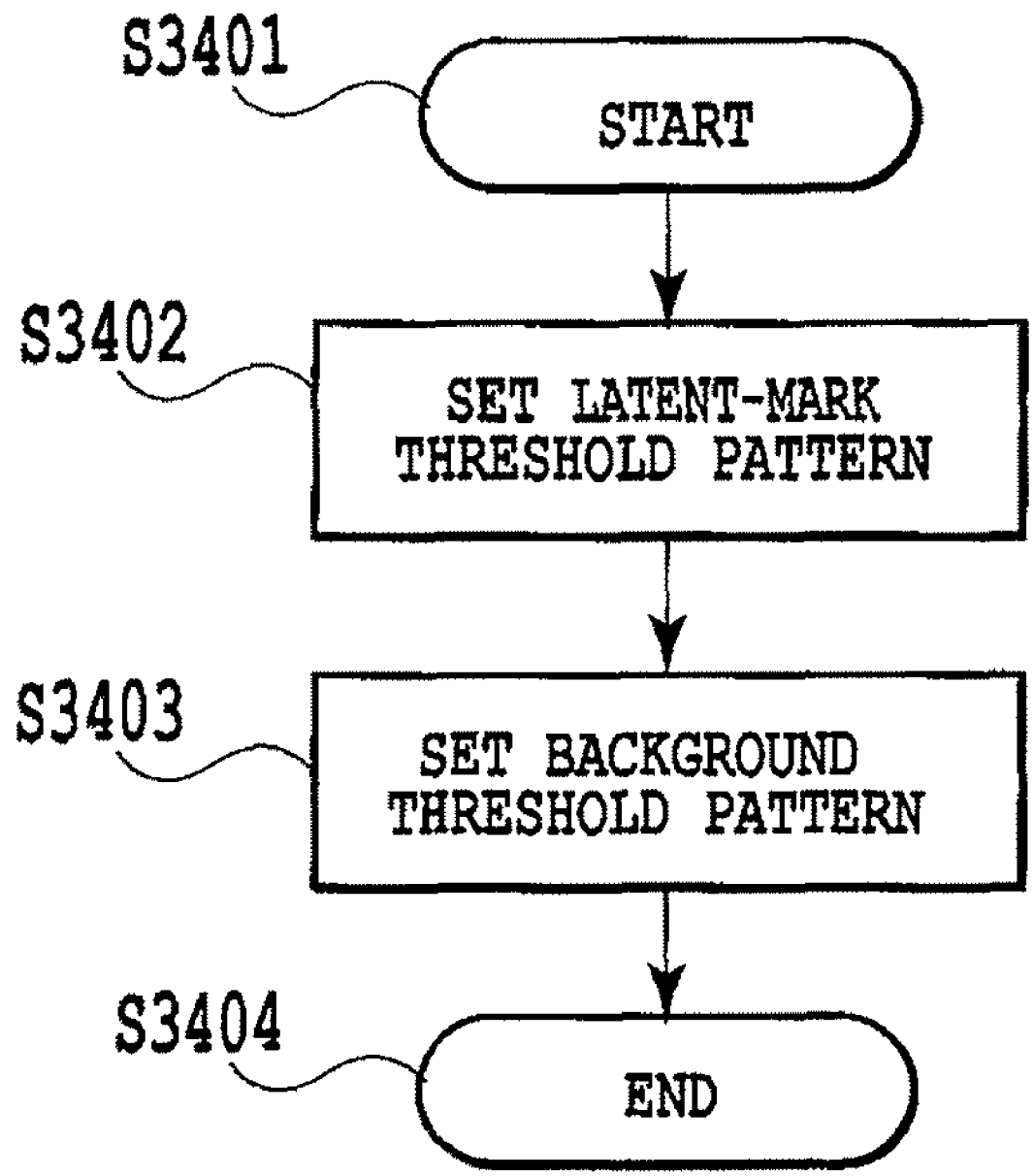
FIG. 27 is a flowchart showing a copy-forgery-inhibited pattern density adjustment processing according to the second embodiment of the present invention.

FIG. 27 is a flowchart showing the copy-forgery-inhibited pattern density adjustment processing according to the second embodiment. In this processing, the copy-forgery-inhibited pattern density adjustment is started according to the input from the user interface or the like at Step S3401. First, at Step S3402, the latent-mark threshold pattern is selected so that the density of the latent-mark part is within the density range in which the density of the latent-mark part is effective as the copy-forgery-inhibited pattern image, that is, the density range within which the latent-mark part remains at the time of copying and the background part disappears, and the selected latent-mark threshold pattern is set. Next, at Step S3403, the background threshold pattern constituting the background part having the same density as that of the latent-mark part composed of the latent-mark threshold pattern set at Step S3402 is selected and set through the test sheet printing, and the processing is ended (Step S3404).

Figure 28:
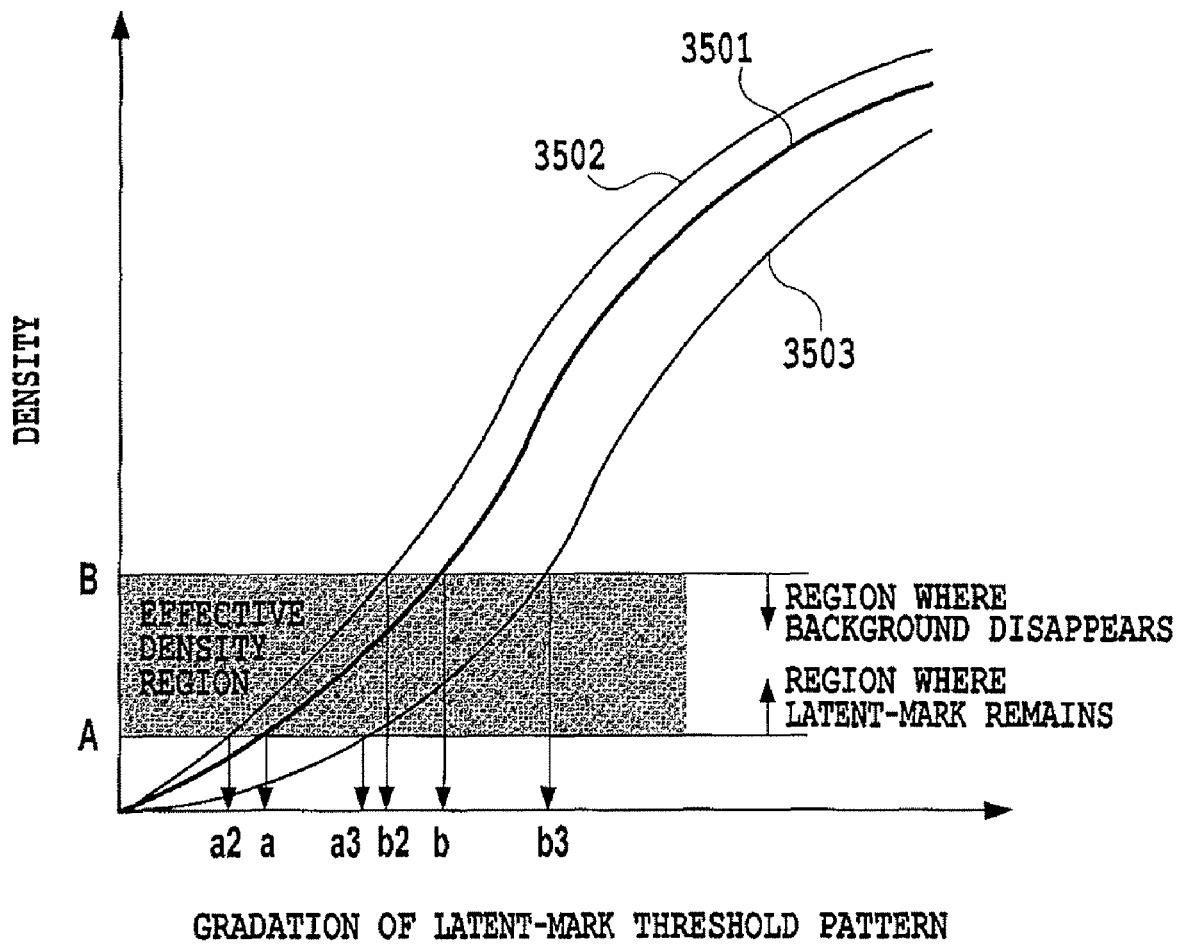
FIG. 28 is a view showing the gradation sequence characteristic of a latent-mark matrix of a latent-mark part.

FIG. 28 describes latent-mark pattern density adjustment processing for setting the latent-mark threshold pattern of Step S1402, and shows the gradation sequence characteristic of the latent-mark threshold pattern. When the minimum density in which the latent-mark part remains at the time of copying is A and the maximum density in which the background part disappears at the time of copying is B, the effective density region as the copy-forgery-inhibited pattern image has the density from A to B.

When the gradation sequence characteristic of the latent-mark threshold pattern shows the standard gradation sequence characteristic such as shown in the characteristic 3501, the effective latent-mark threshold pattern as the copy-forgery-inhibited pattern image is the latent-mark threshold pattern of the gradation sequence of a gradation value a showing the density A to a gradation value b showing the density B. Herein, the density or gradation value of the latent-mark threshold pattern is different (changed) according to different density output characteristic of the printer in relation to the dither matrix. Therefore, when the gradation sequence characteristic becomes the gradation sequence characteristic higher than the standard gradation sequence characteristic 3501, as a characteristic 3502, due to the density fluctuation of the printer, the effective latent-mark threshold pattern becomes the latent-mark threshold pattern of the gradation sequence of a gradation value a2 showing the density A to a gradation value b2 showing the density B. On the contrary, in the case of the gradation sequence characteristic lower than the standard, as the characteristic 3503, the effective latent-mark threshold pattern becomes the latent-mark threshold pattern of the gradation sequence of a gradation value a3 showing the density A to a gradation value b3 showing the density B. Thus, according to the fluctuation of the output density of the printer, the effective density region as the latent-mark threshold pattern of the copy-forgery-inhibited pattern image is changed.

Figure 29:
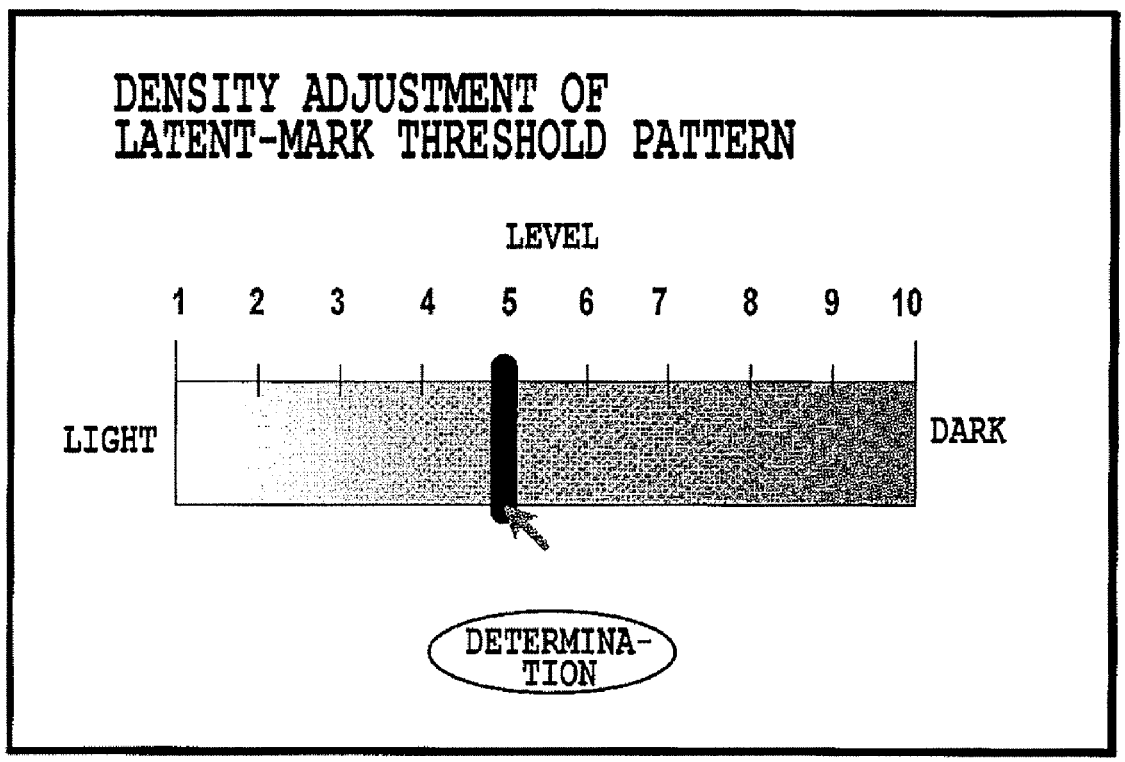
FIG. 29 is a view showing a user interface of a latent-mark pattern density adjusting means.

FIG. 29 shows a user interface for density adjustment of a latent-mark threshold pattern. The density of the latent-mark part is divided into a plurality of steps from light density to dark density, and the user selects the density of the latent-mark part having a desirable copy-forgery-inhibited pattern image according to the intended use. The latent-mark threshold pattern corresponding to the selected density step is set as the latent-mark threshold pattern of the latent-mark part of the copy-forgery-inhibited pattern image. The density step is divided into ten steps (level 1 to level 10), the level 1 of the lightest density corresponds to the latent-mark threshold pattern of the minimum gradation value a2 for the effective density region in the case of the gradation sequence characteristic 3502 in which the density shown in FIG. 28 becomes high. The level 10 of the darkest density corresponds to the latent-mark threshold pattern of the maximum gradation value b3 to the effective density region at the time of the gradation sequence characteristic 3503 in which the density is low. The latent-mark threshold patterns of the gradation sequences obtained by equally dividing the gradation value a2 to the value b3 into nine are respectively set to level 2 to level 9. Thereby, even if there is density fluctuation in the effective density region, the user can select the desirable density of the latent-mark part regardless of the change in the gradation sequence characteristic of the latent-mark threshold pattern due to the fluctuation.

Figure 30:
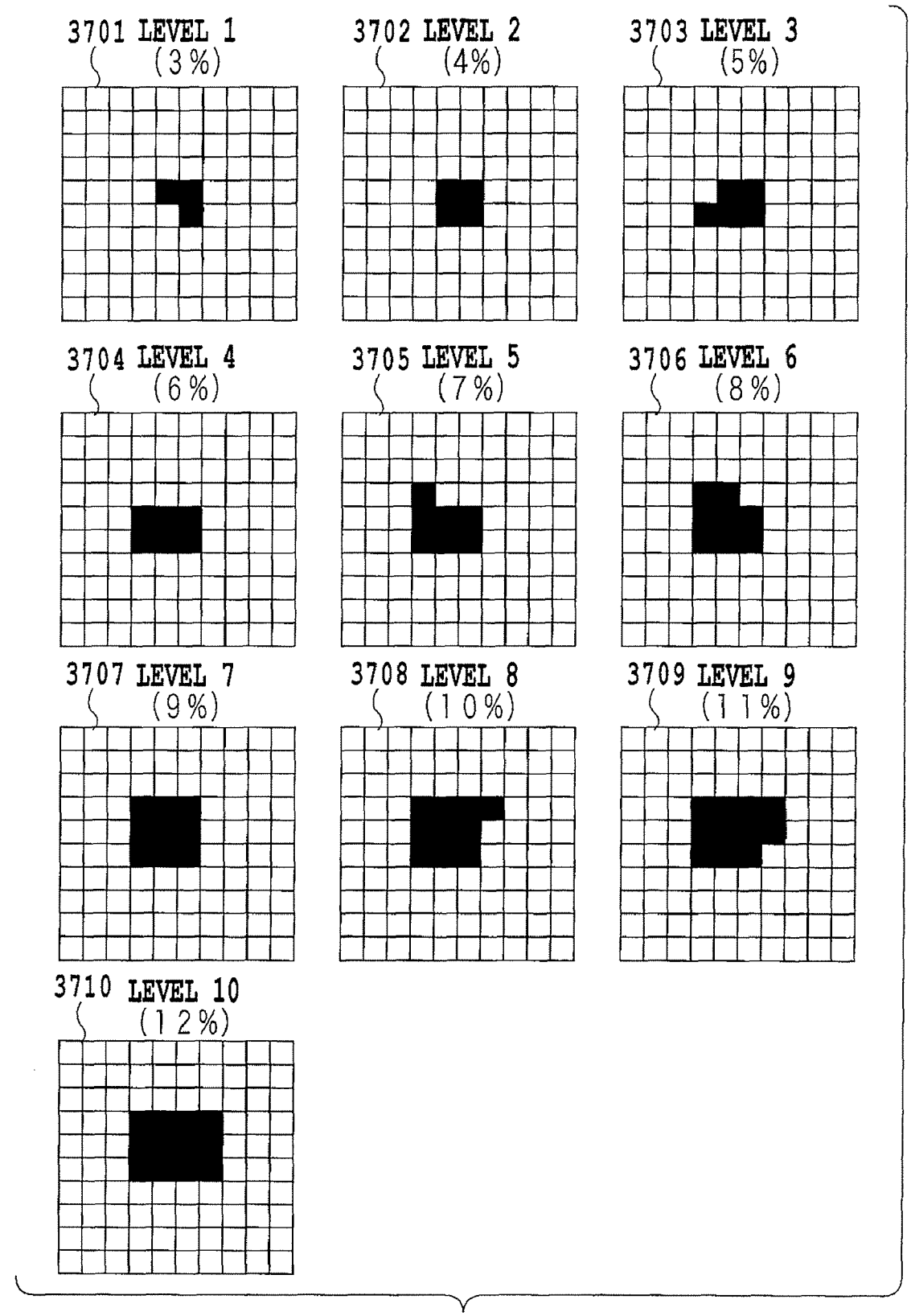
FIG. 30 is a view showing a latent-mark threshold pattern corresponding to each of the density steps (from level 1 to level 10).

FIG. 30 shows the latent-mark threshold pattern corresponding to each density step (the level 1 to level 10) shown in FIG. 29. The gradation value a2 is the black background threshold pattern of an area ratio 3% to the latent-mark dither matrix whose one side is 10 pixels, and the gradation value b3 is the latent-mark threshold pattern of an area ratio 12%. In this case, referring to the density step shown in FIG. 29, the levels 1, 2, 3, 4, 5, 6 and 7 are the latent-mark threshold patterns of 3% (3701), 4% (3702), 5% (3703), 6% (3704) and 7% (3705), respectively. Referring to the latent-mark threshold pattern, the level 6, 7, 8, 9 and 10 are respectively 8% (3706), 9% (3707), 10% (3708), 11% (3709) and 12% (3710).

Figure 31:
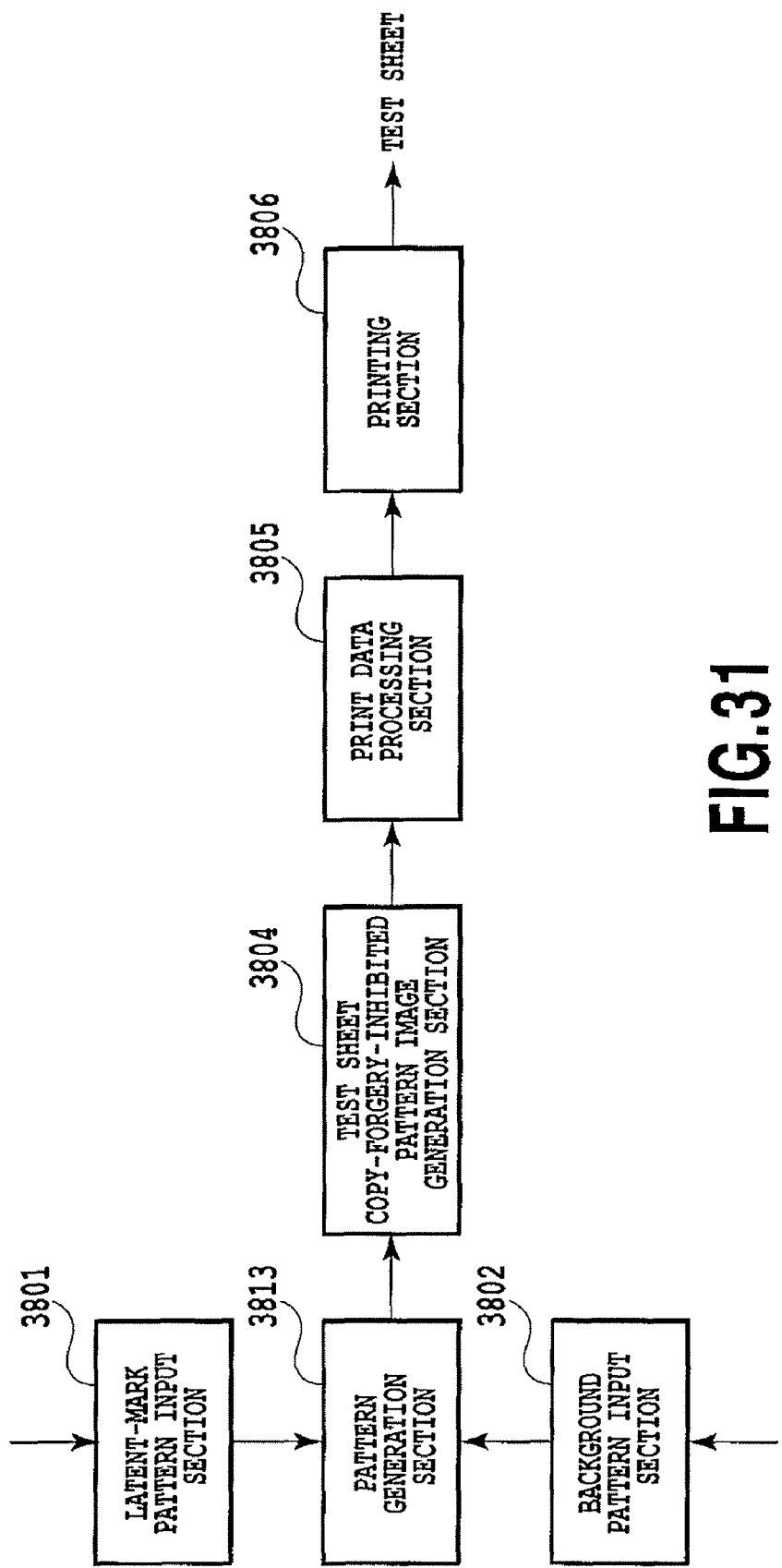
FIG. 31 is a block diagram showing a constitution for a copy-forgery-inhibited pattern density test sheet in a background threshold pattern density adjustment processing.

FIG. 31 is a block diagram showing a constitution for executing the copy-forgery-inhibited pattern density test sheet printing in the background threshold pattern density adjustment of Step S3403 (FIG. 27), and shows the same constitution as one shown in FIG. 8 referring to the first embodiment.

In FIG. 31, the latent-mark pattern input section 3801 carries out processing for reading the latent-mark threshold pattern set in the latent-mark pattern density adjustment section. The background pattern input section 3802 carries out processing for reading the setting information (background dither matrix) from the initial setting file storing the background pattern information.

The pattern generation section 3803 generates a pattern required for generating the copy-forgery-inhibited pattern based on the latent-mark threshold pattern input from the latent-mark pattern input section 3801 and the background dither matrix as the background pattern information input from the background pattern input section 3802. The pattern is output to the test sheet copy-forgery-inhibited pattern image generation section 3804. In the copy-forgery-inhibited pattern density test sheet print processing, the pattern generation section 3803 generates one latent-mark threshold pattern and a plurality of background threshold patterns. The test sheet copy-forgery-inhibited pattern image generation section 3804 generates the test sheet copy-forgery-inhibited pattern image based on the pattern input from the pattern generation section 3803. The details of the test sheet copy-forgery-inhibited pattern image generated by this test sheet copy-forgery-inhibited pattern image generation section 3804 will be described in detail later. The processing after the print data processing section 3805 is the same as the processing shown in FIG. 8, and the description thereof is omitted.

Next, description will be given about a test sheet which is generated in the test sheet copy-forgery-inhibited pattern image generation section 3804. In the sheet, a plurality of copy-forgery-inhibited pattern images (patches), in which the densities (gradation sequence) of the latent-mark part composed of the input latent-mark pattern and background part are changed, are two-dimensionally arranged. The copy-forgery-inhibited pattern having the light density to dark density of the background part is printed on the test sheet in which the density of the background part is gradually changed to the latent-mark part. The patch in which the density of the background part becomes almost the same as that of the latent-mark part exists in the sheet. The patch in which the density of the background part is almost the same as that of the latent-mark part becomes the copy-forgery-inhibited pattern density parameter (that is, the latent-mark threshold pattern and the background threshold pattern).

Figure 32:
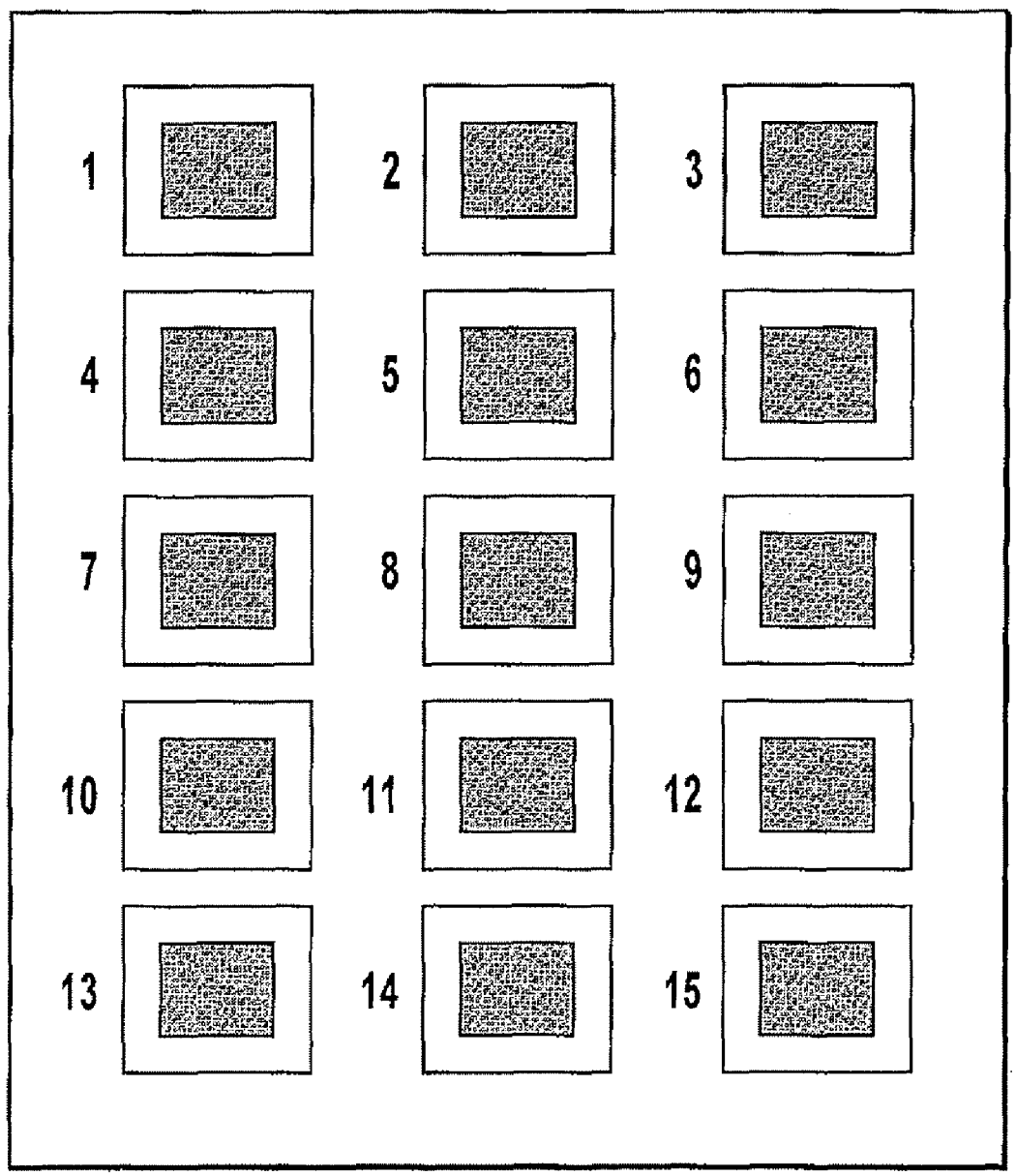
FIG. 32 is a view showing one example of a test sheet in which patch of a background part having a different density from that of the latent-mark part is arranged.

FIG. 32 shows one example of a test sheet in which patches of the latent-mark part and the background part having the different density are arranged. Each of the patches has a constitution reliably containing the latent-mark part and the background part. Referring to each of the patches in FIG. 32, the central part and the periphery part show the latent-mark part and the background part, respectively. The density of the background part is made to be dark at the numerical order attached to the patch (Numeral 1 designates the background part of the lightest density, and Numeral 15 designates the background part of the darkest density.). In the example shown in FIG. 32, the latent-mark background region specifying image specifying the latent-mark part and the background part has a square rectangular shape.

In the test sheet shown in FIG. 32, the density of the background part is changed in a direction from the left of the paper to the right and the following lower stage. The patch existing in the center of the paper is previously set so that the density of the background part is almost equal to that of the latent-mark part in consideration of the engine characteristic of the printer and the gradation sequence or the like of the dither matrix. Even when the density fluctuation due to the degradation of environment or engine performance exists at this time, the patch of which densities of the latent-mark part and background part are almost equal is easily found.

Figure 33:
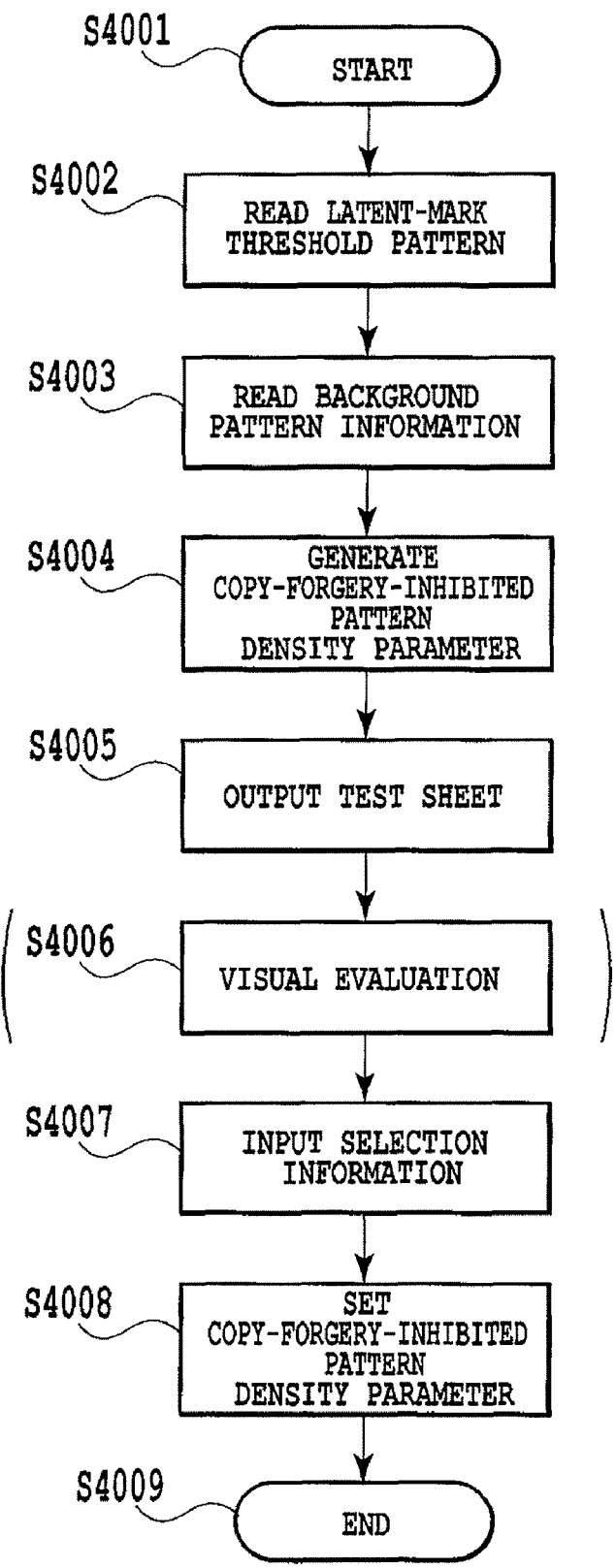
FIG. 33 is a flowchart showing a copy-forgery-inhibited pattern density setting processing.

FIG. 33 is a flowchart showing the procedure of the simplest test sheet, and is the same processing as the one shown in FIG. 11 according to the first embodiment.

At Step S4002, processing for reading the latent-mark threshold pattern set in the latent-mark pattern density adjustment section is carried out. Next, at Step S4003, processing for reading the setting information (background dither matrix) is carries out from the initial setting file storing the background pattern information.

Furthermore, at Step S4004, the copy-forgery-inhibited pattern density parameter for determining the latent-mark threshold pattern at the time of generating the copy-forgery-inhibited pattern image and the printing density of the background part is created based on the setting information input at Steps S4002 and S4003. In this embodiment, the copy-forgery-inhibited pattern density parameter created from the input setting information becomes the latent-mark threshold pattern and the background threshold pattern. Next, at Step S4005, the test sheet as shown in FIG. 32 is generated based on the copy-forgery-inhibited pattern density parameter input from Step S4004, and printed out by the printer. The subsequent processing is the same as the one shown in FIG. 11, and the description thereof is omitted.

Figure 34:
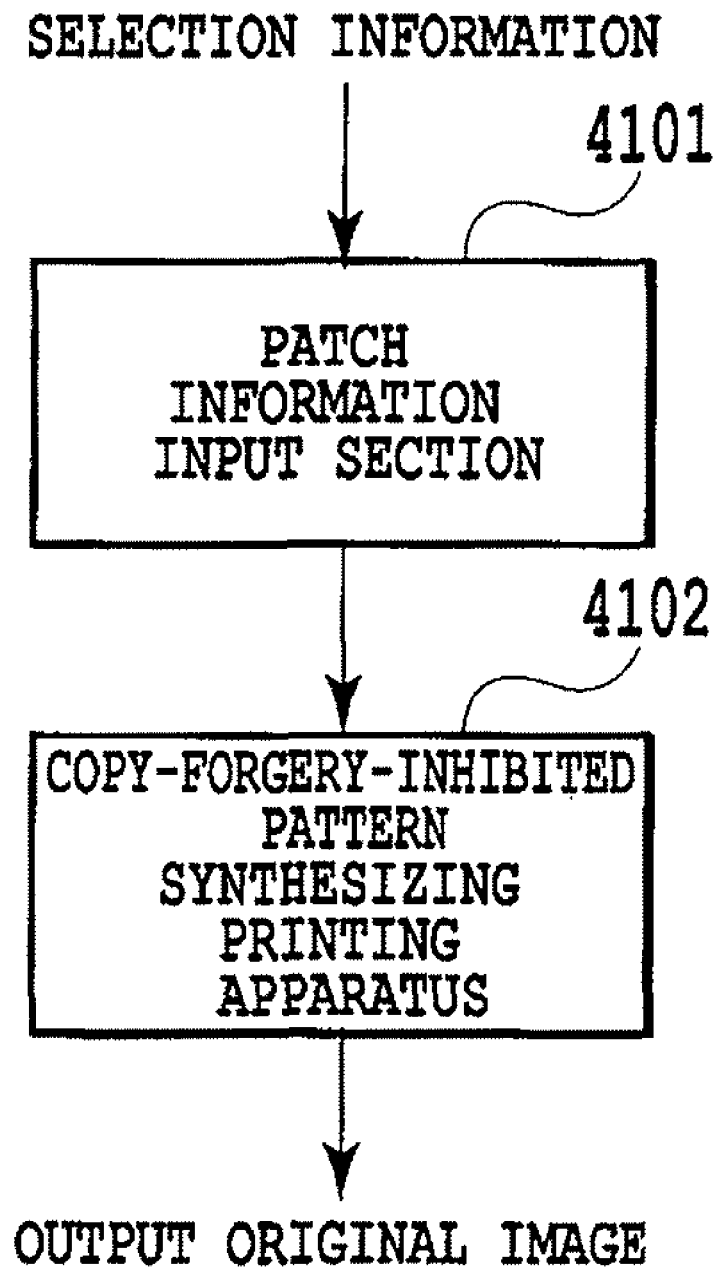
FIG. 34 is a view showing a copy-forgery-inhibited pattern constitution printer provided with a copy-forgery-inhibited pattern density adjusting function.

FIG. 34 shows the copy-forgery-inhibited pattern synthesizing printing apparatus provided with the copy-forgery-inhibited pattern density adjusting function, and a patch information input section 4101 is arranged in the preceding stage of the copy-forgery-inhibited pattern synthesizing printing apparatus (element shown by reference numeral 4102 of FIG. 34) shown in FIG. 1, like FIG. 10 according to the first embodiment.

The patch information input section 2101 inputs the latent-mark threshold pattern set in the latent-mark pattern density adjustment processing described above in the FIG. 27 or the like and the background threshold pattern similarly set in the background pattern density adjustment processing as the patch information via the user interface.

The copy-forgery-inhibited pattern synthesizing printing apparatus 4102 can generate the copy-forgery-inhibited pattern image based on the background threshold pattern and latent-mark threshold pattern input from the patch information input section 4101, synthesize the copy-forgery-inhibited pattern image and the input original image, and print out the output original.

As described above, referring to the second embodiment of the present invention, the latent-mark pattern density adjustment processing of the copy-forgery-inhibited pattern density adjusting function and the background pattern density adjustment processing are described. However, when the copy-forgery-inhibited pattern image is actually output by the printer, the copy-forgery-inhibited pattern image may have an inappropriate density by the density fluctuation of the printer regardless of such adjustment. For example, the latent-mark part may disappear at the time of copying, or the background part may remain conversely. Or, the balance of the densities of the latent-mark part and background part may be lost, such as a more conspicuous latent-mark part in the state of being printed. Even when there is a density fluctuation exceeding the effective density region of such a copy-forgery-inhibited pattern image in the printer, it is desirable to have the density of the optimal copy-forgery-inhibited pattern image. Therefore, in the embodiment, as described later, a latent-mark pattern density judgment processing for judging whether the latent-mark threshold pattern set at the time of setting the latent-mark pattern of the copy-forgery-inhibited pattern image shows an appropriate density is carried out.

<Latent-Mark Pattern Density Judgment and Notification Based on Judgment>

Figure 35:
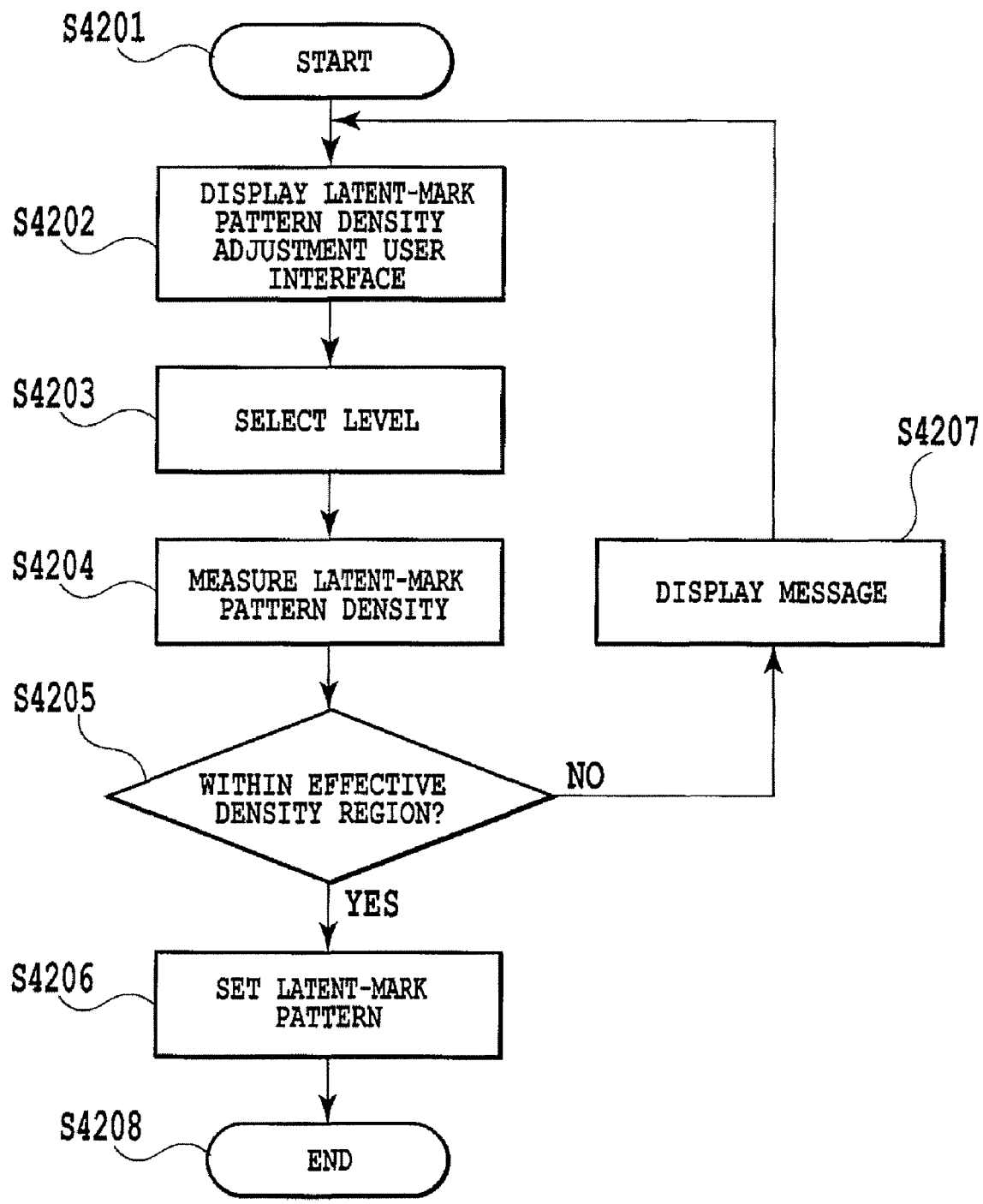
FIG. 35 is a flowchart showing a latent-mark pattern density judgment processing according to a second embodiment of the present invention.

FIG. 35 is a flowchart showing a latent-mark pattern density judgment processing according to a second embodiment of the present invention.

First, according to the input from the user interface or the like, a latent-mark pattern density judgment processing is started at Step S4201. Next, the user interface for the latent-mark pattern density adjustment shown in FIG. 29 is displayed at Step S4202. The input of the level selection in the level 1 to level 10 made by the user is received at Step S4203.

At Step S4204, the density shown by the latent-mark threshold pattern (FIG. 30) corresponding to the selected level is measured. The details of the latent-mark pattern density measurement will be described later. Next, at Step S4205 it is judged whether the measured density value of the latent-mark threshold pattern is within the effective density region of the copy-forgery-inhibited pattern image. The effective density region is the region of the densities A to B of FIG. 28 as already described.

When it is judged that the measured density value is inappropriate as the copy-forgery-inhibited pattern image density, that is, the measured density is not within the effective density region, a message (an example shown in FIG. 36 shows the case where the measured density value is lower than the effective density region) as shown in FIG. 36 is displayed at Step S4207. Thereby, the user can be notified that the level of the latent-mark pattern selected by the user has an inappropriate density as the copy-forgery-inhibited pattern image. When the message is displayed, and the user pushes an "OK" button 4301, the process returns to the processing of Step S4202. The message may be displayed on a display of a terminal operated by the user, on a panel of the printer for printing, or on a system administrator's display.

On the other hand, at Step S4205, when the measured density value is judged to be within the effective density region, the latent-mark pattern corresponding to the level selected at Step S4206 is set as the latent-mark pattern of the copy-forgery-inhibited pattern image, and the processing is ended (S4208).

Figure 37:
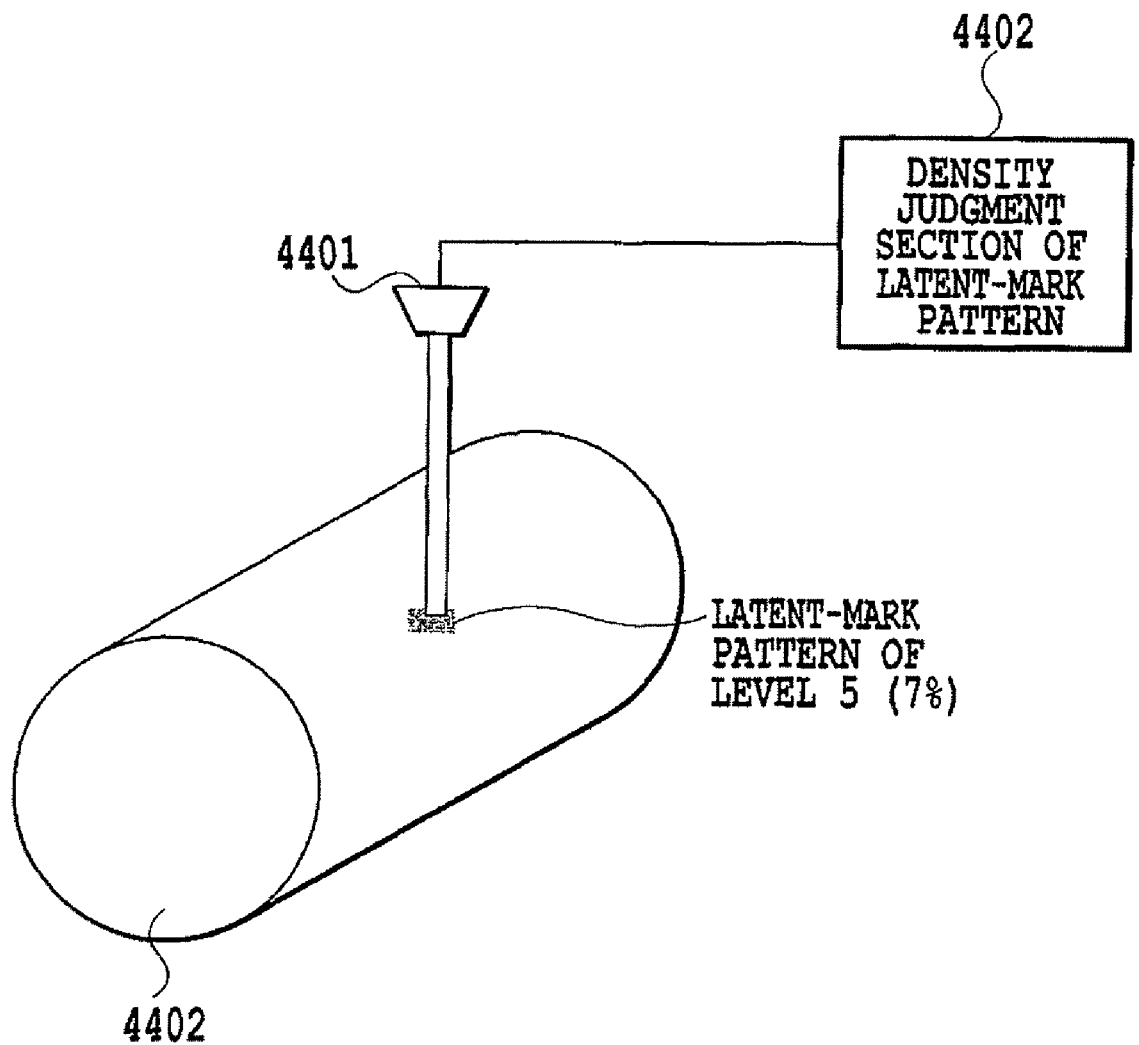
FIG. 37 is a view showing the constitution of a latent-mark pattern density measuring part.

Next, the latent-mark pattern density measurement of Step S4204 will be described. FIG. 37 shows a constitution for latent-mark pattern density measurement.

The latent-mark threshold pattern corresponding to the level selected at Step S4203, that is, the latent-mark pattern 3705 of FIG. 30 corresponding to the level 5 in the example shown in FIG. 29 is formed on a intermediate transfer body 4402 of a development unit of the printing section 105 shown in the FIG. 37, and the density is measured by means of a sensor 4401. The measured density value is transmitted to a latent-mark pattern density judgment section 4403.

First Modification of Second Embodiment

Figure 38:
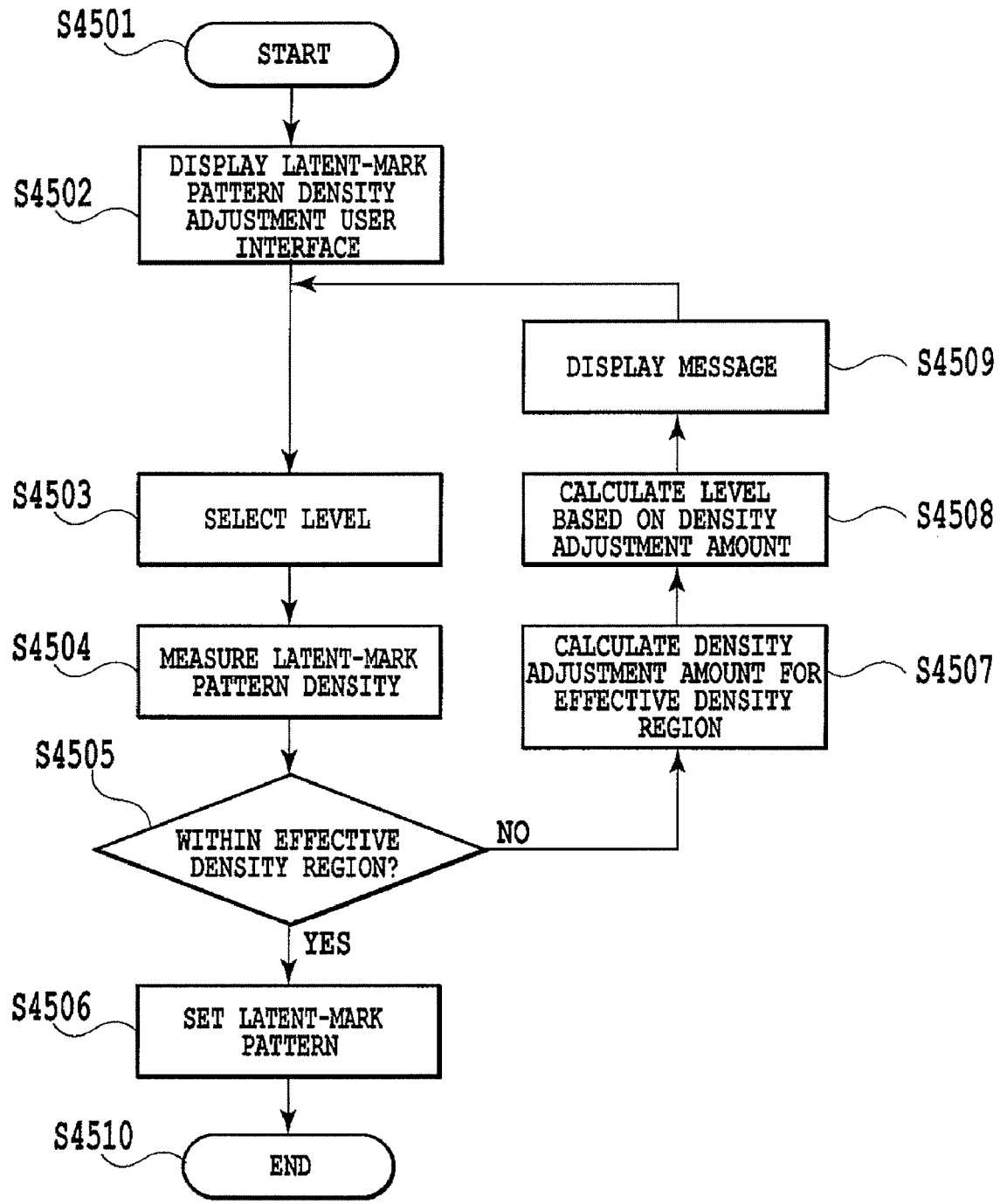
FIG. 38 is a flowchart showing a latent-mark pattern density judgment processing according to a first modification of the second embodiment.

FIG. 38 is a flowchart showing another example of the latent-mark pattern density judgment processing.

According to the input from the user interface or the like, latent-mark pattern density judgment processing is started at Step S4501. First, the user interface of the latent-mark pattern density adjustment shown in FIG. 29 at Step S4502 is displayed, and the input of the level selection in the level 1 to level 10 made by the user is received at Step S4503.

At Step S4504, the density of the latent-mark pattern (FIG. 30) corresponding to the selected level is measured. Next, at Step S4505, it is judged whether the measured density value of the latent-mark threshold pattern is within the effective density region of the copy-forgery-inhibited pattern image.

When the measured density value is not within the effective density region, at Step S4507, the density adjustment amount for the measured density value being within the effective density region as the copy-forgery-inhibited pattern image, for example, the density amount required for setting the measured density value to the density A in the case that the measured density value is lighter than the effective density region, is calculated. An adjusted level value (the number of levels of how many levels are reduced or increased from the selected level value) required for being within the effective density region from the density adjustment amount is calculated at Step S4508. In the example shown in FIG. 39, the number of the adjusted levels is N. Furthermore, a message (the effect which needs to increase the level by N levels) shown in FIG. 39 is displayed at Step S4509. Thereby, the user can be notified that the latent-mark pattern selected by the user having an inappropriate density as the copy-forgery-inhibited pattern image and how many levels should be adjusted for setting the leveling order to obtain the appropriate density. After the displaying, the process returns to Step S4503. On the other hand, at Step S4505, when the measured density value is judged to be within the effective density region, the latent-mark threshold pattern corresponding to the level selected at Step S4506 is set as the latent-mark threshold pattern of the copy-forgery-inhibited pattern image, and the processing is ended (S4510).

Second Modification of Second Embodiment

Figure 40:
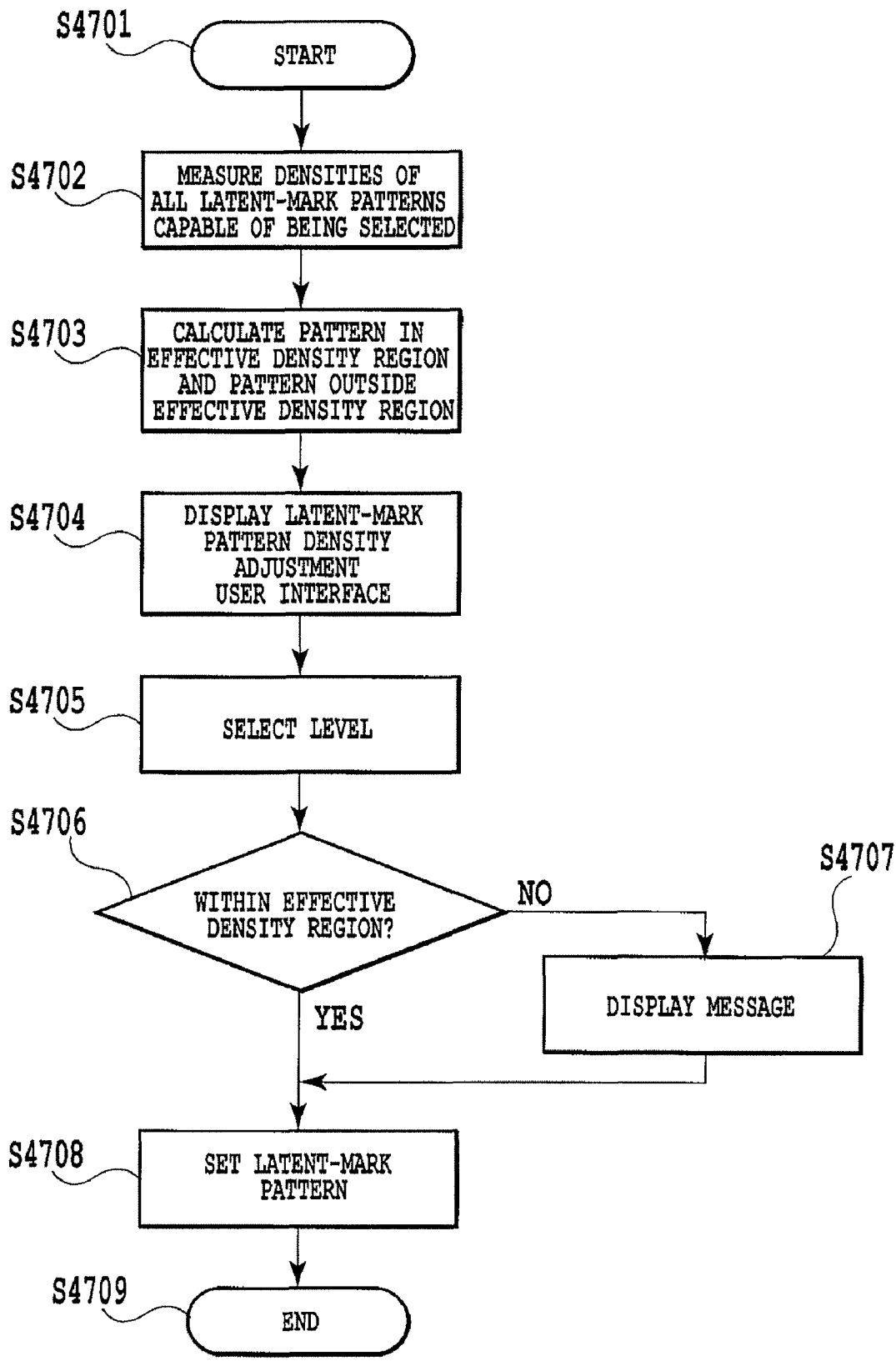
FIG. 40 is a flowchart showing a latent-mark pattern density judgment processing according to a second modification of the second embodiment.

FIG. 40 is a flowchart showing another example of the latent-mark pattern density judgment processing.

Figure 43:
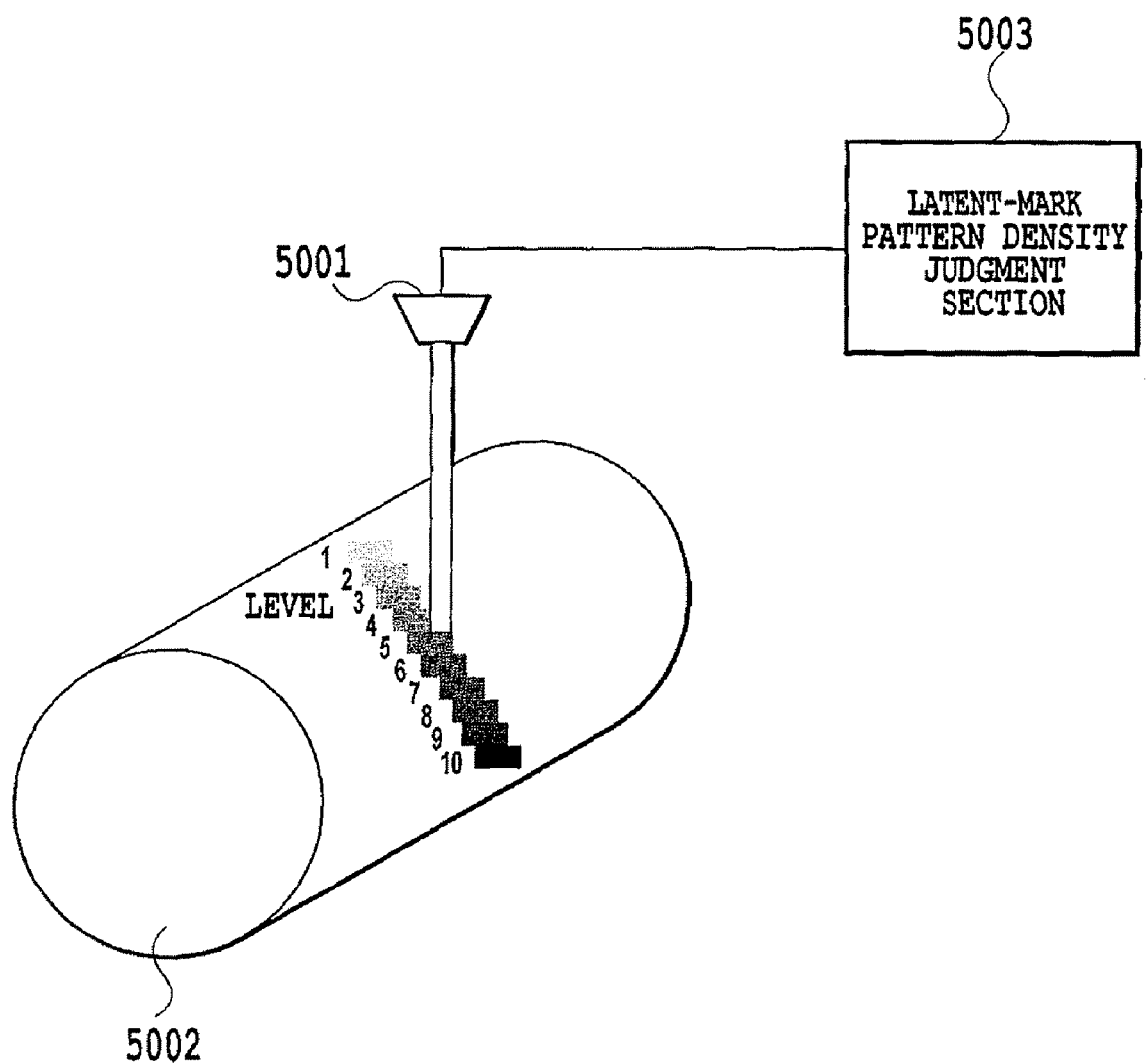
FIG. 43 is a view showing the constitution of a latent-mark pattern density measuring part for measuring the density of a latent-mark threshold pattern.

According to the indication of the latent-mark pattern density distinction execution from the user interface or the like, latent-mark pattern density judgment processing is started at Step S4701. First, all the latent-mark threshold patterns capable of being set, for example, the latent-mark threshold patterns 3701 to 3710 of FIG. 30 corresponding to the level 1 to level 10 shown in FIG. 29 are formed at Step S4702. The densities shown by the latent-mark threshold patterns are measured by a latent-mark pattern density measuring section (elements 5001, 5002 of FIG. 43). These measured values are transmitted to a latent-mark pattern density judgment section.

Figure 41:
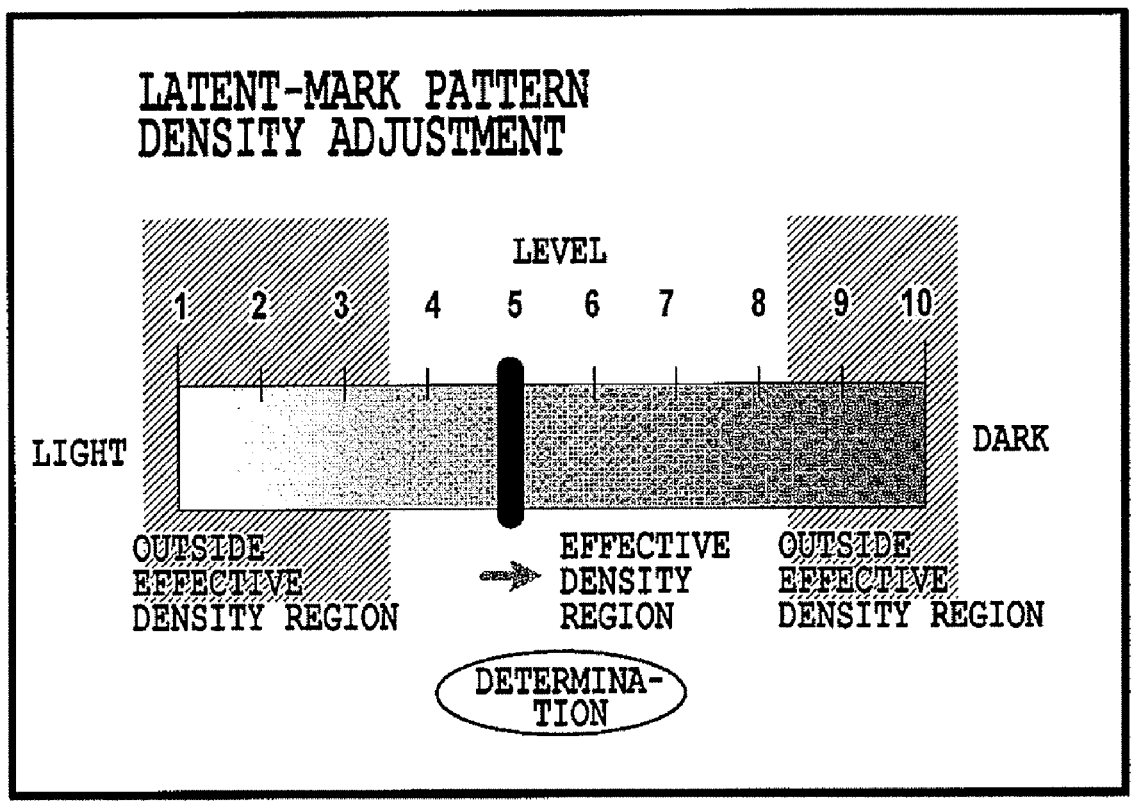
FIG. 41 is a view showing a user interface of a latent-mark pattern density adjustment specifying a level of an effective density region and a level outside the effective density region displayed by the processing of FIG. 40.

Next, at Step S4703, the measured density values of all the levels are compared with the minimum density A and maximum density B of the effective density region. Therefore, the level within the effective density region (the level of the measured density value between the density A and the density B) and the level outside the effective density region (the level of the measured density value lighter than the density A or darker than the density B) are calculated. As shown in FIG. 41, the user interface of the latent-mark pattern density adjustment in which the selecting region of the level outside the effective density region is enclosed with a shaded area or the like, and which specifies the level within the effective density region and the level outside the effective density region is displayed at Step S4704. At Step S4705, the input of the selected level made by the user in the level 1 to level 10 in this display is received. In this case, the user can select a desired level within the effective density region. Alternately, depending on the target copy-forgery-inhibited pattern image or the like, it is also daringly possible to select one in which the density level of the latent-mark part is outside the effective density region.

At Step S4706, it is judged whether the level selected by the user is in the effective density region, or outside the effective density region. When it is judged that the level is outside the effective density region, the user is notified that the level of the latent-mark pattern selected by the user has an inappropriate density as the copy-forgery-inhibited pattern image by displaying the message shown in FIG. 42 at Step S4707. In this case, for example, the user selecting the level outside the effective density region at Step S4705 can push the "OK" button to continue the processing. Alternately, the user looking at the message can return to, for example, the display of Step S4704 by a predetermined operation so as to do the selection of the level again.

At Step S4708, the latent-mark pattern corresponding to the selected level is set as the latent-mark pattern of the copy-forgery-inhibited pattern image, and the processing is ended (S4709).

As described above, according to the embodiment, when the density of the latent-mark part of the copy-forgery-inhibited pattern image is outside the effective density region for functioning as the copy-forgery-inhibited pattern image in relation to the background part by the difference in the density characteristic and density fluctuation of the printer, the effect is notified to the user. Thereby, the user can prevent the printing the useless copy-forgery-inhibited pattern image. Even if the density is within the effective density region, the useless copying work, the confirmation work and the operation can be eliminated by actually printing, copying and checking the density of the copy-forgery-inhibited pattern image.

In addition, since the notification led to the selection of an appropriate density is carried out when the density of the set latent-mark part is inappropriate according to the embodiment, the user can select an appropriate density easily.

Although the second embodiment described above distinguishes whether the density of the latent-mark threshold pattern is within the effective density region, the same judgment for the density of the background threshold pattern may be carried out instead of the latent-mark threshold pattern. In this case, as a matter of course, the density shown by the background threshold pattern set according to the distinction in the set of the subsequent latent-mark threshold pattern and, for example, the latent-mark threshold pattern showing almost the same density are set.

Even when the density of the printer is fluctuated, the user can select the appropriate latent-mark pattern by specifying the appropriate latent-mark pattern as the copy-forgery-inhibited pattern image and the inappropriate latent-mark pattern. Thereby, it is possible to eliminate the printing of the inappropriate copy-forgery-inhibited pattern image, the useless copying work by actually copying and checking the density of the copy-forgery-inhibited pattern image, the confirmation work and the operation.

Another Embodiment

A copy-forgery-inhibited pattern image synthesizing device according to the embodiment of the present invention can also be executed by a host computer such as a personal computer.

Figure 44:
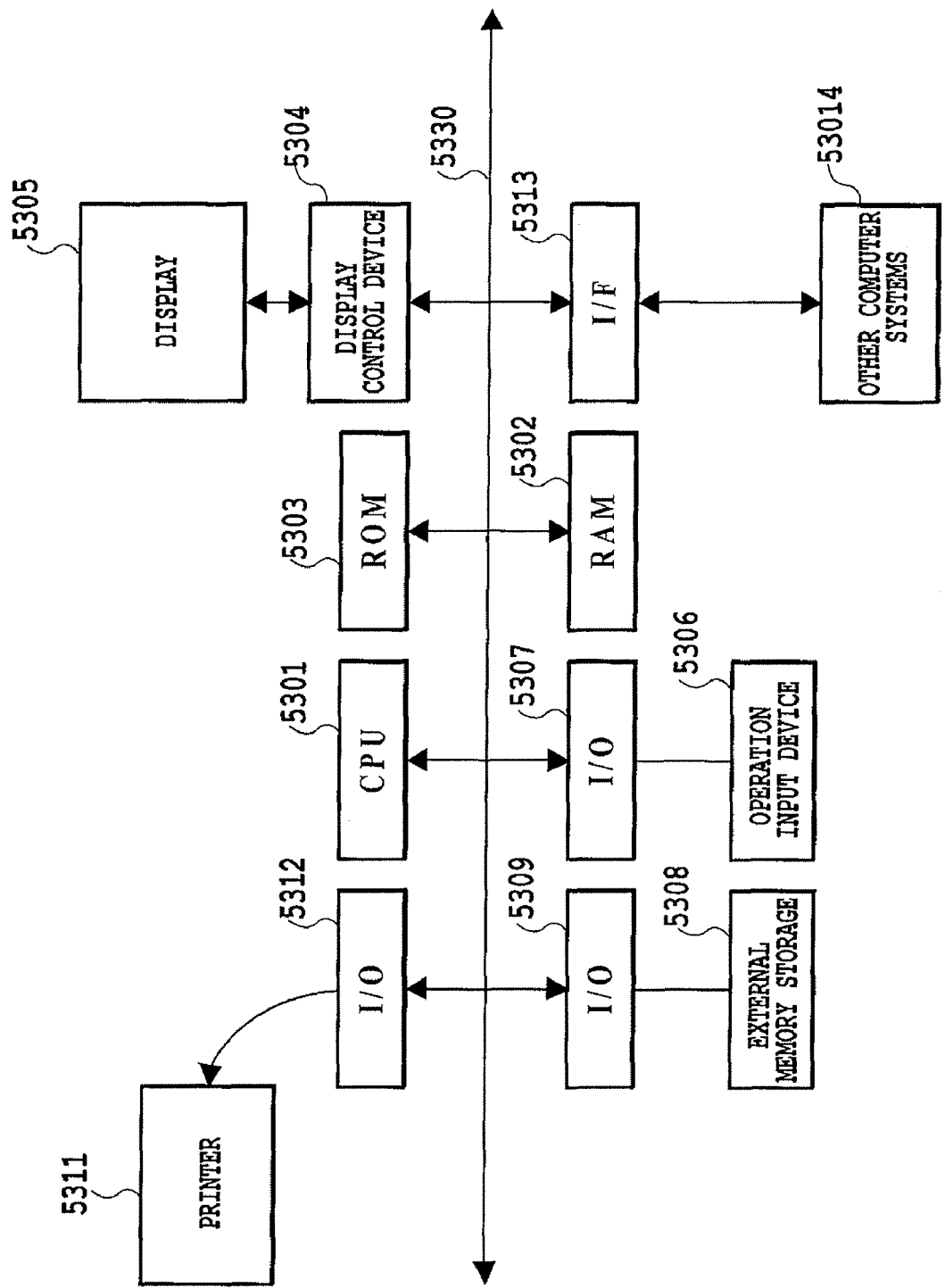
FIG. 44 is a block diagram showing the basic constitution of a computer according to another embodiment.

FIG. 44 is a block diagram showing the basic constitution of this computer. When all the functions except the printing section (or the printer engine of the printing section) in FIG. 1 of the first and second embodiments described above are executed, for example, in this computer, each functional constitution can be expressed by a program. The above function can be realized by making the constitution read into this computer.

In FIG. 44, reference numeral 5301 designates a CPU, and the entire computer is controlled by using a program and data which are stored in a RAM 5302 or a ROM 5303, and each processing described in the first or second embodiment is carried out. The RAM 5302 is provided with an area for temporarily storing the program and data loaded from an external storage 3308, and the program and data downloaded via an I/F (interface) 5313 from the other computer system 5314. In addition, the RAM 5302 is provided with an area required for various processing carried out by the CPU 5301.

The ROM 5303 stores the functional program and setting data or the like of the computer. A display control device 5304 carries out control processing for displaying images and characters or the like on a display 3305. A display 5305 displays the images and the characters or the like. As the display, a CRT and a liquid crystal display or the like can be applied.

An operation input device 5306 is constituted by a device capable of inputting various indications into the CPU 5301 such as a keyboard and a mouse. When the latent-mark background region specifying image or the like is manually input, these can be input via the operation input device 5306. Reference numeral 5307 designates an I/O for notifying various indications or the like input via the operation input device 5306 to the CPU 5301.

Reference numeral 5308 designates an external storage which functions as a high-capacity information storage device such as a hard disk. This stores an OS (operating system), a program for making the CPU 5301 execute processing of the above first and second embodiments, the background dither matrix, the latent-mark dither matrix, the generated copy-forgery-inhibited pattern image and the input original image or the like. The writing of information to the external storage 5308 and the readout of the information from the external storage 5308 are carried out via an I/O 5309.

Reference numeral 5311 designates a printer for outputting documents and images, and output data is transmitted from the RAM 5302 or the external storage 5308 via an I/O 5312. Examples of the printers for outputting the documents and the images include an ink jet printer, a laser beam printer, a heat transfer type printer and a dot impact printer.

Reference numeral 5320 designates a bus for connecting the CPU 5301, the ROM 5303, the RAM 5302, the I/O 5312, the I/O 5309, the display control device 5304, the I/F 5313 and the I/O 5307.

Although the processing except for the copy-forgery-inhibited pattern synthesizing printing apparatus and the printing section of the copy-forgery-inhibited pattern synthesizing printing apparatus provided with the test sheet function is executed by the computer in the embodiment, the processing may be executed by the computer using a hardware circuit for exclusive use in the printer.

The present invention may be applied to a system composed of a plurality of equipment (for example, a host computer, interface equipment, a reader and a printer or the like). Also, the present invention may be applied to a device (for example, a copier and a facsimile machine or the like) consisting of one piece of equipment.

A recording medium recording a program code of software for realizing the function of the embodiment described above is supplied to a system or the like, and the function is attained also by reading and executing the program code in which a computer (CPU and MPU) of the system or the like is stored in the recording medium.

In this case, the program code itself read from the recording medium realizes the function of the embodiment described above, and the recording medium storing the program code constitutes the present invention.

As the recording medium for supplying the program code, for example, a floppy (registered trademark) disk, a hard disk, an optical disc, a magneto-optical disc, a CD-ROM, a CD-R, a magnetic tape, a nonvolatile memory card and a ROM or the like can be used.

Only the function of the embodiment is not realized by executing the program code read by the computer. The OS or the like operating on the computer carries out a part or all of the actual processing based on the indication of the program code, and the case where the function of the embodiment described above is realized by the processing is also contained.

Furthermore, an embodiment where the program code read from the recording medium is written in a memory provided in an expansion board inserted into the computer or a function expansion unit connected to the computer is also included. The CPU or the like such as the function expansion board carries out a part or all of the actual processing based on the indication of the program code, and the case where the function of the embodiment described above is realized by the processing is also contained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This present application claims the benefit of Japanese Patent Application No. 2005-295386, filed Oct. 7, 2005 and Japanese Patent Application No. 2006-249889, filed Sep. 14, 2006 which are hereby incorporated by reference herein in their entirety.

What is claimed is:

1. An image forming apparatus comprising:
density correcting means for correcting densities of respective pixels of an input image using a density correcting parameter;
forming means for forming an image, in which densities of respective pixels of the input image have been corrected by said density correcting means, on a sheet;
changing means for changing the density correcting parameter used by said density correcting means; and
notifying means for notifying a user to execute a density adjustment for a copy-forgery-inhibited pattern image, when said changing means changes the density correcting parameter by an amount equal to or greater than a predetermined amount.

2. An image forming apparatus as claimed in claim 1, wherein said notifying means notifies the user to execute the density adjustment for the copy-forgery-inhibited pattern image, when said changing means changes the density correcting parameter at the time of executing a density adjustment for the copy-forgery-inhibited pattern image by the amount equal to or greater than the predetermined amount.

3. An image forming apparatus as claimed in claim 1, further comprising density adjustment means for receiving a notification from said notifying means to execute the density adjustment for the copy-forgery-inhibited pattern image,
wherein said forming means forms a copy-forgery-inhibited pattern image based on a result of the density adjustment executed by said density adjusting means on a sheet.

4. An image forming apparatus comprising:
density correcting means for executing a gamma correction for a density of an input image using a gamma correction value;
forming means for forming the image obtained by said density correcting means executing the gamma correction on the input image, on a sheet;
changing means for changing the gamma correction value used by said density correcting means; and
notifying means for notifying a user to execute a density adjustment for a copy-forgery-inhibited pattern image, when said changing means changes the gamma correction value by an amount equal to or greater than a predetermined amount.

5. An image forming apparatus comprising:
intermediate forming means for executing a gamma correction for a density of an input image using a gamma correction value, binarizing the image obtained by executing the gamma correction on the input image, and forming the binarized image obtained by the binarization on a intermediate transfer body;
measurement means for measuring a density of the binarized image formed by said intermediate forming means;
final forming means for forming the binarized image formed on the intermediate transfer body on a sheet;
measurement result obtaining means for inputting an image used for adjusting the gamma correction value into said intermediate forming means so that said intermediate forming means forms the binarized image on the intermediate transfer body, and causing said measurement means to measure a density of the binarized image formed on the intermediate transfer body to obtain a measurement result;
adjustment means for adjusting the gamma correction value based on the measurement result obtained by said measurement result obtaining means; and
notifying means for notifying a user to execute a density adjustment for a copy-forgery-inhibited pattern image, when the measurement result obtained by said measurement result obtaining means differs from a measurement result obtained just prior to the previous density adjustment for the copy-forgery-inhibited pattern image by an amount equal to or greater than a predetermined amount.

6. A control method of an image forming apparatus, said method comprising:
a density correcting step of correcting densities of respective pixels of an input image using a density correcting parameter;
a forming step of forming an image, in which densities of respective pixels of the input image have been corrected by said density correcting step, on a sheet;
a changing step of changing a density correcting parameter used in said density correcting step; and
a notifying step of notifying a user to execute a density adjustment for a copy-forgery-inhibited pattern image, when said changing means changes the density correcting parameter by an amount equal to or greater than a predetermined amount.

7. A control method as claimed in claim 6, wherein said notifying step notifies the user to execute the density adjustment for the copy-forgery-inhibited pattern image, when said changing step changes the density correcting parameter at the time of executing the density adjustment for the copy-forgery-inhibited pattern image by the amount equal to or greater than the predetermined amount.

8. A control method as claimed in claim 6, further comprising a density adjustment step of receiving a notification from said notifying step to execute a density adjustment for the copy-forgery-inhibited pattern image,
wherein said forming step forms a copy-forgery-inhibited pattern image, based on a result of the density adjustment executed by said density adjusting step, on a sheet.

9. A control method of an image forming apparatus, said method comprising:
- a density correcting step of executing a gamma correction for a density of an input image using a gamma correction value;
- a forming step of forming the image obtained by executing the gamma correction in said density correcting step, on a sheet;
- a changing step of changing the gamma correction value used in said density correcting step; and
- a notifying step of notifying a user to execute a density adjustment for a copy-forgery-inhibited pattern image, when said changing step changes the gamma correction value by an amount equal to or greater than a predetermined amount.

10. A control method of an image forming apparatus, said method comprising:
- an intermediate forming step of executing a gamma correction for a density of an input image using a gamma correction value, binarizing the image obtained by executing the gamma correction, and forming the binarized image obtained by the binarization on a intermediate transfer body;
- a measurement step of measuring a density of the binarized image formed in said intermediate forming step;
- a final forming step of forming the binarized image formed on the intermediate transfer body on a sheet;
- a measurement result obtaining step of inputting an image used for adjusting the gamma correction value in said intermediate forming step so that said intermediate forming step forms the binarized image on the intermediate transfer body, and causing said measurement step to measure a density of the binarized image formed on the intermediate transfer body to obtain a measurement result;
- an adjustment step of adjusting the gamma correction value based on the measurement result obtained by said measurement result obtaining step; and
- a notifying step of notifying a user to execute a density adjustment for a copy-forgery-inhibited pattern image, when the measurement result obtained by said measurement result obtaining step differs from a measurement result obtained just before a previous density adjustment for the copy-forgery-inhibited pattern image by an amount equal to or greater than a predetermined amount.

11. A storage medium storing a program readably by a computer, said program being of a control process of an image forming apparatus, said process comprising:
- a density correcting step of correcting densities of respective pixels of an input image using a density correcting parameter;
- a forming step of forming an image, in which densities of respective pixels have been corrected by said density correcting step, on a sheet;
- a changing step of changing a density correcting parameter used in said density correcting step; and
- a notifying step of notifying a user to execute a density adjustment for a copy-forgery-inhibited pattern image, when said changing means changes the density correcting parameter by an amount equal to or greater than a predetermined amount.

* * * * *